(12) United States Patent
Sakamoto et al.

(10) Patent No.: US 11,886,099 B2
(45) Date of Patent: Jan. 30, 2024

(54) ELECTRONIC APPARATUS AND ACCESSORY

(71) Applicant: CANON KABUSHIKI KAISHA, Tokyo (JP)

(72) Inventors: Hiromichi Sakamoto, Tokyo (JP); Kei Tohyama, Kanagawa (JP); Takayuki Shu, Kanagawa (JP); Hiromi Hayasaki, Kanagawa (JP); Kouji Ikeda, Tokyo (JP); Yuhei Hattori, Tokyo (JP); Kenji Ishii, Kanagawa (JP); Yoshinobu Okano, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 27 days.

(21) Appl. No.: 17/533,904

(22) Filed: Nov. 23, 2021

(65) Prior Publication Data

US 2022/0082905 A1 Mar. 17, 2022

Related U.S. Application Data

(63) Continuation of application No. PCT/JP2021/014288, filed on Apr. 2, 2021.

(30) Foreign Application Priority Data

Apr. 9, 2020 (JP) .................................. 2020-070625
Apr. 9, 2020 (JP) .................................. 2020-070626
(Continued)

(51) Int. Cl.
*G03B 17/14* (2021.01)
*G03B 15/05* (2021.01)
*G03B 17/56* (2021.01)

(52) U.S. Cl.
CPC ............. *G03B 17/14* (2013.01); *G03B 15/05* (2013.01); *G03B 17/565* (2013.01)

(58) Field of Classification Search
CPC ........................... G03B 17/02; G03B 17/566; G03B 2215/056; H04N 23/74
See application file for complete search history.

(56) References Cited

U.S. PATENT DOCUMENTS 4,887,120 A  12/1989 Kobayashi et al.
5,384,611 A   1/1995 Tsuji et al.
(Continued)

FOREIGN PATENT DOCUMENTS

CN  1960064 A    5/2007
CN  102457679 A  5/2012
(Continued)

OTHER PUBLICATIONS

The above U.S. Publication Nos. #1-2 and Foreign Publication Nos. #1-3 were cited in a Nov. 22, 2022 Chinese Office Action, which is enclosed with an English Translation, that issued in Chinese Patent Application No. 202180003624.7.

(Continued)

*Primary Examiner* — Leon W Rhodes, Jr.
(74) *Attorney, Agent, or Firm* — Cowan, Liebowitz & Latman, P.C.

(57) ABSTRACT

An electronic apparatus includes a plurality of contacts electrically connectable to an accessory and arranged in a first direction orthogonal to a direction in which the accessory is attached. The contacts include an attachment detection contact to detect an attachment of the accessory to the electronic apparatus, and a communication request contact for a communication request from the accessory to the electronic apparatus. The attachment detection and communication request contacts are disposed between a contact (Continued)

closest one end and a contact closest to another end in the first direction. The attachment detection contact is disposed between the communication request contact and the contact closest to the one end. In the first direction, a distance between the attachment detection contact and the communication request contact is shorter than that between the communication request contact and the contact closest to the other end.

28 Claims, 28 Drawing Sheets

(30) Foreign Application Priority Data

| | | |
|---|---|---|
| Apr. 9, 2020 | (JP) | 2020-070627 |
| Mar. 31, 2021 | (JP) | 2021-060601 |

(56) References Cited

U.S. PATENT DOCUMENTS

| | | | |
|---|---|---|---|
| 6,753,921 | B1 | 6/2004 | Shimizu |
| 9,049,378 | B2* | 6/2015 | Motoki .......... G03B 15/05 |
| 9,703,173 | B2 | 7/2017 | Brodie et al. |
| 2002/0177334 | A1 | 11/2002 | Akama et al. |
| 2005/0237426 | A1 | 10/2005 | Takashima et al. |
| 2007/0099455 | A1 | 5/2007 | Rothermel et al. |
| 2008/0152991 | A1 | 6/2008 | Yoshitomi et al. |
| 2009/0046150 | A1 | 2/2009 | Hayakawa et al. |
| 2012/0105711 | A1 | 5/2012 | Kudo et al. |
| 2012/0189292 | A1 | 7/2012 | Kim et al. |
| 2012/0195587 | A1 | 8/2012 | Hasuda et al. |
| 2012/0219281 | A1 | 8/2012 | Imafuji et al. |
| 2013/0028586 | A1 | 1/2013 | Ide et al. |
| 2013/0050510 | A1 | 2/2013 | Fujihashi et al. |
| 2013/0077952 | A1 | 3/2013 | Sugiyama et al. |
| 2013/0084061 | A1 | 4/2013 | Imafuji et al. |
| 2013/0223831 | A1 | 8/2013 | Miyakawa et al. |
| 2013/0266304 | A1 | 10/2013 | Nishio et al. |
| 2013/0302025 | A1 | 11/2013 | Imafuji et al. |
| 2014/0233936 | A1 | 8/2014 | Imafuji et al. |
| 2015/0049244 | A1 | 2/2015 | Tokunaga et al. |
| 2015/0062418 | A1 | 3/2015 | Matsumoto et al. |
| 2015/0109471 | A1 | 4/2015 | Kudo et al. |
| 2015/0116592 | A1 | 4/2015 | Suzuki |
| 2015/0222315 | A1 | 8/2015 | O'Neill et al. |
| 2015/0244924 | A1 | 8/2015 | Motoki et al. |
| 2015/0261069 | A1 | 9/2015 | Imafuji et al. |
| 2016/0227084 | A1 | 8/2016 | Imamura |
| 2016/0255276 | A1 | 9/2016 | Sekimoto |
| 2017/0075200 | A1 | 3/2017 | Nishio et al. |
| 2017/0222384 | A1 | 8/2017 | Seo |
| 2018/0224718 | A1 | 8/2018 | Ota et al. |
| 2018/0348604 | A1 | 12/2018 | Kamiya et al. |
| 2018/0348609 | A1 | 12/2018 | Ueda |
| 2018/0348611 | A1 | 12/2018 | Yamazaki et al. |
| 2019/0129119 | A1 | 5/2019 | Funaoka et al. |
| 2019/0129127 | A1 | 5/2019 | Goto et al. |
| 2020/0007744 | A1 | 1/2020 | Sugiyama |
| 2020/0073209 | A1 | 3/2020 | Fujihashi et al. |
| 2020/0081328 | A1 | 3/2020 | Ueda |
| 2020/0142286 | A1 | 5/2020 | Nishio et al. |
| 2020/0174344 | A1 | 6/2020 | Kamiya et al. |
| 2020/0174348 | A1 | 6/2020 | Kamiya et al. |
| 2020/0225563 | A1 | 7/2020 | Yamazaki et al. |
| 2022/0221684 | A1 | 7/2022 | Funaoka et al. |
| 2023/0168461 | A1 | 6/2023 | Funaoka et al. |

FOREIGN PATENT DOCUMENTS

| | | |
|---|---|---|
| CN | 102608838 A | 7/2012 |
| CN | 102650803 A | 8/2012 |
| CN | 102891962 A | 1/2013 |
| CN | 203241682 U | 10/2013 |
| CN | 203414714 U | 1/2014 |
| CN | 105637399 A | 6/2016 |
| CN | 105980925 A | 9/2016 |
| CN | 107065401 A | 8/2017 |
| CN | 108989612 A | 12/2018 |
| CN | 109709754 A | 5/2019 |
| CN | 110661964 A | 1/2020 |
| EP | 2023607 A2 | 2/2009 |
| JP | H07234432 A | 9/1995 |
| JP | 09-185103 A | 7/1997 |
| JP | 2006-079053 A | 3/2006 |
| JP | 2006064763 A | 3/2006 |
| JP | 2008-159396 A | 7/2008 |
| JP | 4392363 B2 | 12/2009 |
| JP | 2012-189980 A | 10/2012 |
| JP | 2013-034172 A | 2/2013 |
| JP | 2013-047755 A | 3/2013 |
| JP | 2013-048404 A | 3/2013 |
| JP | 2013-076971 A | 4/2013 |
| JP | 2013-238874 A | 11/2013 |
| JP | 2013-257411 A | 12/2013 |
| JP | 5445479 B2 | 3/2014 |
| JP | 2015-023076 A | 2/2015 |
| JP | 2015-075503 A | 4/2015 |
| JP | 2015-099396 A | 5/2015 |
| JP | 5955136 B2 | 7/2016 |
| JP | 2016-166967 A | 9/2016 |
| JP | 2016-212228 A | 12/2016 |
| JP | 2017-138457 A | 8/2017 |
| JP | 2017-151160 A | 8/2017 |
| JP | 2017-151161 A | 8/2017 |
| JP | 2018-084681 A | 5/2018 |
| JP | 2018-205738 A | 12/2018 |
| JP | 2018-207427 A | 12/2018 |
| JP | 2019-008054 A | 1/2019 |
| JP | 2019-078931 A | 5/2019 |
| JP | 2019-113872 A | 7/2019 |
| JP | 2020-024378 A | 2/2020 |
| JP | 2020-027266 A | 2/2020 |
| TW | 201344330 A | 11/2013 |
| TW | M490590 U | 11/2014 |
| TW | 201903504 A | 1/2019 |
| TW | 201903507 A | 1/2019 |
| TW | 201910899 A | 3/2019 |
| WO | 2015/068492 A1 | 5/2015 |
| WO | 2017/073081 A1 | 5/2017 |

OTHER PUBLICATIONS

The above U.S. Publication Nos. #3-5 and Foreign Publication Nos. #4-9 were cited in a Nov. 21, 2022 Chinese Office Action, which is enclosed with an English Translation, that issued in Chinese Patent Application No. 202180003706.1.
Nov. 17, 2022 Indian Office Action, which is enclosed, that issued in Indian Patent Application No. 202147053802.
Dec. 1, 2022 Indian Office Action, which is enclosed, that issued in Indian Patent Application No. 202147054728.
Dec. 8, 2022 Indian Office Action, which is enclosed, that issued in Indian Patent Application No. 202147054709.
The foreign references 9-11 were cited in the International Search Report dated Jun. 15, 2021 of International Application No. PCT/JP2021/014278, which is enclosed.
The foreign references 3, 5 and 18 were cited in the International Search Report dated Jun. 15, 2021 of International Application No. PCT/JP2021/014288, which is enclosed.
The foreign references 2 and 12 were cited in the International Search Report dated Jun. 22, 2021 of International Application No. PCT/JP2021/014319, which is enclosed.
The above U.S. Patent Application Publication #1 and Foreign Patent Document #1 were cited in a Jan. 11, 2023 Indian Office Action, which is enclosed, that issued in Indian Patent Application No. 202247063397.
The above Foreign Patent Document #2 was cited in a Jan. 18, 2023 Indian Office Action, which is enclosed, that issued in Indian Patent Application No. 202247062984.

(56) References Cited

OTHER PUBLICATIONS

A Jan. 3, 2023 Indian Office Action, which is enclosed, that issued in Indian Patent Application No. 202247063460.
A Jan. 17, 2023 Indian Office Action, which is enclosed, that issued in Indian Patent Application No. 202247062985.
The above foreign patent documents and U.S. Publication document #4 were cited in a Jul. 14, 2022 Chinese Office Action, which is enclosed with an English Translation, that issued in Chinese Patent Application No. 202180003681.5.
PCT/IB/338 (PCT Notification of Transmittal of Translation of the International Preliminary Report on Patentability) dated Oct. 20, 2022 in International application No. PCT/JP2021/014288; PCT/IB/373 (PCT International Preliminary Report on Patentability) dated Oct. 20, 2022 in International application No. PCT/JP2021/014288; PCT/ISA/237 (PCT Written Opinion of the International Searching Authority) dated Oct. 20, 2022 in International application No. PCT/JP2021/014288.
The above U.S. Patent Application Publications #1-2 and Foreign Patent Documents #1-2 were cited in a Sep. 8, 2022 U.S. Office Action, which is enclosed, which issued in U.S. Appl. No. 17/533,860.
The above foreign patent documents #3-4 were cited in the Nov. 8, 2022 Japanese Office Action, which is enclosed without an English Translation, that issued in Japanese Patent Application No. 2020-148939.
Jun. 2, 2023 U.S. Notice of Allowance, which is enclosed, that issued in U.S. Appl. No. 17/533,860.
The above U.S. Publication document No. #1 and Foreign Publication Nos. #1 and #2 were cited in the Aug. 17, 2023 Korean Notice of Allowance, which is enclosed with an English Translation, that issued in Korean Patent Application No. 10-2021-7038104.

The above Foreign Patent Document #3 was cited in an Aug. 25, 2023 European Patent Office Search Report, which is enclosed, that issued in European Patent Application No. 21784456.2.
The above patent documents were cited in a Aug. 21, 2023 Taiwanese Office Action, which is enclosed without an English Translation, that issued in Taiwanese Patent Application No. 110112708.
Jun. 28, 2023 Chinese Office Action, which is enclosed with an English Translation, that issued in Chinese Patent Application No. 202180003706.1.
The above patent documents were cited in a Aug. 2, 2023 Taiwanese Office Action, which is enclosed without an English Translation, that issued in Taiwanese Patent Application No. 110112652.
The above U.S. Patent Application Publication #1 document (US20200174344) was cited in the Feb. 17, 2023 U.S. Office Action, which is enclosed, that issued in U.S. Appl. No. 17/533,860.
The above Foreign Patent Document #1 (TWM490590) was cited in the Feb. 23, 2023 Taiwanese Office Action, which is enclosed without an English Translation, that issued in Taiwanese Patent Application No. 110112707.
The above patent documents were cited in the Jan. 27, 2023 Singaporean Office Action, which is enclosed without an English Translation, that issued in Singaporean Patent Application No. 11202112194X.
Nov. 3, 2023 Supplementary Partial European Search Report, which enclosed, that issued in European Patent Application No. EP21785644.2.
The above documents were cited in a Nov. 8, 2023 Chinese Office Action, which is enclosed with an English Translation, that issued in Chinese Patent Application No. 202180003706.1.
The above patent documents was cited in a European Search Report dated Nov. 29, 2023, which is enclosed, that issued in the corresponding European Patent Application No. 21784009.9.

* cited by examiner

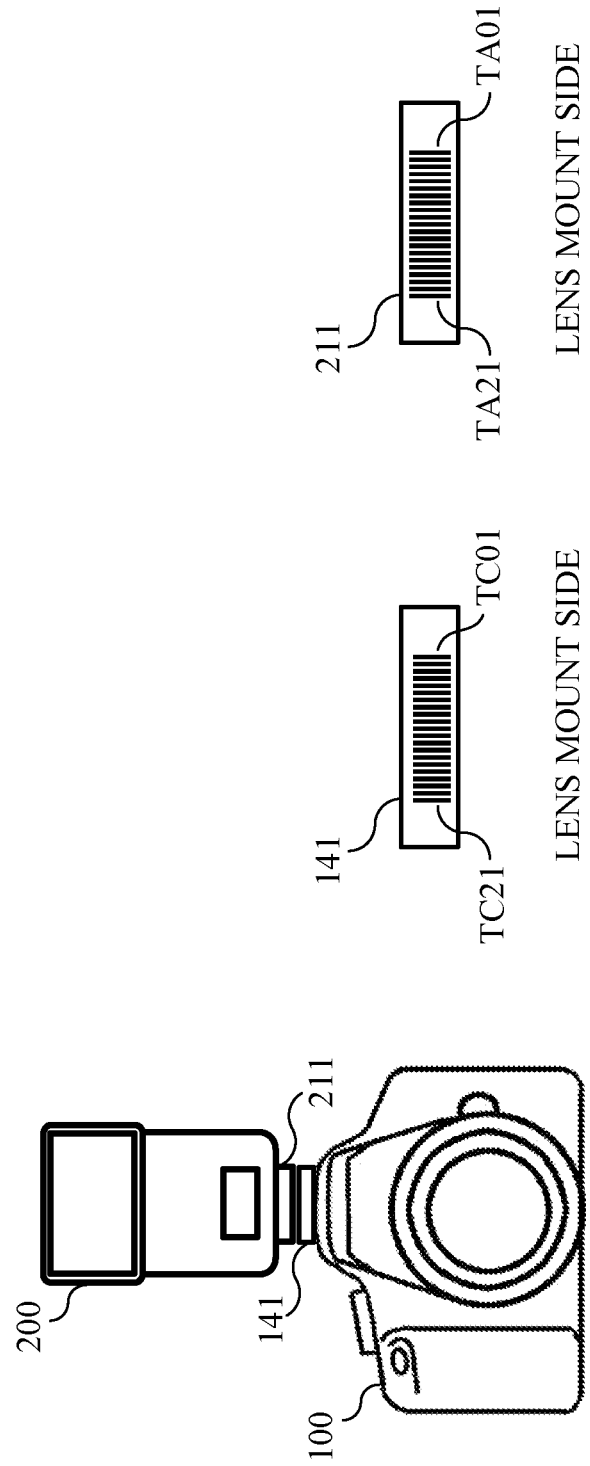

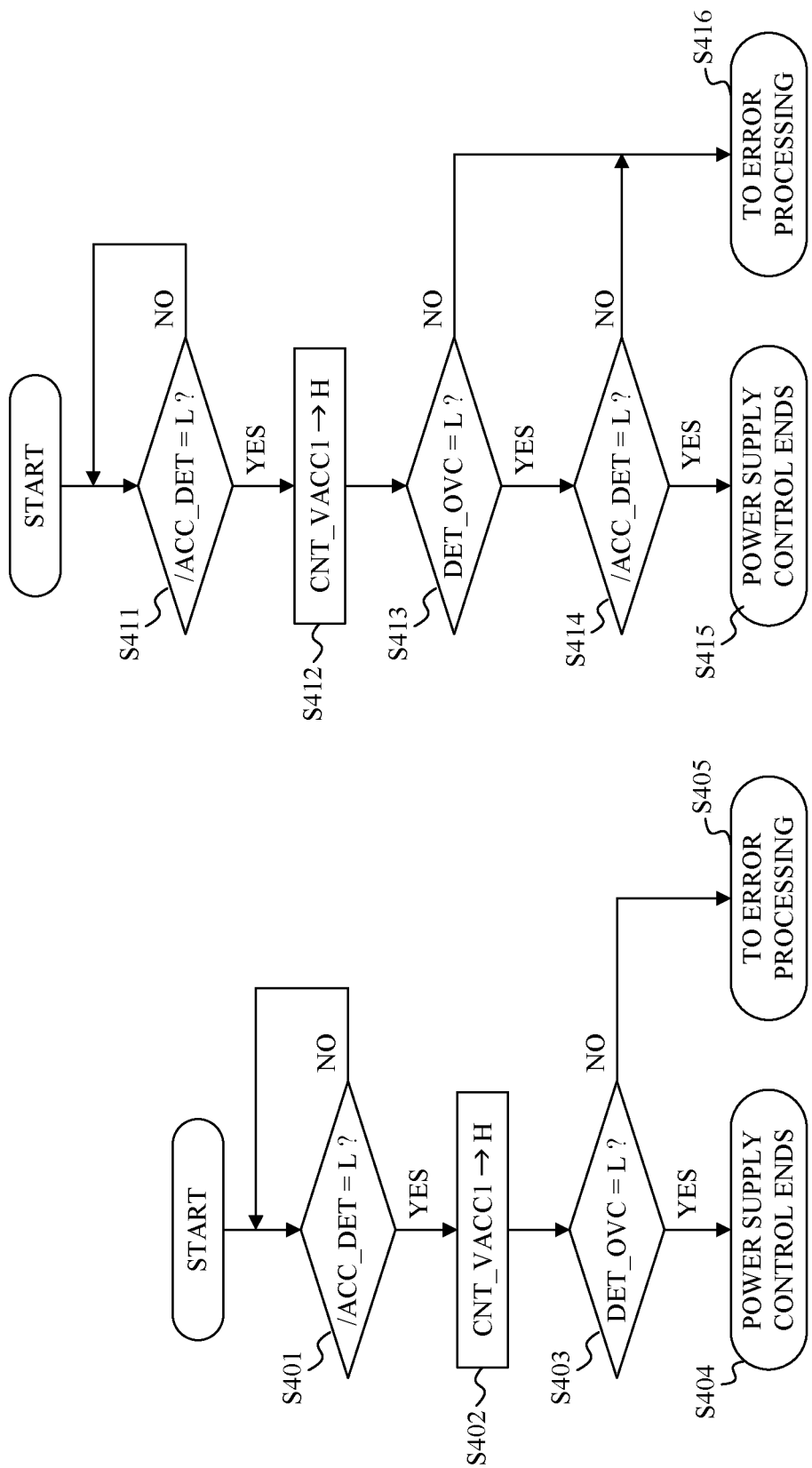

| SIGNAL NAME | ① MICROPHONE | | ② STROBO | |
|---|---|---|---|---|
| | FUNCTION | DIRECTION | FUNCTION | DIRECTION |
| FNC1 SIGNAL | GND | - | STARTX | CAMERA→ACCESSORY |
| FNC2 SIGNAL | DATA | ACCESSORY→CAMERA | UNUSE | - |
| FNC3 SIGNAL | LRCLK | ACCESSORY→CAMERA | UNUSE | - |
| FNC4 SIGNAL | BCLK | CAMERA→ACCESSORY | UNUSE | - |

FIG. 7

COMMUNICATION REQUEST(/WAKE)
AND I2C COMMUNICATION TIMING

ELECTRONIC APPARATUS AND ACCESSORY

CROSS-REFERENCE TO RELATED APPLICATIONS

This application is a Continuation of International Patent Application No. PCT/JP2021/014288, filed on Apr. 2, 2021, which claims the benefit of Japanese Patent Applications Nos. 2020-070625, filed on Apr. 9, 2020, 2020-070626, filed on Apr. 9, 2020, 2020-070627, filed on Apr. 9, 2020, and 2021-060601, filed on Mar. 31, 2021, each of which are hereby incorporated by reference herein in their entirety.

BACKGROUND OF THE INVENTION

Field of the Invention

The present invention relates to an electronic apparatus and an accessory, each of which has a contact used for a communication, an attachment detection, and the like.

Description of the Related Art

An accessory, such as an illumination unit, is attached to an accessory shoe provided to an electronic apparatus, such as a camera. As disclosed in Japanese Patent Laid-Open No. 2013-34172, the accessory shoe is provided with a plurality of contacts (terminals) for detecting the attachment of the accessory to the camera and for enabling communications between the camera and the accessory.

However, if these contacts are disconnected from each other during operations of the electronic apparatus and the accessory, a malfunction can occur. In particular, if the contact for detecting the attachment of the accessory to the electronic apparatus is connected but the contact for enabling the communications between the electronic apparatus and the accessory remains is disconnected, a communication error occurs.

SUMMARY OF THE INVENTION

The present invention provides an electronic apparatus and an accessory, each of which can reduce a communication error caused by a disconnection of part of terminals when the accessory is attached.

An electronic apparatus according to one aspect of the present invention to which an accessory is detachably attached, the electronic apparatus comprising a plurality of contacts electrically connectable to the accessory and arranged in a row. The plurality of contacts include an attachment detection contact used to detect an attachment of the accessory to the electronic apparatus, and a communication request contact used for a communication request from the accessory to the electronic apparatus. The attachment detection contact and the communication request contact are disposed between a contact closest to one end and a contact closest to another end in an arrangement direction of the plurality of contacts. The attachment detection contact is disposed between the communication request contact and the contact closest to the one end. In the arrangement direction, a distance between the attachment detection contact and the communication request contact is shorter than a distance between the communication request contact and the contact closest to the other end.

An accessory according to another aspect of the present invention includes a plurality of contacts electrically connectable to the electronic apparatus and arranged in a row. The plurality of contacts include an attachment detection contact used to detect an attachment of the accessory to the electronic apparatus, and a communication request contact used for a communication request from the accessory to the electronic apparatus. The attachment detection contact and the communication request contact are disposed between a contact closest to one end and a contact closest to another end in an arrangement direction of the plurality of contacts. The attachment detection contact is disposed between the communication request contact and the contact closest to the one end. In the arrangement direction, a distance between the attachment detection contact and the communication request contact is shorter than a distance between the communication request contact and the contact closest to the other end.

Further features of the present invention will become apparent from the following description of exemplary embodiments with reference to the attached drawings.

BRIEF DESCRIPTION OF THE DRAWINGS

FIGS. 2A to 2C illustrate an example of the camera to which the accessory is attached and their contact arrangements according to the embodiment.

FIGS. 5A and 5B show a flowchart of processing executed by the camera according to the embodiment.

FIG. 7 is a diagram illustrating an assignment example of a functional signal to a type of the accessory according to the embodiment.

DESCRIPTION OF THE EMBODIMENTS

Referring now to the accompanying drawings, a description will be given of embodiments according to the present invention.

Figure 1:
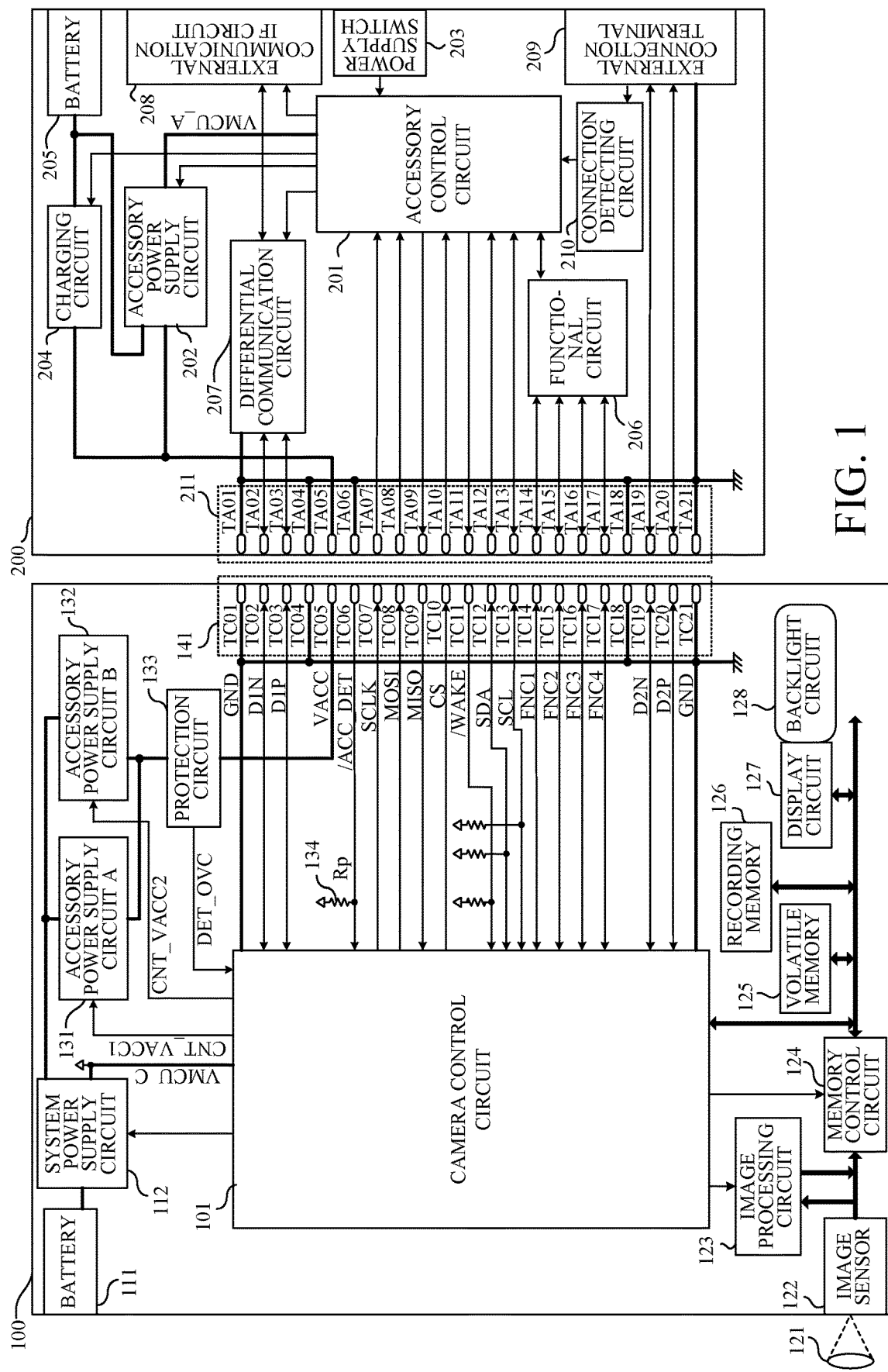
FIG. 1 is a diagram illustrating configurations of a camera and an accessory according to one embodiment of the present invention.

FIG. 1 illustrates an electrical configuration of a camera 100 as an electronic apparatus according to one embodiment of the present invention and an accessory 200 detachably attached to the camera 100. In the camera 100 and the accessory 200, a plurality of contacts (terminals) TC01 to TC21 of a camera connector 141 provided in the camera 100 and a plurality of contacts TA01 to TA21 of an accessory connector 211 provided in the accessory 200 are connected to each other in a one-to-one correspondence, respectively and thereby they are electrically connected with each other.

The camera 100 is supplied with the electric power from a battery 111. The battery 111 is attachable to and detachable from the camera 100. A camera control circuit 101 as a control means of the camera 100 is a circuit that controls the entire camera 100, and includes a microcomputer having a built-in CPU or the like.

A system power supply circuit 112 is a circuit that generates a power supply for supplying the power to each circuit in the camera 100, and includes a DC/DC converter circuit, an LDO (Low Drop Out), a charge pump circuit, and the like. A voltage of 1.8V generated by the system power supply circuit 112 is constantly supplied as a camera microcomputer power supply VMCU_C from the battery 111 to the camera control circuit 101. The camera control circuit 101 controls the system power supply circuit 112 and thereby controls turning on and off of the power supply to each circuit of the camera 100.

An optical lens 121 is attachable to and detachable from the camera 100. Light from an object incident through the optical lens 121 is imaged on an image sensor 122 including a CMOS sensor, a CCD sensor, or the like. The object image formed on the image sensor 122 is encoded into a digital imaging signal. An image processing circuit 123 performs image processing such as noise reduction processing and white balance processing for the digital imaging signal to generate image data, and converts it into an image file, such as a JPEG format, in order to record the image data in a recording memory 126. The image processing circuit 123 generates from the image data VRAM image data for display on a display circuit 127.

A memory control circuit 124 controls a transmission and reception of the image data and other data generated by the image processing circuit 123 and the like. A volatile memory 125 is a memory capable of high-speed reading and writing such as DDR3 SDRAM, and is used for a workspace or the like of the image processing performed by the image processing circuit 123. The recording memory 126 is a readable and writable recording medium such as an SD card or CFexpress card that is attachable to and detachable from the camera 100 via an unillustrated connector. The display circuit 127 is a display located on the back surface of the camera 100, and includes an LCD panel, an organic EL display panel, and the like. A backlight circuit 128 adjusts the brightness of the display circuit 127 by changing a light amount of the backlight of the display circuit 127.

Each of an accessory-use power supply circuit A131 and an accessory-use power supply circuit B132 as the power supply means is a voltage conversion circuit that converts the voltage supplied from the system power supply circuit 112 into a predetermined voltage, and generates 3.3 V as an accessory power supply VACC in this embodiment.

The accessory-use power supply circuit A131 is a power supply circuit including an LDO or the like and having a low self-consumption power. The accessory-use power supply circuit B132 is a circuit that includes a DC/DC converter circuit or the like and can flow a larger current than that of the accessory-use power supply circuit A131. The self-consumption power of the accessory-use power supply circuit B132 is larger than that of the accessory-use power supply circuit A131. Therefore, when the load current is small, the accessory-use power supply circuit A131 is more efficient than the accessory-use power supply circuit B132, and when the load current is large, the accessory-use power supply circuit B132 is more efficient than the accessory-use power supply circuit A131. The camera control circuit 101 controls turning on and off of the voltage outputs of the accessory-use power supply circuits A131 and B132 according to the operating state of the accessory 200.

A protection circuit 133 as a protection means includes a current fuse element, a poly-switching element, an electronic fuse circuit that combines a resistor, an amplifier, and a switching element, and the like, and outputs an overcurrent detection signal DET_OVC when the power supply current values from the accessory-use power supply circuits A131 and B132 to the accessory 200 become excessive (abnormal) beyond a predetermined value. In this embodiment, the protection circuit 133 includes an electronic fuse circuit, and notifies the camera control circuit 101 through the overcurrent detection signal DET_OVC when the current of 1 A or higher flows. The overcurrent detection signal DET_OVC indicates the overcurrent through the Hi level.

A camera connector 141 is a connector for an electrical connection with the accessory 200 via 21 contacts TC01 to TC21 arranged in a row. The contacts TC01 to TC21 are arranged in this order from one end to the other end in the arrangement direction thereof.

TC01 is connected to the ground (GND) and serves not only as a contact for the reference potential (GND potential) but also as a contact for controlling the wiring impedance of differential signals DIN and DIP described below. TC01 corresponds to a third grounded contact.

The differential signal DIN connected to TC02 and the differential signal DIP connected to TC03 are paired differential data communication signals that perform a data communication, and connected to the camera control circuit 101. TC02, TC03, TC07 to TC17, TC19, and TC20, which will be described later, are communication contacts.

TC04 as a first grounded contact is connected to GND and serves as a reference potential contact between the camera 100 and the accessory 200. TC04 is disposed outside TC05 described below in the contact arrangement direction.

The accessory power supply VACC generated by the accessory-use power supply circuits A131 and B132 is connected to TC05 as the power supply contact via the protection circuit 133.

An accessory attachment detection signal/ACC_DET is connected to TC06 as an attachment detection contact. The accessory attachment detection signal/ACC_DET is pulled up to the camera microcomputer power supply VMCU_C via a resistor element Rp134 (10 kΩ). The camera control circuit 101 can detect whether or not the accessory 200 is attached, by reading the signal level of the accessory attachment detection signal/ACC_DET. If the accessory attachment detection signal/ACC_DET signal level (potential) is a Hi level (predetermined potential), the accessory 200 is detected as being non-attached, and if it is a Lo level (GND potential as described later), the accessory 200 is detected as being attached.

When the camera 100 is powered on and the signal level (potential) of the accessory attachment detection signal/ACC_DET changes from the Hi level to the Lo level, various transmissions are performed between the camera 100 and the accessory 200 via the contacts.

The camera control circuit 101 supplies the power to the accessory 200 via TC05 as a power supply contact when the attachment state of the accessory 200 is detected.

SCLK connected to TC07, MOSI connected to TC08, MISO connected to TC09, and CS connected to TC10 are signals used by the camera control circuit 101 as a communication master to perform a SPI (Serial Peripheral Interface) communication. In this embodiment, the communication clock frequency of the SPI communication is 1 MHz.

A communication request signal/WAKE for requesting a communication from the accessory 200 to the camera control circuit 101 is connected to TC11. The communication request signal/WAKE is pulled up to the camera microcomputer power supply VMCU_C via a resistor. The camera control circuit 101 can receive the communication request from the accessory 200 by detecting a trailing edge of the communication request signal/WAKE.

SDA connected to TC12 and SCL connected to the TC13 are signals for the camera control circuit 101 to act as a communication master and perform an I2C (Inter-Integrated Circuit) communication. SDA and SCL are signals for an open drain communication (referred to as an open drain communication hereinafter) pulled up to the camera microcomputer power supply VMCU_C, and the communication frequency is 100 kbps in this embodiment.

In the I2C communication, both the data transmission from the camera 100 and the data transmission from the accessory 200 are performed via the SDA. When the SPI communication and the I2C communication are compared with each other, the I2C communication has a lower communication speed than that of the SPI communication, and can achieve a lower power consumption. The SPI communication has a higher communication speed than the I2C communication, and is therefore suitable for a communication of information having a large data amount. Therefore, in the communication between the camera 100 and the accessory 200 according to this embodiment, information having a large data amount is communicated in the SPI communication, and information having a small data amount is communicated in the I2C communication. For example, data is first communicated in the I2C communication, and a control is made so that the SPI communication is further executed when the SPI communication can be executed or the SPI communication needs to be executed based on this data.

An FNC1 signal connected to TC14 (synchronous contact), an FNC2 signal connected to TC15, an FNC3 signal connected to TC16, and an FNC4 signal connected to TC17 are signals that can change the function according to the type of the attached accessory 200. For example, when the accessory 200 is a microphone device, the signal communicated via TC 15 is an audio data signal. When the accessory 200 is an illumination (strobe or flash) unit, the signal communicated via TC14 is a signal for controlling the light emission timing. Depending on the type of the attached accessory, a signal that realizes a different function may be communicated via the same contact. For example, when the accessory 200 is an accessory other than the illumination unit, a synchronization signal for controlling a timing different from the light emission timing may be communicated via TC14. TC14 to TC17 correspond to functional signal contacts. A communication using at least one of the functional signal contacts is also referred to as a functional signal communication.

The functional signal communication can execute a communication at a timing that does not depend on the I2C communication or the SPI communication in parallel with the I2C communication and the SPI communication.

The type of the accessory, as used herein, means the above-mentioned microphone device, illumination unit, and the like. Accessories that achieve the same purpose, such as illuminations with different performances, belong to the same type. Accessories that achieve different purposes, such as a microphone device and an illumination unit, belong to different types.

The functional signal communication is executed based on the information acquired by the I2C communication or the SPI communication.

TC18 as a second grounded contact (reference potential contact) is also connected to GND, and is a contact that serves as a reference potential between the camera 100 and the accessory 200, similar to TC04.

A differential signal D2N connected to TC19 (first differential signal contact) and a differential signal D2P connected to TC20 (second differential signal contact) are paired data communication signals that perform a data communication and connected to the camera control circuit 101. For example, the USB communication can be performed via TC19 and TC20.

TC21 is connected to GND and can be used not only as a contact for a reference potential but also as a contact for controlling the wiring impedance of the differential signals D2N and D2P. TC21 corresponds to a fourth grounded contact. The contacts TC01, TC04, TC06, TC18, and TC21 are connected, for example, to a GND portion of a flexible substrate 158 illustrated in FIGS. 17A and 17B, which will be described later, and the GND portion of the flexible substrate 158 is fixed with a metallic member having a GND level of the camera 100 by a screw 157 or the like. The metallic member having the GND level includes, for example, an engagement member 151, an unillustrated base plate inside the camera 100, and the like.

This embodiment disposes the attachment detection contact TC06 to which the accessory attachment detection signal/ACC_DET is connected is arranged, next to the contact (first clock contact) TC07 that transmits SCLK (first clock signal) as a clock signal. In general, a noise (clock noise) due to the potential fluctuation of the clock signal is transmitted to a contact adjacent to the contact of the clock signal, which may cause a malfunction. In particular, in a configuration having a large number of contacts and a short distance between contacts as in this embodiment, the influence is more significant. Accordingly, disposing the attachment detection contact TC06 next to the SCLK contact TC07 can suppress the influence of the clock noise.

The accessory attachment detection signal/ACC_DET is pulled up before the accessory is attached, but is set to the GND potential after the accessory is attached. On the other hand, the SCLK contact TC07 that transmits the clock signal does not transmit the clock signal before the accessory is attached, and thus the potential does not fluctuate. The potential fluctuates because the clock signal is transmitted only after the accessory is attached.

When the SCLK contact TC07 transmits the clock signal, the attachment detection contact TC06 is at the GND potential. Therefore, even if the attachment detection contact TC06 receives the clock noises, the potential of the control circuit of the camera 100 or the accessory 200 is less likely to fluctuate, so that the malfunction can be prevented. In addition, the clock noise can be restrained from transmitting to a position distant farther than the attachment detection contact TC06. As a result, since it is unnecessary to dispose the GND terminal, the influence of the clock noises can be suppressed without increasing the number of contacts.

SCL (second clock signal) as a clock signal is also transmitted to the contact (second clock contact) TC13. However, the frequency of SCLK transmitted to the SCLK contact TC07 is higher than that of SCL, and the SCLK contact TC07 generates more clock noises than the SCL contact TC13. Therefore, disposing the attachment detection contact TC06 next to the SCLK contact TC07 rather than next to the SCL contact TC13 can provide a greater effect of preventing the malfunction due to the clock noises.

In addition to the difference in frequency, SCL transmitted by the SCL contact TC13 is a clock signal of the I2C communication standard, and the voltage fluctuation of the signal line is driven by the open drain connection. On the other hand, SCLK transmitted by the SCLK contact TC07 is a clock signal pursuant to the SPI communication standard, and the voltage fluctuation of the signal line is driven by the CMOS output. Therefore, the SCL contact TC13 tends to have a gentler edge of the voltage fluctuation than the SCLK contact TC07, and the clock noises are less likely to occur. Thus, disposing the attachment detection contact TC06 next to the SCLK contact TC07 rather than next to the SCL contact TC13 is more effective in preventing the malfunction caused by the clock noises.

The differential signals DIN and DIP may be transmitted in pairs to the first and second differential signal contacts TC19 and TC20 to transmit the clock signal. At that time, a clock signal (third clock signal) having a frequency higher than that of the SCLK contact TC07 or the SCL contact TC13 may be transmitted. Since the differential signals DIN and DIP are paired signals, the emission of the clock noise is smaller than that of the SCLK contact TC07 or the SCL contact TC13 that transmits a single-ended signal. Therefore, disposing the attachment detection contact TC06 next to the SCLK contact TC07 rather than next to the first and second differential signal contacts TC19 and TC20 can more effectively prevent the malfunction caused by the clock noise.

The contact (first data contact) TC08 disposed on an opposite side of the attachment detection contact TC06 with respect to the SCLK contact TC07 transmits MOSI (first data signal). Since MOSI is a data signal, it appears to be susceptible to clock noises. Since MOSI is a data signal of the same SPI communication standard as the clock signal transmitted by the SCLK contact TC07, the fluctuation timing of the potential is synchronized with the clock signal and is less affected by the clock noise. Therefore, the contact TC08 does not have to be fixed to the GND potential and can be used as a MOSI contact.

The accessory 200 has a battery 205 and receives the power supply from the battery 205 and also receives the power supply from the camera 100 via the camera connector 141 and the accessory connector 211. An accessory control circuit 201 as a control means of the accessory 200 is a circuit that controls the entire accessory 200, and is a microcomputer having a built-in CPU and the like.

An accessory power supply circuit 202 is a circuit that generates a power supply to be supplied to each circuit of the accessory 200, and includes a DC/DC converter circuit, an LDO, a charge pump circuit, and the like. The voltage 1.8 V generated by the accessory power supply circuit 202 is constantly supplied as an accessory microcomputer power supply VMCU_A to the accessory control circuit 201. Turning on and off of the power supply to each circuit of the accessory 200 is controlled by controlling the accessory power supply circuit 202.

A charging circuit 204 is a circuit for charging the battery 205 using the power supplied from the camera 100. When it can be determined that the sufficient power is supplied from the camera 100 to perform the charging operation, the accessory control circuit 201 controls the charging circuit 204 to charge the battery 205. Although the battery 205 attached to the accessory 200 has been described in this embodiment, the accessory 200 may operate only with the power supply from the camera 100 without the battery 205. In this case, no charging circuit 204 is necessary.

A differential communication circuit 207 is a circuit for performing a differential communication with the camera 100, and can transmit and receive data to and from the camera 100. An external communication IF circuit 208 is an IF circuit for performing a data communication with an unillustrated external device, such as an Ethernet communication IF, a wireless LAN communication IF, and a public network communication IF.

The accessory control circuit 201 controls the differential communication circuit 207 and the external communication IF circuit 208 and thereby can transmit the data received from the camera 100 to the external device or the data received from the external device to the camera 100. A functional circuit 206 is a circuit having a different function depending on the type of the accessory 200. A configuration example of the functional circuit 206 will be described later.

An external connection terminal 209 is a connector terminal connectable to an external device, and is a USB TYPE-C connector in this embodiment. A connection detecting circuit 210 is a circuit for detecting that an external device is connected to the external connection terminal 209, and the accessory control circuit 201 can detect that the external device has been connected to the external connection terminal 209 by receiving the output signal of the connection detecting circuit 210.

A power switch 203 is a switch for turning on and off the operation of the accessory 200, and the accessory control circuit 201 can detect the ON position and the OFF position by reading the signal level of the terminal to which the power switch 203 is connected.

The accessory connector 211 is a connector electrically connectable to the camera 100 via the 21 contacts TA01 to TA21 that are arranged in a row. The contacts TA01 to TA21 are arranged in this order from one end to the other end in the arrangement direction.

TA01 is connected to GND and serves not only as a contact of the reference potential but also as a contact for controlling the wiring impedance of the differential signals DIN and DIP. TA01 corresponds to a third grounded contact.

The differential signal DIN connected to TA02 and the differential signal DIP connected to TA03 are paired data communication signals for the data communication, and are connected to the differential communication circuit 207. TA02, TA03, TA07 to TA17, TA19, and TA20 described later are communication contacts.

TA04 as the first grounded contact is connected to GND and serves as a reference potential contact between the camera 100 and the accessory 200. TA04 is located outside TA05 described below in the contact arrangement direction.

The accessory power supply circuit 202 and the charging circuit 204 are connected to TA05 as the power supply contact, and the accessory power supply VACC supplied from the camera 100 is connected to it.

TA06 as an attachment detection contact is directly connected to GND, and turns the accessory attachment detection signal/ACC_DET described above into the GND level as the Lo level when the accessory 200 is attached to the camera 100. Thereby, it becomes it serves as a contact for causing the camera 100 to detect the attachment of the accessory 200.

SCLK connected to TA07, MOSI connected to TA08, MISO connected to TA09, and CS connected to TA10 are signals for the accessory control circuit 201 to act as a communication slave and perform the SPI communication.

The communication request signal/WAKE for requesting the communication from the accessory control circuit 201 to the camera 100 is connected to TA11. When the accessory control circuit 201 outputs the communication request signal/WAKE at the Lo level and requests the camera 100 for the communication when determining that the communication with the camera 100 is necessary.

When the power is supplied from the camera control circuit 101 to the accessory 200 via TC5 in response to detecting that the accessory 200 is in the attached state, the accessory control circuit 201 notifies the camera control circuit 101 of the reception of the power supply by changing the signal level (potential) of the communication request signal/WAKE from the Hi level to the Lo level.

The accessory control circuit 201 notifies that the accessory 200 has a cause of the communication with the camera 100 by changing the signal level (potential) of the communication request signal/WAKE from the Hi level to the Lo level even without any requests from the camera. With this configuration, the camera control circuit 101 can omit the operation of periodically checking whether or not the accessory 200 has a cause of the communication through polling. In addition, when the accessary 200 has the cause of the communication, the accessory 200 can communicate the fact to the camera 100 on a real-time basis.

SDA connected to TA12 and SCL connected to TA13 are signals for the accessory control circuit 201 to act as a communication slave and perform the I2C communication.

The FNC1 signal connected to TA14 (synchronous contact), the FNC2 signal connected to TA15, the FNC3 signal connected to TA16, and the FNC4 signal connected to TA17 are signals whose functions can be changed according to the type of the accessory 200. For example, when the accessory 200 is a microphone device, it is an audio data signal, and when the accessory 200 is a strobe device, it is a signal for controlling the light emission timing. TA14 to TA17 correspond to functional signal contacts.

TA18 as the second grounded contact (reference potential contact) is also connected to GND, and serves as a reference potential contact between the camera 100 and the accessory 200, similar to TA04.

The differential signal D2N connected to TA19 (first differential signal contact) and the differential signal D2P connected to TA20 (second differential signal contact) are paired data communication signals for the data communication and connected to the external connection terminal 209.

TA21 is connected to GND and serves not only as a contact for a reference potential but also as a terminal for controlling the wiring impedance of the differential signals D2N and D2P. TA21 corresponds to a fourth grounded contact.

Figure 19A:
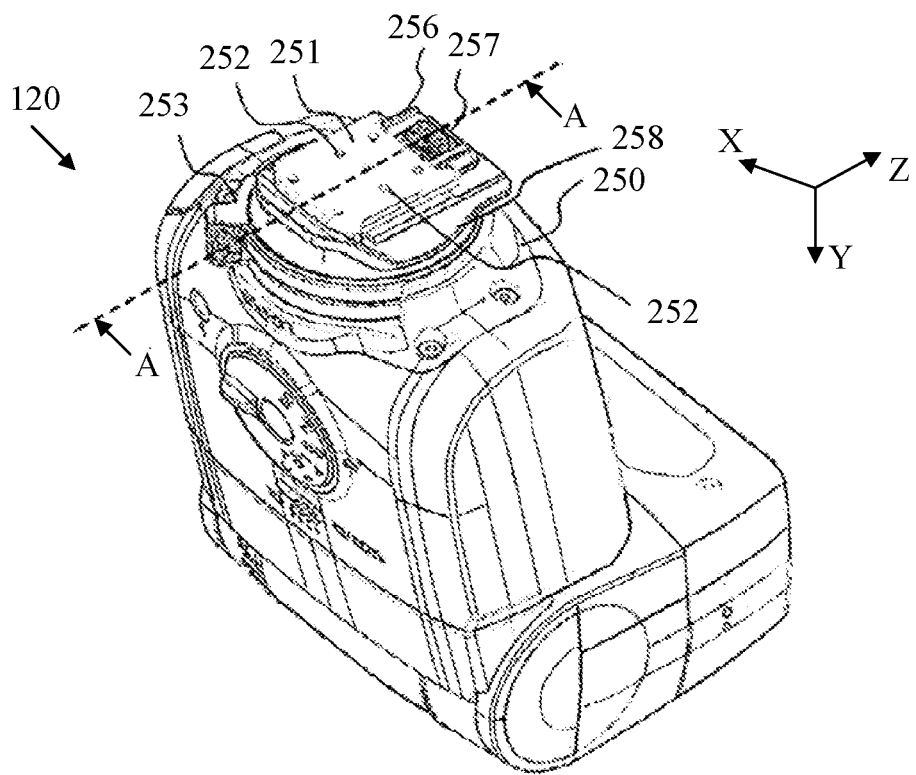
FIGS. 19A and 19B are a perspective view and a sectional view of the external flash unit according to the embodiment.

The contacts TA01, TA04, TA06, TA18, and TA21 are connected, for example, to the GND portion of the flexible substrate 259 illustrated in FIGS. 19A and 19B, which will be described later, and the GND portion of the flexible substrate 259 is fixed to a metallic member having a GND level of the accessory 200 with an unillustrated screw etc. The metallic member having the GND level includes, for example, a shoe attachment leg 251 and an unillustrated base plate inside the accessory 200.

FIG. 2A illustrates that the accessory connector 211 disposed on the shoe provided on the lower part of the accessory (strobe device) 200 is connected to the camera connector 141 disposed on the accessory shoe provided at the top of the camera 100. FIG. 2B illustrates an arrangement example of the 21 contacts TC01 to TC21 in the camera connector 141. TC01 is disposed at the right end viewed from the object side, and the 21 contacts up to TC21 are arranged in a row. The accessory shoe is attached by sliding it from the top side to the bottom side in FIG. 2B relative to the accessory shoe having the camera connector 141.

FIG. 2C illustrates an arrangement example of the 21 contacts TA01 to TA21 in the accessory connector 211. Similar to the camera connector 141, TA01 is disposed at the right end viewed from the object side, and the 21 contacts up to TA21 are arranged in a row. Usually, the contacts TA01 to TA21 and the corresponding contacts TC01 to TC21 are connected to each other. However, if an excessive static pressure or impact is applied to the accessory 200, the contacts may be disconnected. In particular, when a force in the rotational direction acts on the direction in which the contacts are arranged in the accessory 200, the disconnection is likely to occur at the end contacts.

Figure 3A:
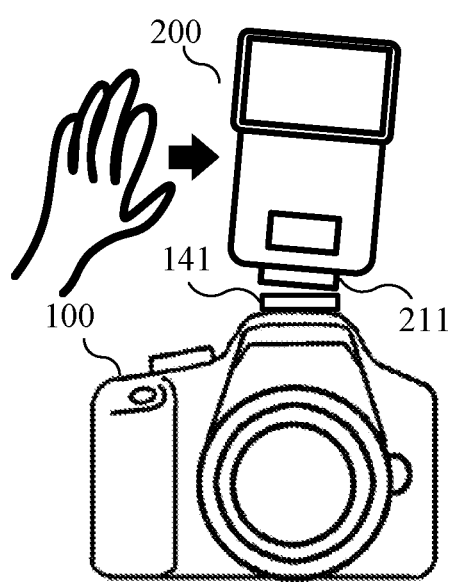
FIGS. 3A and 3B illustrate how an external force is applied to the accessory attached to the camera according to the embodiment.

FIG. 3A exaggerates the appearance of the excessive static pressure applied to the accessory 200 from the left side viewed from the object side. At this time, a force acts on the contacts TC21 and TA21 and the neighboring contacts of the camera connector 141 and the accessory connector 211 in the disconnecting direction, and a poor connection is likely to occur. On the other hand, a stronger force acts on the contacts TC01 and TA01 and the neighboring contacts in the connecting direction than that in the normal state.

Figure 3B:
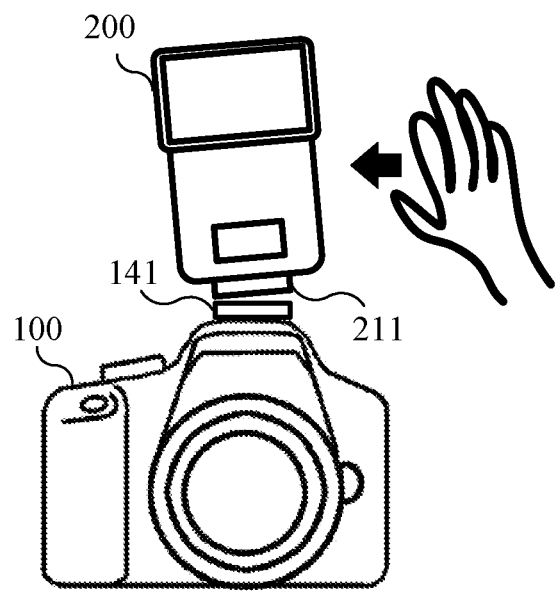

FIG. 3B exaggerates the appearance of the excessive static pressure applied to the accessory 200 from the right side viewed from the object side. At this time, a force acts on the contacts TC01 and TA01 and the neighboring contacts of the camera connector 141 and the accessory connector 211 in the disconnecting direction, and a poor connection is likely to occur. On the other hand, a stronger force acts on the contacts TC21 and TA21 and the neighboring contacts in the connecting directions than that in the normal state.

This embodiment connects to GND the contacts TC01 and TA01 and TC21 and TA21 at both ends of the camera connector 141 and the accessory connector 211. Thereby, even if a poor connection temporarily occurs at the contact at one end due to the excessive static pressure, the GND connection can be secured at the contact at the other end. Therefore, this configuration can restrain each circuit and electric element from getting damaged as a result of that the reference potential of the accessory 200 becomes unstable due to the poor GND connection.

When the accessory 200 in which part of the GND contacts is missing is attached due to a defect and breakdown of the accessory connector 211 or the like, the camera control circuit 101 cannot detect that the part of the GND contacts is missing. In such a case, the operating current concentrates on the remaining GND contacts, and the accessory 200 may malfunction in some cases.

Figure 4A:
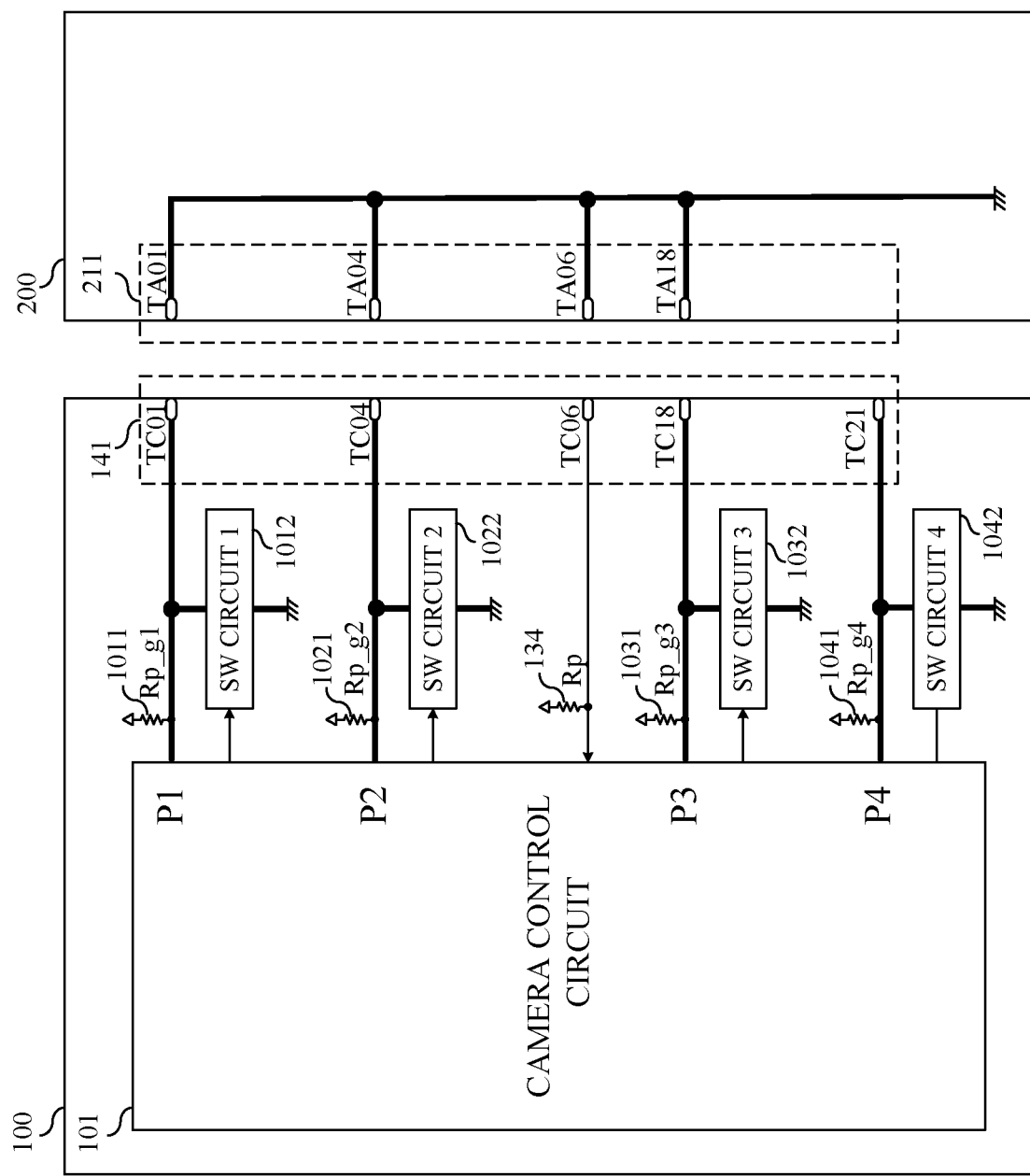
FIG. 4A is a diagram illustrating a configuration for determining a connection state of a grounded contact according to the embodiment.

FIG. 4A is a configuration example for allowing the camera 100 to detect the connection state of the GND contact of the accessory 200, and illustrates extracted part relating to the grounded contact from the configuration illustrated in FIG. 1.

TC01, TC04, TC18, and TC21 are connected to input terminals P1, P2, P3, and P4 of the camera control circuit 101, respectively, and pulled to the camera microcomputer power supply VMCU_C via resistors 1011Rp_g1, 1021Rp_g2, 1031Rp_g3, and 1041Rp_g4, respectively. An SW circuit 1 (1012), an SW circuit 2 (1022), an SW circuit 3 (1032), and an SW circuit 4 (1042) are connected to TC01, TC04, TC18, and TC21, respectively.

The SW circuit 1 is a switching circuit driven by the control signal of the camera control circuit 101, and when it is turned on by the control signal, TC01 is connected to GND. It is desirable that the SW circuit 1 includes, for example, an FET, or a circuit that has impedance that is as small as possible when the operation is turned on, and the impedance that is as large as possible when the operation is turned off. Each of the SW circuits 2, 3, and 4 also has the same configuration as that of the SW circuit 1 as illustrated in FIG. 4A.

Figure 4B:
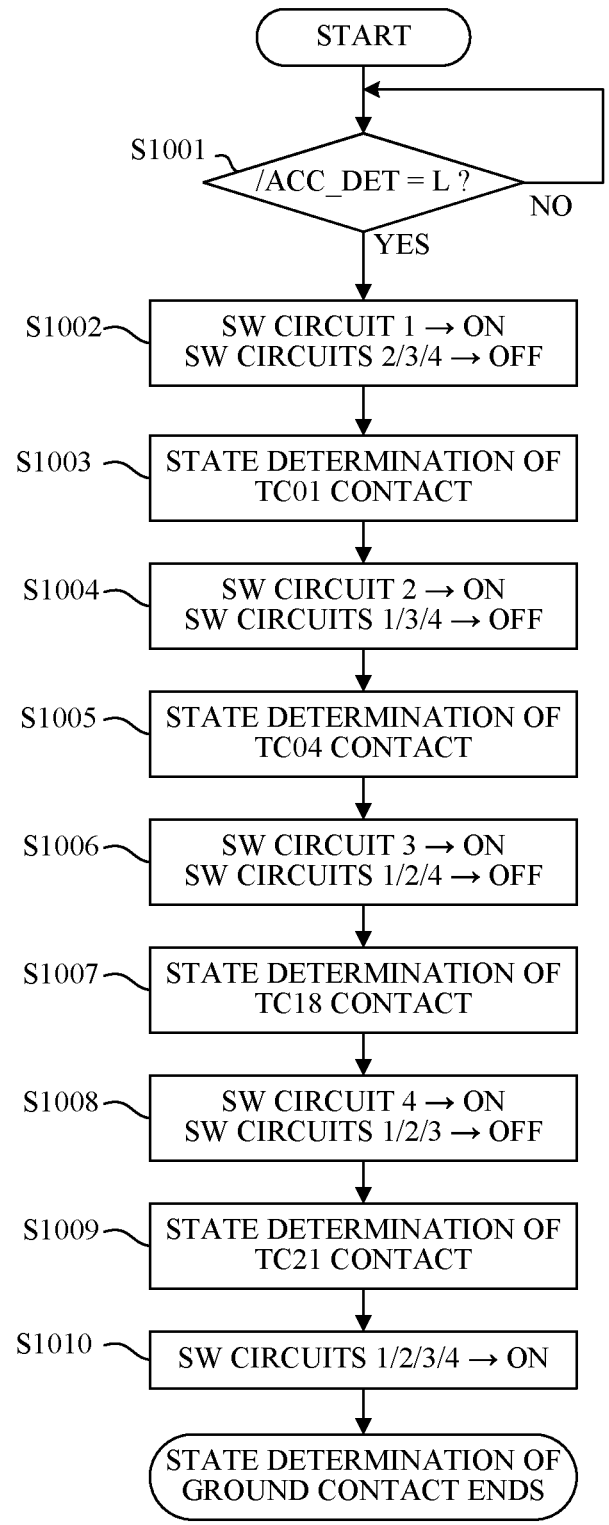
FIG. 4B is a flowchart showing processing executed by the camera according to the embodiment.

A flowchart of FIG. 4B shows a sequence for determining the connection state of the grounded terminal in the configuration illustrated in FIG. 4A. The camera control circuit 101 executes this processing and other processing described later according to a computer program. S means the step.

In S1001, the camera control circuit 101 monitors the signal level of the accessory attachment detection signal/ACC_DET and determines whether or not the accessory 200 is attached. If the signal level is Hi, the camera control circuit 101 returns to S1001 and performs the detection again, assuming that the accessory 200 is not attached, and if the signal level is Lo, it proceeds to S1002 assuming that the accessory 200 is attached.

In S1002, the camera control circuit 101 makes such a control that the SW circuit 1 is turned on and the SW circuits 2, 3, and 4 are turned off, respectively.

In S1003, the camera control circuit 101 confirms the voltage level of the input terminal P1, and determines that TC01 is connected to the grounded contact if it is a Lo level, and that TC01 is not connected to the grounded contact if it is a Hi level.

Next, in S1004, the camera control circuit 101 makes such a control that the SW circuit 2 is turned on and the SW circuits 1, 3, and 4 are turned off, respectively.

In S1005, the camera control circuit 101 confirms the voltage level of the input terminal P2, and determines that TC04 is connected to the grounded contact if it is a Lo level, and that TC04 is not connected to the grounded contact if it is a Hi level.

Next, in S1006, the camera control circuit 101 makes such a control that the SW circuit 3 is turned on and the SW circuits 1, 2, and 4 are turned off, respectively.

In S1007, the camera control circuit 101 confirms the voltage level of the input terminal P3, and determines that TC18 is connected to the grounded contact if it is a Lo level, and that TC18 is not connected to the grounded contact if it is a Hi level.

Next, in S1008, the camera control circuit 101 makes such a control that the SW circuit 4 is turned on and the SW circuits 1, 2, and 3 are turned off, respectively.

In S1009, the camera control circuit 101 confirms the voltage level of the input terminal P4, and determines that TC18 is connected to the grounded contact if it is a Lo level, and that it is not connected to the grounded contact if it is a Hi level.

In S1010, the camera control circuit 101 makes such a control that the SW circuits 1, 2, 3, and 4 are turned on, respectively.

Such a control enables the camera control circuit 101 to confirm the attachment state of the grounded contact with the attached accessory 200, and to determine whether or not to supply to the accessory power supply circuit 202 and the like based on the ground connection state.

Figure 16A:
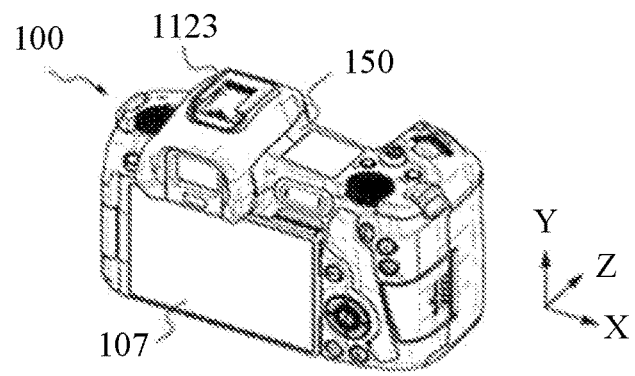
FIGS. 16A, 16B, and 16C are perspective views of the camera and an external flash unit as the accessory according to an embodiment.
Figure 16B:
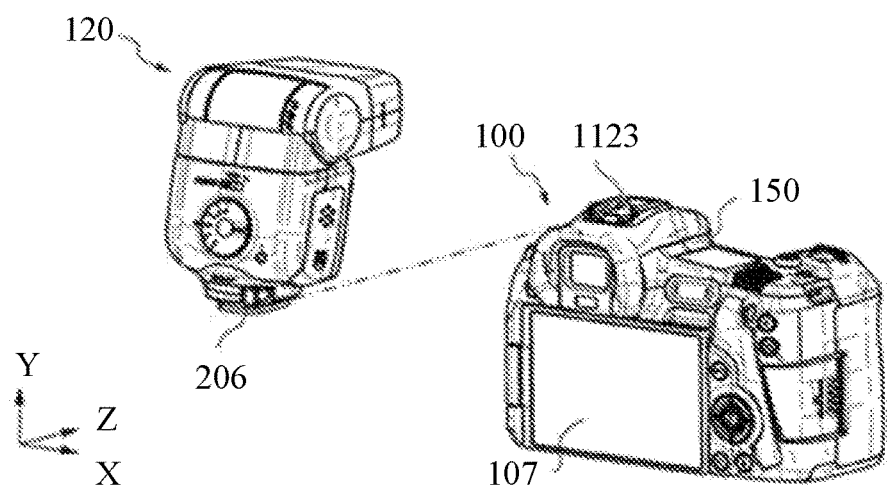
Figure 16C:
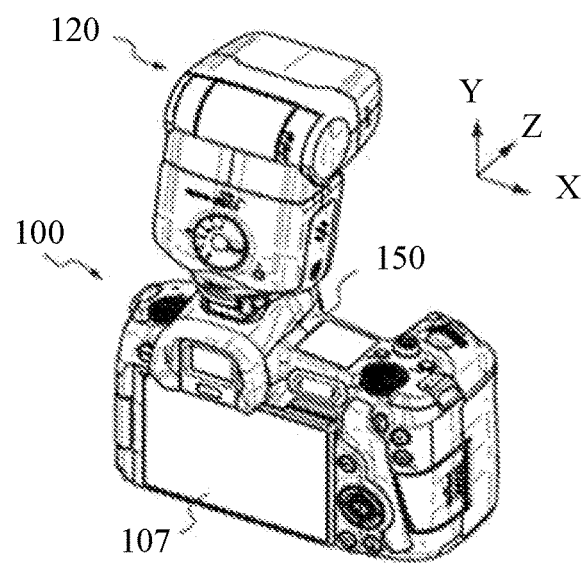

In the meanwhile, if the accessory 200 is tilted to the camera 100 or the like when the accessory 200 is attached to the camera 100, only some of the plurality of contacts TC01 to TC21 and TA01 to TA21 can be connected with each other. As illustrated in FIGS. 16A, 16B, and 16C, where a Z direction is the attachment direction of the accessory 200 to the camera 100, an X direction is a direction in which the plurality of contacts TC01 to TC21 and TA01 to TA21 are aligned, and a Y direction is a direction orthogonal to the X direction and the Z direction, only some of the contacts may be connected in the following cases.

First, as illustrated in FIGS. 3A and 3B, when the accessory 200 is tilted to the camera 100 around an axis parallel to the Z direction, some of the plurality of contacts may be connected with each other on one side where the camera 100 and the accessory 200 are close to each other but some of the plurality of contacts are disconnected from each other on the other side where the camera 100 and the accessory 200 are separated from each other. Although not illustrated, when the accessory 200 is tilted (twisted) to the camera 100 around an axis parallel to the Y direction, some contacts on an opposite side of the plurality of contacts that are connected with each other are separated from each other.

As detailed later with reference to FIGS. 5A and 5B, in the camera 100 and the accessory 200 according to this embodiment, the attachment detection processing is executed prior to various communications while the accessory 200 is attached to the camera 100. At this time, if the attachment detection contacts TC06 and TA06 are connected, the attachment detection processing can be executed. After the attachment detection processing via the contacts TC06 and TA06 is executed, the communication request signal/WAKE is output from the accessory 200 to the camera 100 via the contacts (also referred to as communication request contacts hereinafter) TC11 and TA11. By detecting this communication request signal/WAKE, the camera 100 performs various communications, determining that the accessory 200 is in a communicable state. However, if the camera 100 cannot detect the communication request signal/WAKE even though the attachment of the accessory 200 to the camera 100 is detected, the camera 100 determines that there is a communication error with the accessory 200. If the accessory 200 is tilted or twisted while the accessory 200 is being attached to the camera 100, only some of the contacts are temporarily connected, it is determined that there is a communication error, and error processing, such as an alarm, is performed, the user may misunderstand that the accessory 200 breaks down.

Therefore, this embodiment adopts the contact arrangement so as to reduce the occurrence of a situation in which the camera 100 cannot detect the communication request signal/WAKE even though the attachment of the accessory 200 to the camera 100 is detected.

As described above, when the accessory 200 is tilted to the camera 100 around an axis parallel to the Z direction, the contacts TC01 and TA01 and the neighboring contacts are connected as illustrated in FIG. 3A, and the contacts TC21 and TA21 and the neighboring contacts are disconnected, or the contacts TC21 and TA21 and the neighboring contacts are connected and the contacts TC01 and TA01 and the neighboring contacts are disconnected as illustrated in FIG. 3B.

This embodiment uses the contacts TC06 and TA06 to detect the attachment of the accessory 200 to the camera 100. As illustrated in FIG. 3A, when the contacts TC01 and TA01 are connected with each other, the neighboring contacts TC06 and TA06 are often connected with each other. At this time, if the communication request contacts TC11 and TA11 are located near the distant contacts TC21 and TA21, the camera 100 is unlikely to detect the communication request signal/WAKE even though the attachment of the accessory 200 to the camera 100 is detected.

On the other hand, as illustrated in FIG. 3B, if the contacts TC06 and TA06 are connected with each other while the contacts TC21 and TA21 are connected with each other, and if the contacts TC11 and TA11 are arranged on a side of the contacts TC01 and TA01 distant from the contacts TC06 and TA06, the camera 100 is unlikely to detect the communication request signal/WAKE even though the attachment of the accessory 200 to the camera 100 is detected.

On the other hand, this embodiment adopts the following contact arrangement. As illustrated in FIG. 1, the attachment detection contacts TC06 and TA06 and the communication request contacts TC11 and TA11 are disposed between the contacts TC01 and TA01 closest to one end and the contacts TC21 and TA21 closest to the other end in the direction in which a plurality of contacts TC01 to TC21 and TA01 to TA21 are arranged (referred to as a contact arrangement direction hereinafter). This arrangement relationship will be referred to as a first arrangement relationship. The attachment detection contacts TC06 and TA06 are disposed between the communication request contacts TC11 and TA11 and the contacts TC01 and TA01. This arrangement relationship will be referred to as a second arrangement relationship. Then, in the contact arrangement direction, distances between the attachment detection contacts TC06 and TA06 and the communication request contacts TC11 and TA11 are made shorter than distances between the communication request contacts TC11 and TA11 and the contacts TC21 and TA21. This arrangement relationship will be referred to as a third arrangement relationship. In this embodiment, the contacts TC01 to TC21 and TA01 to TA21 are arranged at regular pitches, so that the distance between the contacts herein can be rephrased as the number of other contacts arranged between these contacts, and a short (or long) distance can be rephrased as a small (or large) number of other contacts.

In this embodiment, the distances between the communication request contacts TC11 and TA11 and the contacts TC01 and TA01 are set to be equal to or less than the distance between the communication request contacts TC11 and TA11 and the contacts TC21 and TA21 in the contact arrangement direction. This arrangement relationship will be referred to as a fourth arrangement relationship. In particular, this embodiment disposes the communication request contacts TC11 and TA11 at the centers between the contacts TC01 to TC21 and TC01 to TC21, and makes equal to each other the distances between the communication request contacts TC11 and TA11 and the contacts TC01 and TA01, and the distances between the communication request contacts TC11 and TA11 and the contacts TC21 and TA21. The communication request contacts TC11 and TA11 do not necessarily have to be disposed at the centers between the contacts TC01 to TC21 and TC01 to TC21, but they are preferably disposed near the centers.

This embodiment makes the distances between the attachment detection contacts TC06 and TA06 and the contacts TC01 and TA01 equal to or greater than the distances between the attachment detection contacts TC06 and TA06 and the communication request contacts TC11 and TA11 in the contact arrangement direction. This arrangement relationship will be referred to as a fifth arrangement relationship. In particular, this embodiment disposes the attachment detection contacts TC06 and TA06 at the centers between the communication request contacts TC11 and TA11 and the contacts TC01 and TA01, and makes the distances between the attachment detection contacts TC06 and TA06 and the contacts TC01 and TA01 and the distances between the attachment detection contacts TC06 and TA06 and the communication request contacts TC11 and TA11 equal to each other. The attachment detection contacts TC06 and TA06 do not necessarily have to be disposed at the centers between the communication request contacts TC11 and TA11 and the contacts TC01 and TA01, but it is preferable to dispose them near the centers.

With the above contact arrangement, the communication request contacts TC11 and TA11 are highly likely to be connected with each other if the attachment detection contacts TC06 and TA06 are connected with each other in the tilted state illustrated in FIG. 3A, and in the tilted state illustrated in FIG. 3B, even if the communication request contacts TC11 and TA11 are connected with each other, the attachment detection contacts TC06 and TA06 are highly likely to be disconnected with each other. As a result, whichever state the accessory 200 is tilted in, the occurrence of a situation in which the camera 100 cannot detect the communication request signal/WAKE can be reduced even though the attachment of the accessory 200 to the camera 100 is detected.

A description will now be given as a comparative example of a case where the positions of the contacts TC06 and TA06 and the contacts TC11 and TA11 are exchanged. That is, a description will be given of a case where the contacts TC11 and TA11 are used to detect the attachment and the contacts TC06 and TA06 are used to detect the communication request signal/WAKE. In this configuration, when the accessory 200 is tilted to the camera 100 and the contacts TC01 and TA01 and the neighboring contacts are disconnected from each other, the contacts TC11 and TA11 for the attachment detection may be connected with each other but the contacts TC06 and TA06 for the communication request signal/WAKE may be disconnected from each other, resulting in a communication error.

Therefore, in order to avoid the communication error, it is preferable to dispose the attachment detection contact on one end side in the contact arrangement direction rather than the contacts for the communication request signal/WAKE as in this embodiment.

As illustrated in FIGS. 20A to 20C and 23, which will be described later, in a configuration where the accessory 200 holds a plurality of contacts with a connection plug 256 as a holding member made of a nonconductive material such as a resin material, the connection plug 256 may have a convex shape toward the lower side (contact direction with the camera connector 141) in the drawing. In such a case, the contact on one end side in the contact arrangement direction of the plurality of contacts is likely to be connected but the contact on the other end side is likely to be disconnected. However, the contact arrangement illustrated in this embodiment can reduce an occurrence of a communication error even if some of the contacts are disconnected when the accessory 200 is attached to the camera 100.

As described above, when the accessory 200 is twisted relative to the camera 100 around the axis parallel to the Y direction, some contacts on one end side in the contact arrangement direction of the plurality of contacts may be connected, but the other contacts on the other end side may be disconnected. When such a state occurs in the process of attaching the accessory 200 to the camera 100, the connection timings shift among the plurality of contacts. If the contact timing significantly shifts, a time lag from the attachment detection of the accessory 200 to the camera 100 to the detection of WAKE becomes long, and consequently a communication error may be determined. At this time, depending on the twisting direction of the accessory 200, the side of the contacts TC01 and TA01 or the side of the contacts TC21 and TA21 starts to be connected first.

When the side of the contacts TC01 and TA01 starts to be connected, the closer the communication request contacts TC11 and TA11 are to the contacts TC21 and TA21, the longer the time lag becomes from the attachment detection of the accessory 200 to the detection of the communication request signal/WAKE. The longer the time lag is, the more easily a communication error is determined. On the other hand, when the side of the contacts TC21 and TA21 starts to be connected and the communication request contacts TC11 and TA11 are disposed on the side of the contacts TC01 and TA01 of the attachment detection contacts TC06 and TA06, a time lag occurs from the attachment detection of the accessory 200 to the detection of the communication request signal/WAKE.

On the other hand, this embodiment adopts the above contact arrangement, and shortens a time lag from the attachment detection of the accessory 200 to the detection of the communication request signal/WAKE, regardless of which side of the contacts starts to be connected.

This embodiment disposes at positions between the attachment detection contacts TC06 and TA06 and the communication request contacts TC11 and TA11 the contacts TC07 and TA07 to TC10 and TA10 used for the SPI communication (communication in the second communication method) between the camera 100 and the accessory 200. The contacts TC12, TA12, TC13, and TA13 used for the I2C communication (communication in the first communication method) between the camera 100 and the accessory 200 are disposed at positions close to the communication request contacts TC11 and TA11 on the opposite side of the attachment detection contacts TC06 and TA06.

The communication between the camera 100 and the accessory 200 is executed after the camera 100 detects the communication request signal/WAKE. Therefore, until the communication between the camera 100 and the accessory 200 is executed, the connection of the contacts used for the communication is not confirmed. On the other hand, in this embodiment, if the attachment detection contacts TC06 and TA06 and the communication request contacts TC11 and TA11 are connected with each other, the communication contacts TC07, TA07 to TC10, TA10, TC12, TA12, TC13, and TA13 arranged near and between them, respectively, can be considered to be connected.

Since it can be considered that the positions between the attachment detection contacts TC06 and TA06 and the communication request contacts TC11 and TA11 are more reliably connected, the contacts used for the SPI communication executed after the I2C communication are preferably disposed at positions between the attachment detection contacts TC06 and TA06 and the communication request contacts TC11 and TA11.

Figure 12:
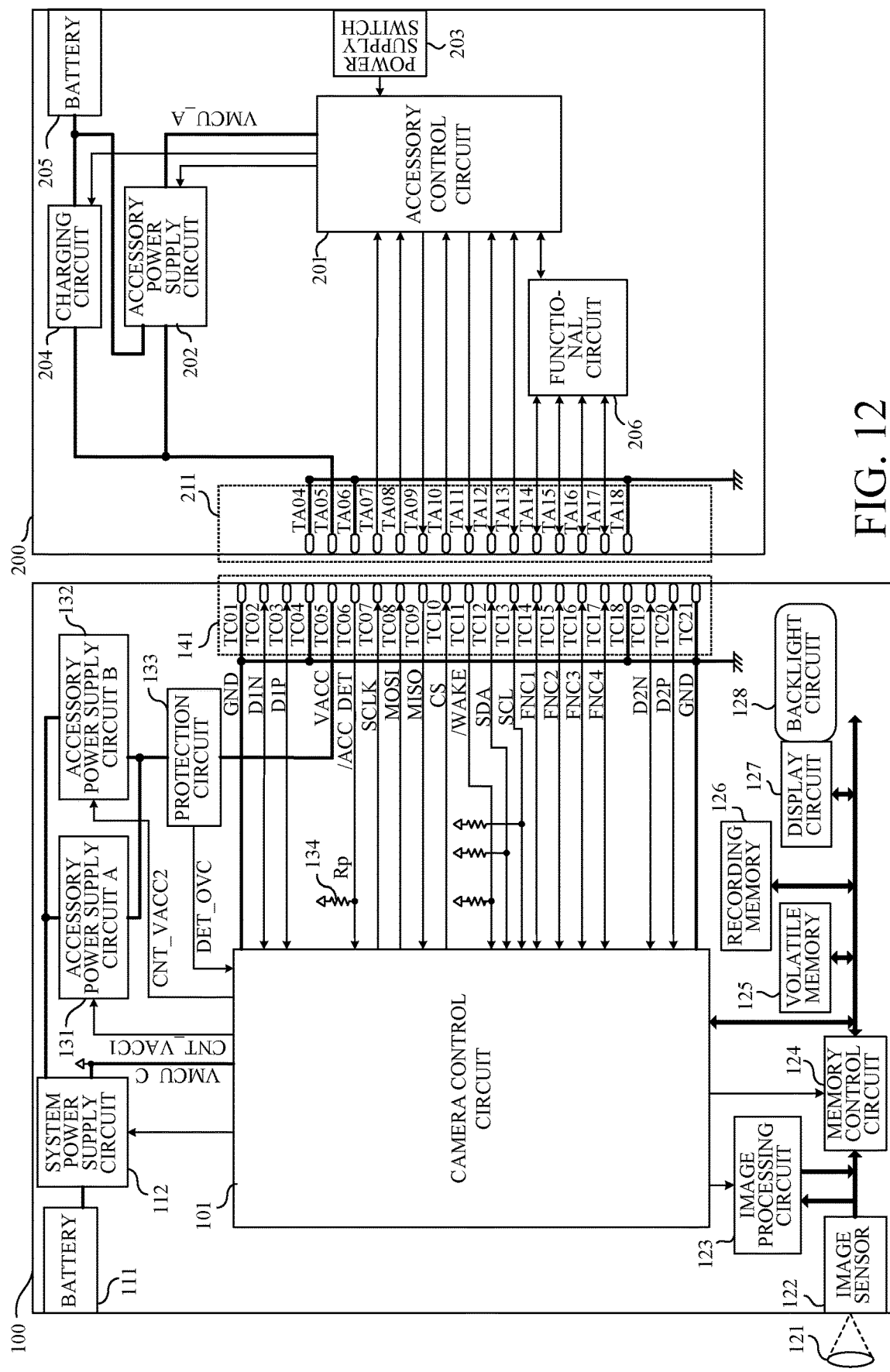
FIG. 12 is a diagram illustrating a configuration example of the accessory according to the embodiment.

As illustrated in FIG. 4, and FIGS. 12 and 20 which will be used later for the explanation, a configuration in which the number of contacts is smaller than that of the camera 100 is conceivable as the configuration of the accessory 200. Even in this configuration, the attachment detection contact and the communication request contact are necessary contacts, and the attachment detection contact and the communication request contact may be arranged under an idea similar to the configuration in which the number of contacts is equal to that of the camera 100. However, a part of the above-mentioned first to fifth arrangement relationships may not be satisfied.

For example, in the configuration having no contact TA21 as illustrated in FIG. 4, a distance between the communication request contact TA11 and the contact TA01 is longer than a distance between the communication request contact TA11 and the contact TA20 in the contact arrangement direction. That is, the fourth arrangement relationship is not satisfied. For example, in a configuration having no contacts TA01 to TA03 and TA19 to 21 as illustrated in FIG. 12, a distance between the attachment detection contact TA06 and the contact TA04 in the contact arrangement direction is shorter than a distance between the attachment detection contact TA06 and the communication request contact TA11. That is, the fifth arrangement relationship is not satisfied.

As described above, in a configuration in which the position of the contact position at the end of the accessory 200 is different from the contact position at the end of the camera 100, part of the first to fifth arrangement relationships may not be satisfied. In such a case, it is assumed that the position facing the contact at the end of the camera 100 in the attached state is the position of the contact at the end of the accessory 200, and the attachment detection contact and the communication request contact may be arranged so as to satisfy the first to fifth arrangement relationships. Alternatively, as in the protrusion 256a illustrated in FIGS. 20A, 20B, and 20C, the attachment detection contact and the communication request contact may be arranged so as to satisfy the first to fifth arrangement relationships in consideration of the distance from the protrusion 256a instead of the distance from the contact at the end. A flowchart of FIG. 5A shows processing executed by the camera control circuit 101 when the accessory 200 is attached to the camera 100.

In S401, the camera control circuit 101 as an attachment detection means monitors the signal level of the accessory attachment detection signal/ACC_DET and determines whether or not the accessory 200 is attached. If the signal level is Hi, the camera control circuit 101 returns to S401 and performs the detection again, assuming that the accessory 200 is not attached, and if the signal level is Lo, proceeds to S402 assuming that the accessory 200 is attached.

In S402, the camera control circuit 101 sets a power supply control signal CNT_VACC1 to the Hi level in order to turn on the output of the accessory-use power supply circuit A131, and proceeds to S403. The accessory-use power supply circuit A131 outputs the accessory power supply VACC in response to the power supply control signal CNT_VACC1 becoming Hi.

In S403, the camera control circuit 101 monitors the signal level of the overcurrent detection signal DET_OVC and determines whether or not the overcurrent is flowing. If the signal level is Lo, the camera control circuit 101 proceeds to S404 assuming that no overcurrent flows, and if the signal level is Hi, proceeds to S405 assuming that the overcurrent flows to perform error processing.

Figure 6A:
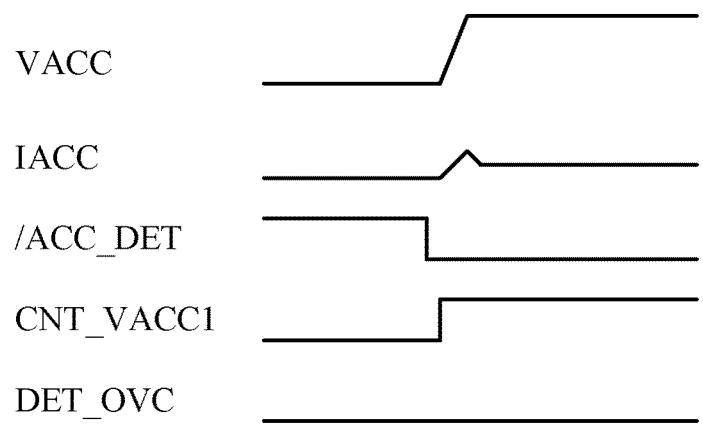
FIGS. 6A, 6B, and 6C show timing charts illustrating a signal change when a contact adjacent to a power supply contact is short-circuited according to the embodiment.

FIG. 6A schematically illustrates a change of the signal when the flow proceeds to S404 in the processing of FIG. 5A. IACC is the current of the accessory power supply VACC. Since the accessory power supply VACC normally leads up after the power supply control signal CNT_VACC1 is set to Hi in S402, the overcurrent detection signal DET_OVC remains at a Lo level.

Figure 6B:
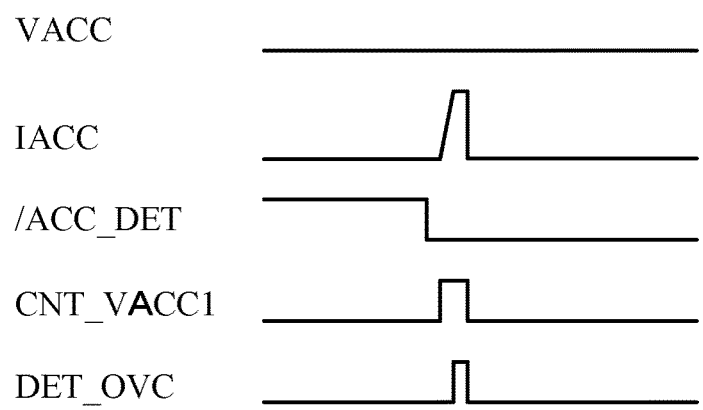

FIG. 6B schematically illustrates a change in the above signal when the flow proceeds to S405 in the processing of FIG. 5A. Since the overcurrent flows through IACC after the power supply control signal CNT_VACC1 is set to Hi in S402, the overcurrent detection signal DET_OVC changes to the Hi level and notifies the camera control circuit 101. Upon receiving the notification of the overcurrent detection signal DET_OVC, the camera control circuit 101 turns off the outputs of the accessory-use power supply circuits A131 and B132 as error processing to stop the power supply to the accessory 200. Thus, even when the overcurrent flows through the accessory power supply VACC, the camera control circuit 101 can detect the overcurrent and safely stop the system.

Usually, in a case where an abnormal current flows through the accessory power supply VACC, it is presumed that the camera 100 and the accessory 200 are out of order, but since the camera connector 141 and the accessory connector 211 are exposed to the outside, and thus the neighboring contacts may be short-circuited due to an adhesion of a foreign matter such as a metal piece.

In this embodiment, the accessory power supply VACC has a voltage of 3.3 V, whereas the camera microcomputer power supply VMCU_C and the accessory microcomputer power supply VMCU_A have a voltage of 1.8 V. Thus, if a voltage of 3.3 V is applied to an electric element operating at a voltage of 1.8 V, the electric element may get damaged. Since the post-short-circuiting behavior depends on the characteristic of the electric element, the camera control circuit 101 may not always be able to detect the short-circuiting between the terminals. For example, since the I2C communication signal is at the Hi level in the communication standby state, even if it is short-circuited with the voltage of 3.3 V equal to and higher than the voltage of 1.8V, the abnormality cannot be detected depending on the characteristic of the electric element of the connection destination.

On the other hand, this embodiment disposes the GND contacts TC04 and TA04 on one of the two sides of the accessory power supply VACC contacts TC05 and TA05, and the contacts TC06 and TA06 of the accessory attachment detection signal/ACC_DET on the other side. As described above, the accessory attachment detection signal/ACC_DET is connected to GND in the accessory 200. Thus, even if short-circuiting occurs between the contacts, the overcurrent can be detected and the system can be safely stopped without applying 3.3 V to the element operating at 1.8 V.

As described above, if the accessory power supply VACC is supplied when the GND contact is not connected, the reference potential of the accessory 200 becomes unstable, and consequently each circuit and the electric element may get damaged. In operating the device, an external force may be applied that makes unstable the connection of the connector terminals. On the other hand, by arranging the accessory power supply VACC contact and the GND contact adjacent to each other as in this embodiment, the connection of only the accessory power supply VACC contact can be more effectively prevented than a case where the accessory power supply VACC contact and the GND contact are separate terminals.

Figure 9:
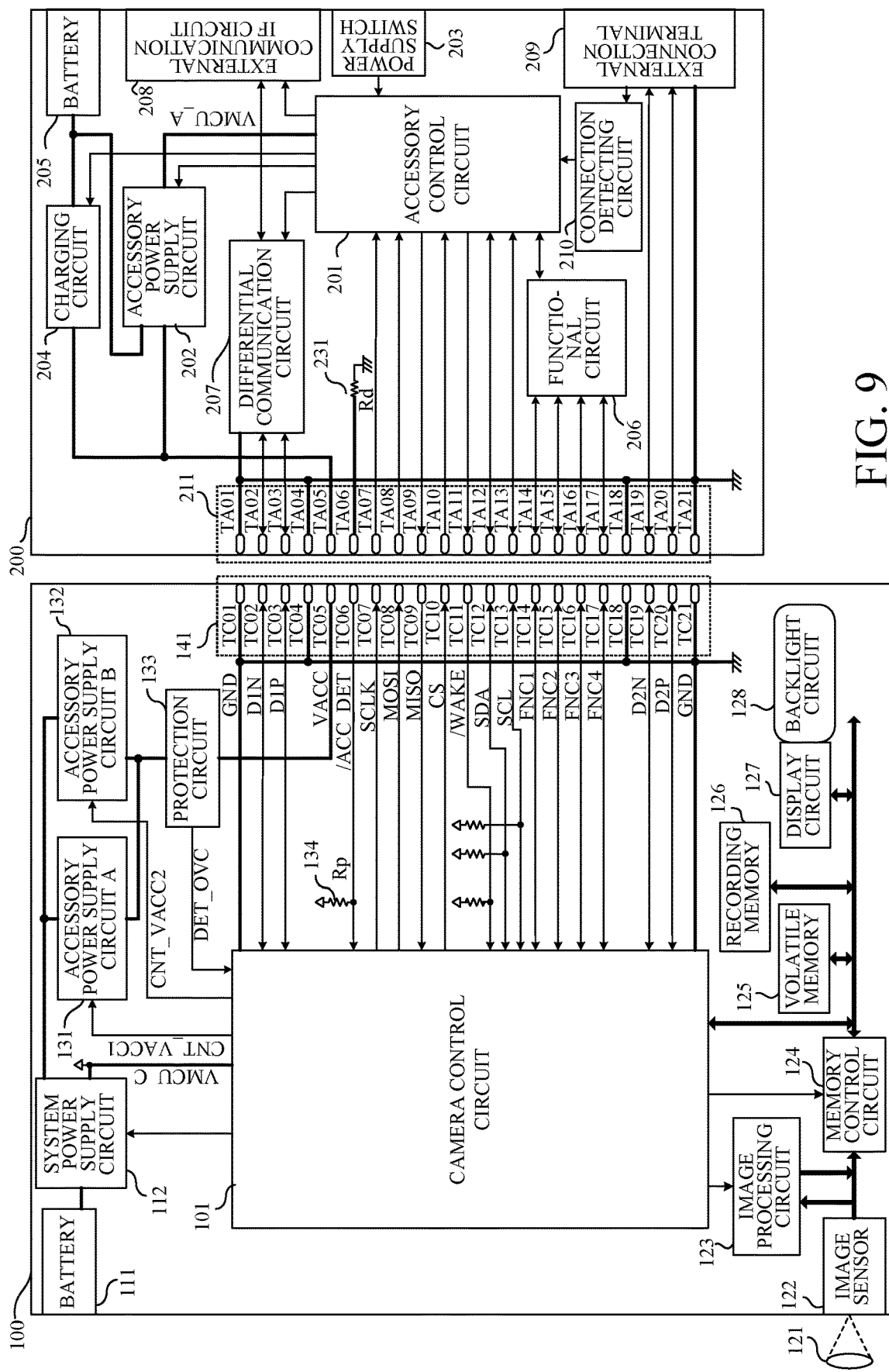
FIG. 9 is a diagram illustrating a configuration example of the camera and the accessory according to the embodiment.

This embodiment connects the accessory attachment detection signal/ACC_DET to GND in the accessory 200, but may connect it to GND via a resistor element Rd231 as in the accessory 200 illustrated in FIG. 9. The short-circuiting current can be reduced by the connection to GND via the resistor element Rd231.

In this case, it is necessary to select the resistor element Rd231 having such a resistance value that a voltage of $(Rd/(Rp+Rd)) \times 1.8$ V obtained by dividing the voltage of 1.8 V of the camera microcomputer power supply VMCU_C by the resistor elements Rp134 and Rd231 satisfies the Lo level threshold (Vil) of the camera control circuit 101. For example, when a Low level detection threshold value (Vil) of the camera control circuit 101 is 0.33 times the power supply voltage, the resistance value of the resistor element Rd231 needs to be half or less of the resistor element Rp134 (10 kΩ). In the example of FIG. 9, the resistance value of the resistor element Rd231 is set to 5 kΩ.

FIG. 5B illustrates processing executed by the camera control circuit 101 when the accessory 200 having the configuration illustrated in FIG. 9 is attached to the camera 100. Since S411 to S413 are the same as S401 to S403 illustrated in FIG. 5A, a description thereof will be omitted.

In S414 after S413, the camera control circuit 101 monitors the signal level of the accessory attachment detection signal/ACC_DET, and determines whether or not the accessory attachment detection signal/ACC_DET contacts TC06 and TA06 are short-circuited with the accessory power supply VACC contacts TC05 and TA05. If the signal level is Lo, the camera control circuit 101 proceeds to S415 assuming that it is not short-circuited, and if the signal level is Hi, proceeds to S416 assuming that it is short-circuited to performs the error processing.

Figure 6C:
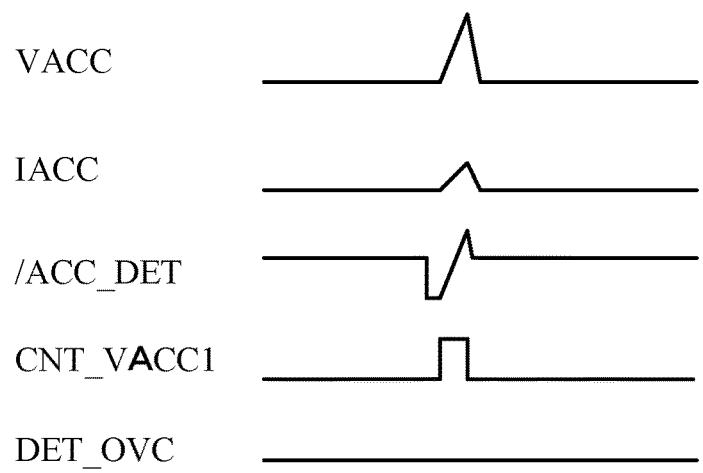

FIG. 6C schematically illustrates the state of the above signal when the accessory power supply VACC and the accessory attachment detection signal/ACC_DET are short-circuited in the accessory 200 having the configuration of FIG. 9 to which the resistor element Rd231 (5 kΩ) is added. After the power supply control signal CNT_VACC1 is set to Hi in S402, no overcurrent flows in IACC because the current is limited by the resistor element Rd231.

On the other hand, the voltage of the accessory power supply VACC is applied to the accessory attachment detection signal/ACC_DET. As soon as the signal level of the accessory attachment detection signal/ACC_DET becomes Hi due to interrupt processing or the like, the camera control circuit 101 sets the power control signal CNT_VACC1 to Lo in the error processing and stops outputting the accessory power supply VACC (power supply to the accessory 200). Thereby, the system can be safely stopped without continuously applying 3.3 V to the terminal of the element operating at 1.8 V.

Figure 10:
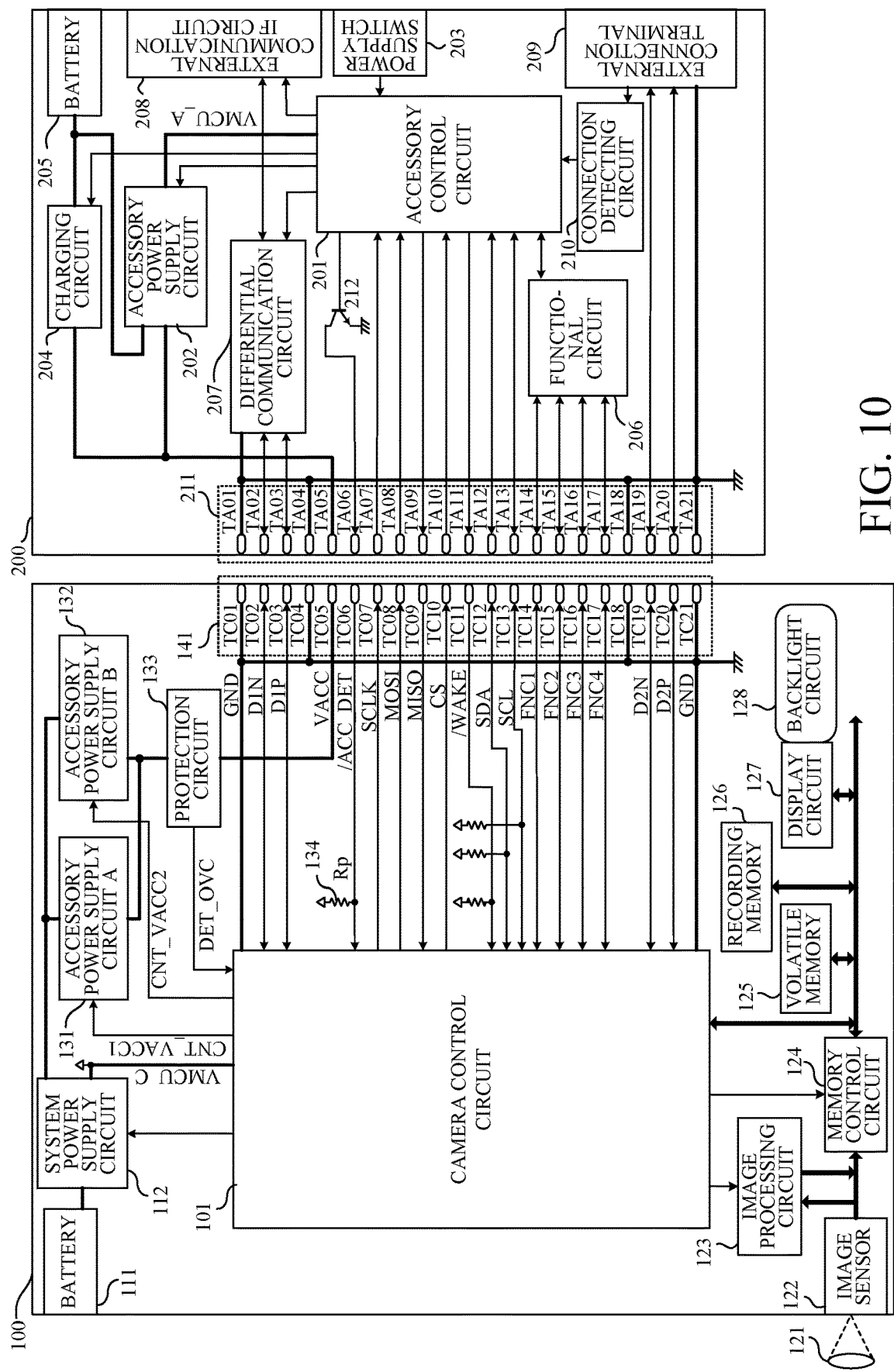
FIG. 10 is a diagram illustrating another configuration example of the camera and accessories according to the embodiment.

As illustrated in FIG. 10, the accessory 200 may be controlled so that the accessory attachment detection signal/ACC_DET becomes a Lo level (GND potential) by the accessory control circuit 201 via an NPN transistor 212 as a switching means. If the accessory 200 is attached to the camera 100 in the configuration illustrated in FIG. 1, the camera control circuit 101 can always detect the accessory 200, but in the configuration illustrated in FIG. 10, the accessory control circuit 201 can notify the attachment of the accessory 200 to the camera 100 at an arbitrary timing.

Figure 11:
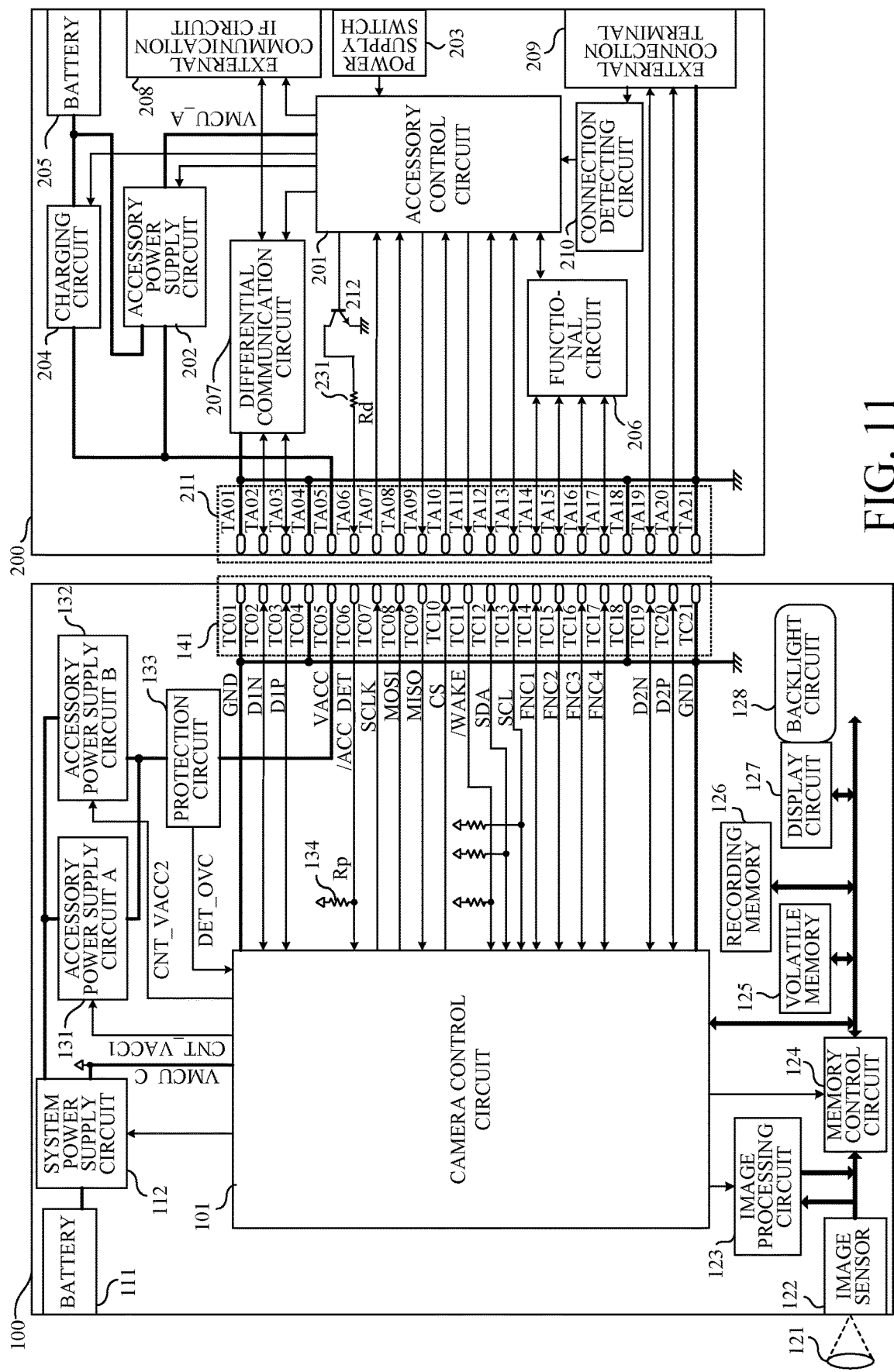
FIG. 11 is a diagram illustrating still another configuration example of the camera and accessories according to the embodiment.

As illustrated in FIG. 11, the accessory 200 may be configured so as to connect the resistor element Rd231 in series with the NPN transistor 212. In this case, the resistance value needs to be half or less of the resistor element Rp134 (10 kΩ) as in the configuration of FIG. 1.

As described above, even if the power supply contact and the adjacent contact are short-circuited, this embodiment can maintain the safety of the system including the camera 100 and the accessory 200, and restrain them from getting damaged.

FIG. 7 illustrates an example of the functions of the FNC1 signal to the FNC4 signal as the functional signals connected to the contacts TC14 to TC17 and the contacts TA14 to TA17 for each type of the accessory 200 (here, the microphone device and the strobe device).

Figure 8A:
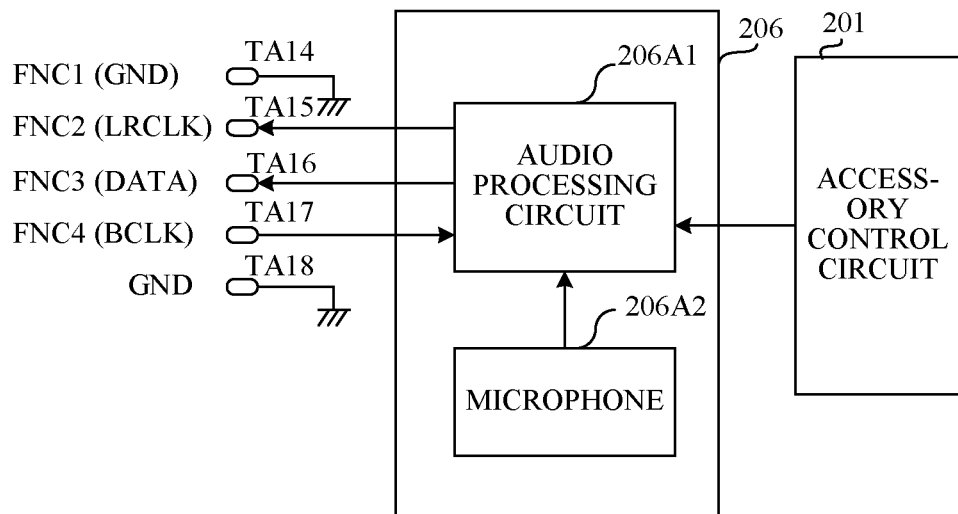
FIGS. 8A, 8B, and 8C illustrate a connection destination configuration of the functional signal according to the embodiment.

In the microphone device, the FNC2 signal to the FNC4 signal are used as a digital audio (I2S: Inter-IC Sound standard) data bus to transfer audio data. FIG. 8A illustrates a configuration example of the functional circuit 206 when the accessory 200 is a microphone device.

An audio processing circuit 206A1 in the functional circuit 206 is a codec circuit that converts an audio signal input from a microphone 206A2 into a digital audio (I2S) data format, and is controlled by the accessory control circuit 201. The accessory control circuit 201 can set the sampling frequency and the resolution by controlling the audio processing circuit 206A1. In this embodiment, the sampling frequency is 48 kHz and the resolution is 32 bits. The microphone 206A2 is, for example, a MEMS-IC microphone or an electret condenser microphone.

TA14 is the FNC1 signal that is not used as an I2S data bus and is connected to GND. In this embodiment, the unused functional signal is connected to GND, but the present invention is not limited to this embodiment, and a connection to a reference potential may be made as the stable potential other than the GND potential (0V) such as the power supply potential and the L level (low potential) or H level (high potential) of the signal.

The FNC2 signal connected to TA15 (DATA contact) is an audio data signal (DATA), which is a signal output from the accessory 200 to the camera 100.

The FNC3 signal connected to TA16 (LRCLK contact) is an audio channel clock signal (LRCLK), which is a signal output from the accessory 200 to the camera 100.

The FNC4 signal connected to TA17 (BCLK contact) is an audio bit clock signal (BCLK), which is a signal output from the camera 100 to the accessory 200.

In this embodiment, since the sampling frequency is 48 kHz and the resolution is 32 bits as described above, the LRCLK frequency is 48 kHz and the BCLK frequency is 3.072 MHz. DATA has a maximum frequency of 1.536 MHz, which is half a cycle of CLK.

In the contact arrangement according to this embodiment, the reference potential contacts TA18 and TC18 connected to the GND potential as the reference potential are disposed next to the contacts TA17 and TC17 to which the FNC4 signal (BCLK) having the highest frequency is connected among the functional signal contacts to which the functional signals are connected. The signal wiring to the accessory shoe interface is generally configured with a flexible substrate. In order to reduce the product cost, the flexible substrate may have a single-sided specification, and the substrate wiring is made in the same arrangement as the contact arrangement. This embodiment disposes the GND contact as the reference potential contact next to the functional signal contact connected to the signal having the highest frequency among the functional signals. This configuration can suppress radiation noises (EMI) from the functional signal contact, interference with signals connected to other contacts, and crosstalk with signals other than the I2S data bus.

This embodiment connects to the GND potential as the reference potential the contacts TA18 and TC18 next to the contacts TA17 and TC17 connected to the FNC4 signal (BCLK) having the highest frequency, but the present invention is not limited to this example and the same effect can be obtained even if the connection is made to a stable reference potential other than the GND potential.

Figure 8B:
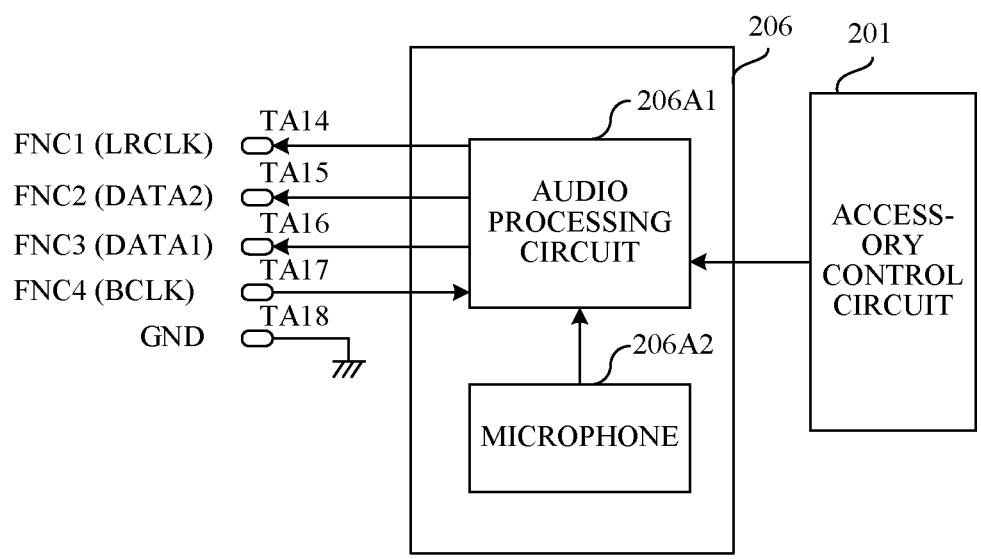

FIG. 8B is an example illustrating a configuration in which audio data is increased relative to FIG. 8A. The purpose of increasing the audio data is to increase the number of channels and the resolution.

The FNC4 signal connected to TA17 is an audio bit clock signal (BCLK), which is the same as that illustrated in FIG. 8A.

On the other hand, the FNC3 signal connected to TA14 is an audio channel clock signal (LRCLK), which is a signal output from the accessory 200 to the camera 100.

The FNC2 signal connected to TA15 is an audio data signal (DATA2), which is a signal output from the accessory 200 to the camera 100.

The FNC1 signal connected to TA16 operates as an audio data signal (DATA2), which is a signal output from the accessory 200 to the camera 100.

In this way, when an audio data signal is added to increase the audio data amount and two signals are used, arranging signals in such order that a higher frequency is disposed closer to the GND terminal can provide a configuration that is relatively highly effective in preventing crosstalk.

Figure 8C:
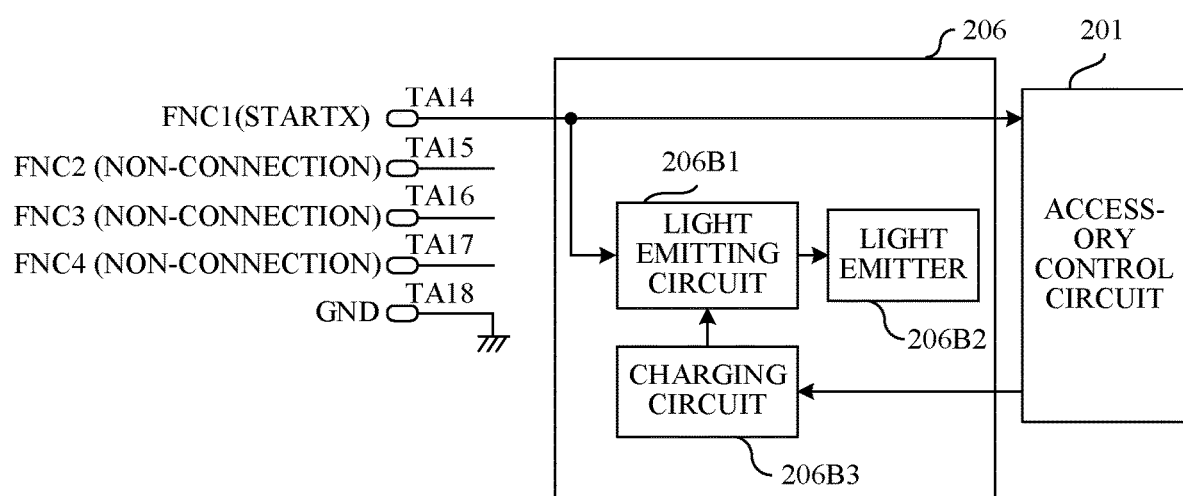

FIG. 8C illustrates a configuration example of the functional circuit 206 when the accessory 200 is a strobe device. A light emitting circuit 206B1 in the functional circuit 206 is a strobe light emitting circuit including an IGBT, a trigger coil, and the like, and controls a light emission of the light emitter 206B2. The light emitter 206B2 includes a xenon tube or the like and emits illumination light to illuminate the object. A charging circuit 206B3 includes a transformer, a switching FET, a capacitor, and the like, and accumulates electric charges for causing the light emitter 206B2 to emit light.

The FNC1 signal connected to TA14 is a light emission synchronization signal (STARTX) for controlling the light emission timing of the light emitter 206B2, and is a signal output from the camera 100 to the accessory 200. The FNC2 signal to the FNC4 signal are not used in the strobe device, and no signal is connected to these contacts.

This embodiment makes unused functional signal contacts disconnected (OPEN), but the present invention is not limited to this embodiment, and a connection to a stable reference potential, such as the power supply potential and the L or H level of the signal, may be made according to the contacts TC15 to TC17 as connection destinations of the contacts TA15 to TA17.

In the strobe device, only the FNC1 signal is used among the functional signals. Although the light emission synchronization signal (STARTX) is not a periodically generated signal, the camera 100 allocates GND to the FNC1 signal when the microphone device is connected so as to prevent the configuration of the camera control circuit 101 from being complicated.

A description will now be given of further features of the contact arrangement according to this embodiment. SDA (first signal) connected to the contacts TC12 and TA12 as the first signal contacts and SCL (second signal) connected to the contacts TC13 and TA13 as the second signal contacts are both signals for the I2C communication. These signals are transmitted by the open drain communication. Since both SDA and SCL are pulled up to the camera microcomputer power supply VMCU_C, they are the signal having a relatively high impedance during the communication standby, and easily subject to crosstalk.

Therefore, this embodiment assigns the communication request signal (fourth signal)/WAKE to the contacts TC11 and TA11 as the fourth signal contacts next to the SDA contacts TC12 and TA12. As described above, the communication request signal/WAKE is a signal for making a communication request from the accessory 200 to the camera 100.

Figure 15A:
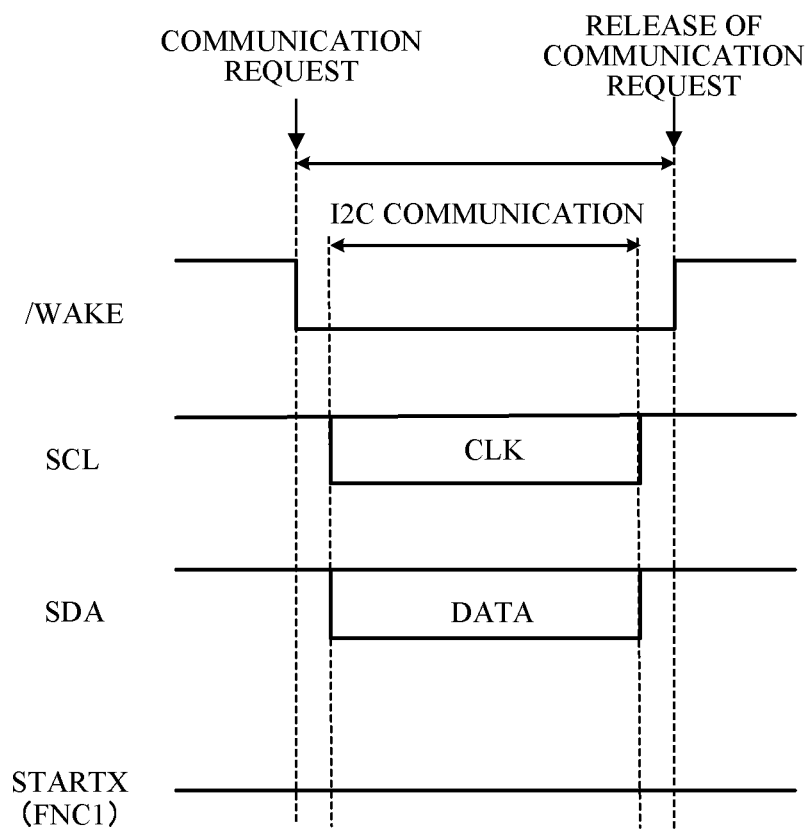
FIGS. 15A and 15B are timing charts when the accessory is a strobe device according to the embodiment.

FIG. 15A illustrates the timing at which the accessory 200 makes a communication request to the camera 100 and performs the I2C communication. As illustrated in FIG. 15A, the signal level of the communication request signal/WAKE changes from the Hi level to the Lo level prior to the I2C communication by SCL and SDA. This is because the I2C communication is performed in response to this change. Accordingly, disposing the contacts TC11 and TA11 of the communication request signal/WAKE at and near the SDA contact for the I2C communication can keep SDA of the communication request signal/WAKE from crosstalk.

As illustrated in FIG. 15A, a control to change the signal level of the communication request signal/WAKE from the Lo level to the Hi level after the I2C communication can keep SDA of the communication request signal/WAKE from crosstalk.

The FNC1 signal is assigned to the contacts TC14 and TA14 as the third signal contacts next to the SCL contacts TC13 and TA13. As described above, since GND is assigned to the FNC1 signal in the microphone device, SCL can be kept from crosstalk.

Figure 15B:
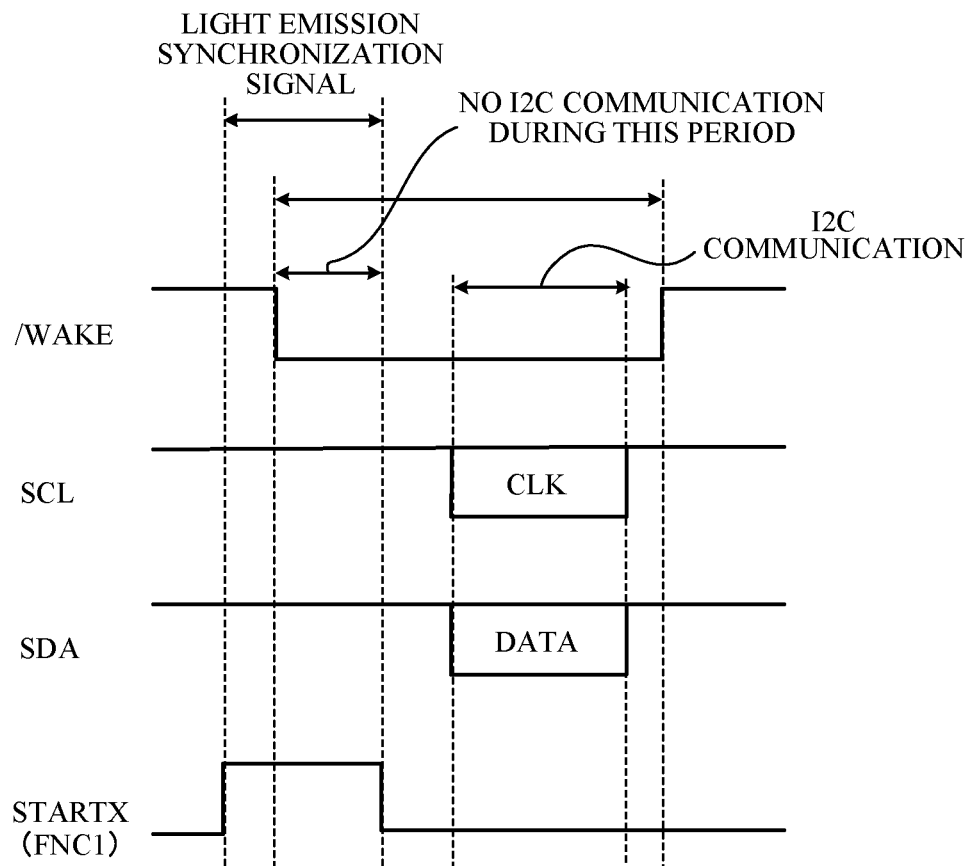

In the strobe device, the light emission synchronization signal (STARTX: third signal) as the FNC1 signal is assigned to the contacts TC14 and TA14 next to the SCL contacts TC13 and TA13. FIG. 15B illustrates the timing at which the accessory 200 makes a communication request to the camera 100, and performs the I2C communication and the strobe light emission. As illustrated in FIG. 15B, at the timing (period) when the light emission synchronization signal is output, no I2C communication is performed between the camera 100 and the accessory 200 in order to process the control of the strobe light emission with the highest priority. In other words, the light emission synchronization signal is a signal whose signal level changes before (or after) the I2C communication, but does not change during the I2C communication. This configuration can keep SCL of the light emission synchronization signal from crosstalk.

Thus, this embodiment disposes the STARTX contact on one of both sides of the SDA contact and the SCL contact, and disposes the/WAKE contact on the other side, thereby achieving a good I2C communication.

This embodiment sets to an open drain signal, similar to SDA, the communication request signal/WAKE connected to the contacts TC11 and TA11 next to the SDA contacts TC12 and TA12. In comparison with a push-pull type communication request signal/WAKE is a push-pull system, crosstalk to SDA can be suppressed when the signal level of the communication request signal/WAKE changes.

SCLK connected to the SCLK contacts TC07 and TA07 is a clock signal for the SPI communication, and operates at a driving frequency of 1 MHz in this embodiment. In this embodiment, the attachment detection contacts TC06 and TA06 next to the SCLK contacts TC07 and TA07 are used to transmit the accessory attachment detection signal/ACC_DET. As described above, the accessory attachment detection signal/ACC_DET is a signal that has a potential equivalent to GND when the accessory 200 is attached to the camera 100. Therefore, this contact arrangement can prevent crosstalk between SCLK and a signal other than the SPI bus.

MOSI connected to the other contacts TC08 and TA08 next to the SCLK contacts TC07 and TA07 is a data signal transmitted from the camera control circuit 101 to the accessory control circuit 201 by the SPI communication. Generally, the timing at which the MOSI output level in the SPI communication changes is synchronized with the timing at which the SCLK output level changes. Therefore, crosstalk can be suppressed between SCLK and MOSI by disposing the MOSI contacts TC08 and TA08 next to the SCLK contacts TC07 and TA07.

MISO connected to the other contacts TC09 and TA09 next to the MOSI contacts TC08 and TA08 is a data signal transmitted from the accessory control circuit 201 to the camera control circuit 101 in the SPI communication. Generally, the timing at which the MISO output level changes in the SPI communication is synchronized with the timing at which the SCLK output level changes, similar to MOSI. Therefore, by disposing the MISO contacts TC09 and TA09 next to the MOSI contacts TC08 and TA08, crosstalk between the MOSI and the MISO can be suppressed.

CS connected to the other contacts TC10 and TA10 next to the MISO contacts TC09 and TA09 is a communication request signal transmitted from the camera control circuit 101 to the accessory control circuit 201 in the SPI communication. Generally, CS in the SPI communication maintains a constant output level from a communication request to a communication completion. Therefore, by disposing the CS contacts TC10 and TA10 next to the MISO contacts TC09 and TA09, crosstalk to MISO can be suppressed.

The communication request signal/WAKE connected to the contacts TC11 and TA11 adjacent to the CS contacts TC10 and TA10 is a signal for making a communication request from the accessory control circuit 201 to the camera control circuit 101. As described above, the communication request signal/WAKE is an open drain signal, and thus is relatively susceptible to crosstalk. Therefore, this embodiment disposes the contacts TC10 and TA10 for CS whose signal level changes relatively infrequently, next to the contacts TC11 and TA11 for the communication request signal/WAKE, and can suppress crosstalk to the communication request signal/WAKE.

A differential signal that requires an impedance control is connected to the contacts TC01 to TC03 and TA01 to TA03 and the contacts TC19 to TC21 and TA19 to TA21 located at and near both ends of the camera connector 141 and the accessory connector 211 (these will be collectively referred to as both end sides hereinafter). The signal wiring to the accessory shoe interface is generally configured with a flexible substrate. In order to achieve the desired wiring impedance on the flexible board, it is necessary to keep a distance between the lines of the differential signal and with GND to be wired in parallel. In a board in which both sides are used, it is common to form a mesh GND wiring on the backside of the differential signal. Thus, the signal wiring that requires the impedance control has relatively large restrictions on the wiring design in comparison with a general single-ended signal.

On the other hand, this embodiment connects the differential signal that requires an impedance control to the contacts located on both ends of the camera connector 141 and the accessory connector 211, thereby relatively reducing a relationship with other signals and improving the degree of freedom in wiring design.

The differential signal can be transferred at a high speed of about several hundred Mbps to several Gbps such as USB and PCIe, and is suitable to transfer a large data amount between devices. On the other hand, no differential signal may be used depending on the type of the accessory 200. The accessory that uses no differential signal needs no contacts assigned to the differential signal, so the accessory cost can be reduced by deleting the contact.

FIG. 12 illustrates a configuration variation of the accessory 200 illustrated in FIG. 1. More specifically, it has such a configuration that the contacts TA01 to TA03 and TA19 to TA21 and signals and circuits connected to them are omitted. That is, the accessory 200 in FIG. 12 has 15 contacts. In the configuration in FIG. 12, a differential signal is assigned to the contacts TC01 to TC03 and TC19 to TC21 located at both ends of the camera connector 141. On the other hand, the accessory 200 that needs no differential signal adopts a contact arrangement that eliminates a contact for the differential signal from the accessory connector 211, and includes only the contact necessary for the accessory 200.

The accessory 200 in FIG. 12 sets to the GND contacts the contacts TC04 and TA04 and the contacts TC18 and TA18 near both ends of the camera connector 141 and the accessory connector 211. With such a contact arrangement, even in the accessory 200 connected to a part of the contacts of the camera connector 141, the contacts at both ends of the accessory connector 211 can be set to the GND contacts. This configuration can prevent the GND contacts from being disconnected even when an excessive static pressure or impact is applied to the accessory 200.

Figure 13:
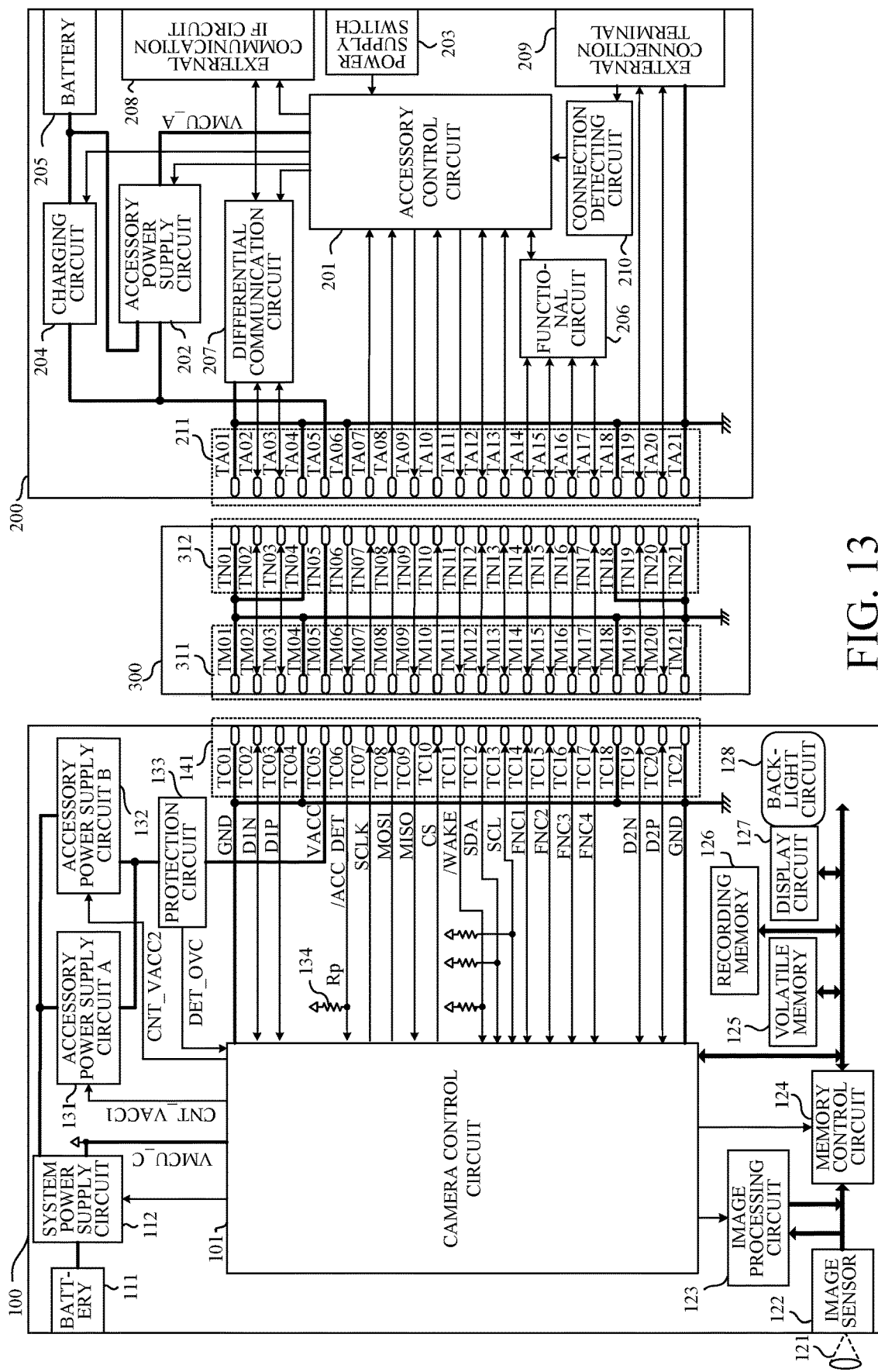
FIG. 13 is a diagram illustrating a configuration example of the camera, the accessory, and an intermediate accessory according to the embodiment.

A direct attachment of the accessory 200 to the camera 100 has been described. Referring now to FIG. 13, a description will be given of an intermediate accessory 400 attached between the camera 100 and the accessory 200. The camera 100 and the accessory 200 have the above-described configurations. The intermediate accessory 400 includes an extension cable for extending a distance between the camera 100 and the accessory 200, an adapter used to simultaneously attach a plurality of accessories to the camera 100, and the like. This embodiment will describe the intermediate accessory 400 as an extension cable. In the configuration in FIG. 13, the intermediate accessory 400 corresponds to an accessory, and the accessory 200 corresponds to another accessory.

The intermediate accessory 400 has a camera shoe and an accessory shoe that are attachable to the camera 100 and the accessory 200, respectively, and each is provided with a camera-side intermediate connector 311 and an accessory-side intermediate connector 312. The camera-side intermediate connector 311 has 21 contacts TM01 to TM21 arranged in a row, and is a connector for making an electrical connection with the camera 100. The contacts TM01 to TM21 each make a one-to-one contact with the contacts TC01 to TC21 in the camera connector 141.

On the other hand, the accessory-side intermediate connector 312 has 21 contacts TN01 to TN21 arranged in a row, and is a connector for making an electrical connection with the accessory 200. The contacts TN01 to TN21 each make a one-to-one contact with the contacts TA01 to TA21 in the accessory connector 211.

The intermediate accessory 400 having this contact arrangement can provide the power supply and the communication in the same manner as those when the accessory 200 is directly attached to the camera 100. At this time, the intermediate accessory 400 may receive the power supply from the camera 100, or the power supply from the camera 100 may be directly transmitted to the accessory 200. The power supply in this embodiment includes a case where the power supply from the camera 100 is transmitted to the accessory 200 as it is and no power is supplied to the accessory 400.

In FIG. 13, the number of contacts of the camera-side intermediate connector 311 is the same as the number of contacts of the camera connector 141, and the number of contacts of the accessory-side intermediate connector 312 is the same as the number of contacts of the accessory connector 211, but they may not necessarily be equal to each other.

Figure 14:
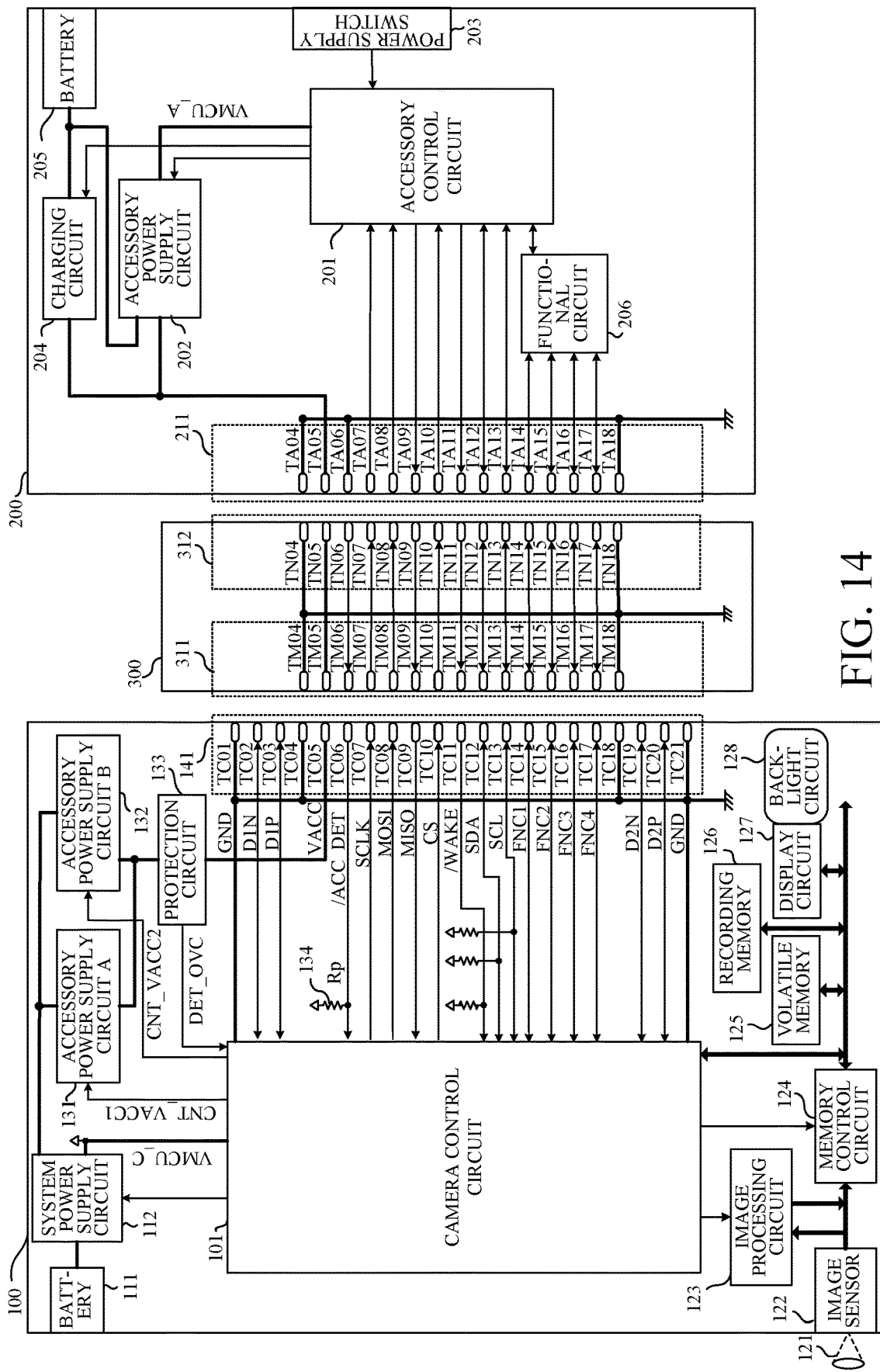
FIG. 14 illustrates another configuration example of the camera, the accessory, and the intermediate accessory according to the embodiment.

FIG. 14 illustrates a variation of the configuration of FIG. 13 about the accessory 200 and the intermediate accessory 400. Although differential signals are connected to the contacts TC01 to TC03 and TC19 to TC21 on both ends of the camera connector 141, the differential signal may not be required depending on the function of the accessory 200. The configuration of FIG. 14 eliminates the contact to which the differential signal is connected, from the camera-side intermediate connector 311 and the accessory-side intermediate connector 312 and the accessory connector 211. That is, the intermediate accessory 400 and the accessory 200 in FIG. 14 each have 15 contacts. Thereby, a contact arrangement including only the contacts required for the intermediate accessory 400 and the accessory 200 is adopted.

A detailed description will now be given of the connection configuration between the camera 100 and the external flash unit 120, which is an example of the accessory 200.

FIG. 16A illustrates the camera 100 viewed from the diagonally rear side. FIG. 16B illustrates how to attach the external flash unit 120 to the accessory shoe 1123 of the camera 100. FIG. 16C illustrates the external flash unit 120 attached to the camera 100 viewed from the oblique rear side.

The imaging optical system is provided on the front side (field side) of the camera 100, and the image display unit 107 is provided on the rear side of the camera 100. A top cover 150 as an exterior member is provided on the top surface of the camera 100, and an accessory shoe 1123 is provided to the top cover 150. On the other hand, in the external flash unit 120, the camera connector 216 is provided at the bottom of the external flash unit 120.

As illustrated in FIG. 16B, the external flash unit 120 is slid in a direction parallel to the front side in the Z direction (attachment side in the first direction) relative to the camera 100 to engage the camera connector 216 and the accessory shoe 1123 with each other. Thereby, the external flash unit 120 can be attached to the camera 100. The front side in the Z direction is a direction from the rear side to the front side of the camera 100, that is, a direction from the image display unit 107 side toward the imaging optical system side. An X direction (second direction), a Y direction (third direction), and the Z direction (front-back direction) illustrated in FIGS. 16A, 16B, and 16C and subsequent figures are commonly used. The X direction is a direction orthogonal to the Z direction in the horizontal plane when the Z direction is parallel to the horizontal direction, and is the width direction of the camera 100. The Y direction is a direction orthogonal to the Z direction and the X direction, and is the height direction of the camera 100.

Figure 17A:
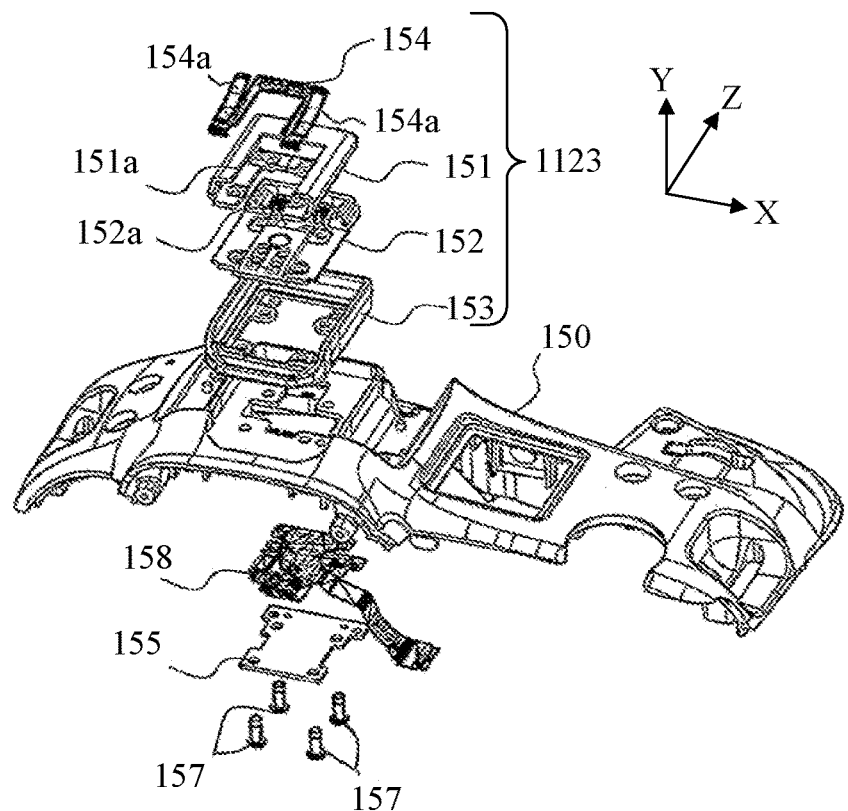
FIGS. 17A and 17B are an exploded view and a perspective view of an accessory shoe according to the embodiment.
Figure 17B:
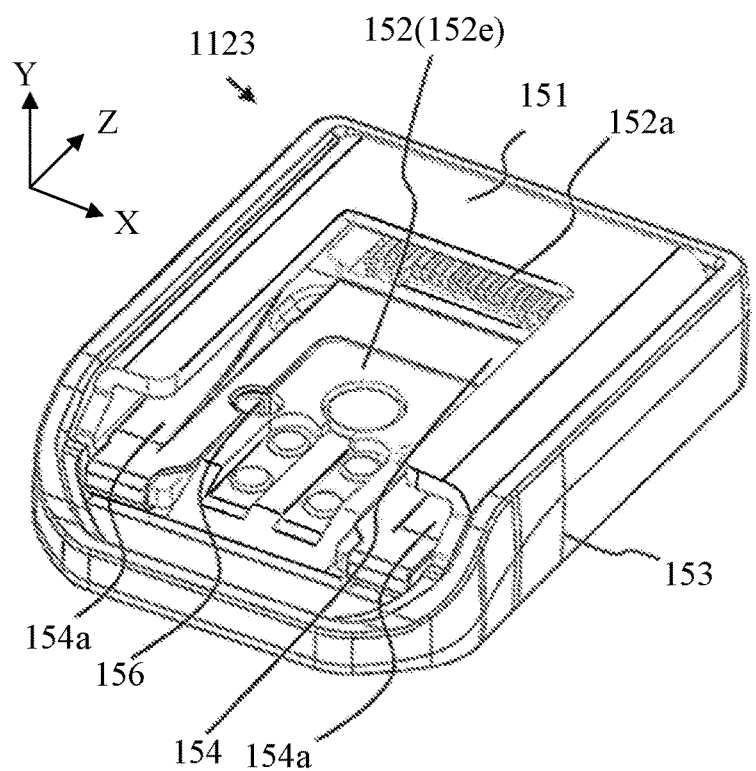

A detailed description will now be given of the accessory shoe 1123 of the camera 100. FIG. 17A illustrates the top cover 150 and the exploded accessory shoe 1123. FIG. 17B illustrates the assembled accessory shoe 1123. The assembly direction of the accessory shoe 1123 onto the top cover 150 is the Y direction.

The accessory shoe 1123 includes an engagement member 151, a connection terminal connector 152, a shoe stage 153, and an accessory shoe spring 154. The engagement member 151 is a member for holding the external flash unit 120 through an engagement with the external flash unit 120. The connection terminal connector 152 includes a plurality of connection terminals 152a arranged at regular pitches in the X direction on a connector base member 152e as a holding member made of a resin material or the like and held by the connector base member 152e. The connection terminals 152a correspond to the contacts TC01 to TC21 in the camera connector 141 illustrated in FIG. 1.

In the connection terminal connector 152, the connection terminals 152a are arranged on the front side in the Z direction as the attachment direction of the external flash unit 120 (on the front side of the camera 100) as illustrated in FIG. 17B. An engagement hole portion 156 to be engaged with a lock pin 252 of the external flash unit 120 illustrated in FIG. 19A is provided behind the connection terminal connector 152 in the Z direction (on the rear side of the digital camera 100).

While the external flash unit 120 is attached to the accessory shoe 1123, the connection terminals 152a are electrically connected to the external flash unit 120. Each of the plurality of connection terminals 152a is electrically connected to a flexible substrate 158 disposed on the lower side of the top cover 150 in the Y direction. The flexible substrate 158 is connected to an unillustrated main substrate of the camera 100. Thus, when the external flash unit 120 is attached to the accessory shoe 1123, a communication is available between the external flash unit 120 and the camera 100.

The shoe stage 153 is a housing member that encloses the engagement member 151 and the connection terminal connector 152. An accessory shoe holding member 155 is a structural skeleton that holds the engagement member 151. As illustrated in FIG. 17A, the accessory shoe holding member 155, the flexible substrate 158, the top cover 150, the shoe stage 153, and the connection terminal connector 152 are fastened to the engagement member 151 by four screws 157 that are inserted into them. Thereby, these members are mutually positioned and fixed. By arranging the four screws 157 one by one in four areas equally divided in the X direction and the Z direction, the above components can be connected in a well-balanced manner.

Figure 18A:
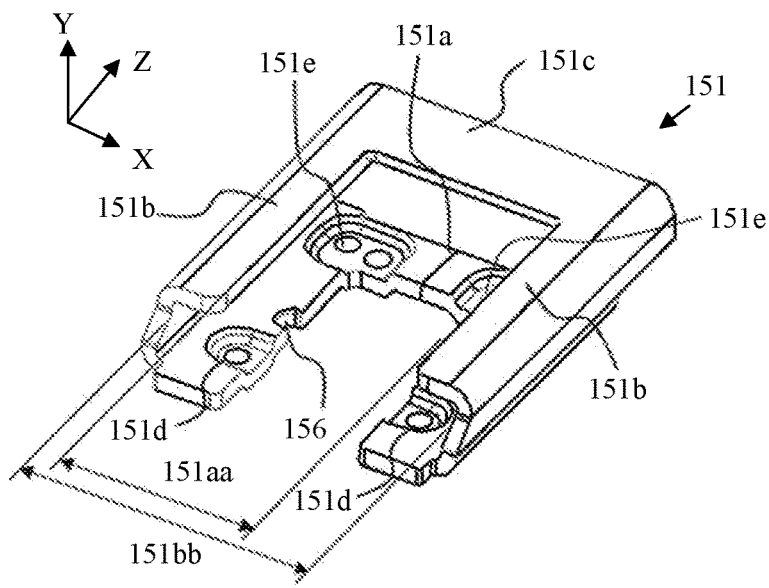
FIGS. 18A, 18B, and 18C illustrate a structure of an engagement member and a connection terminal connector of an accessory shoe according to the embodiment.
Figure 18B:
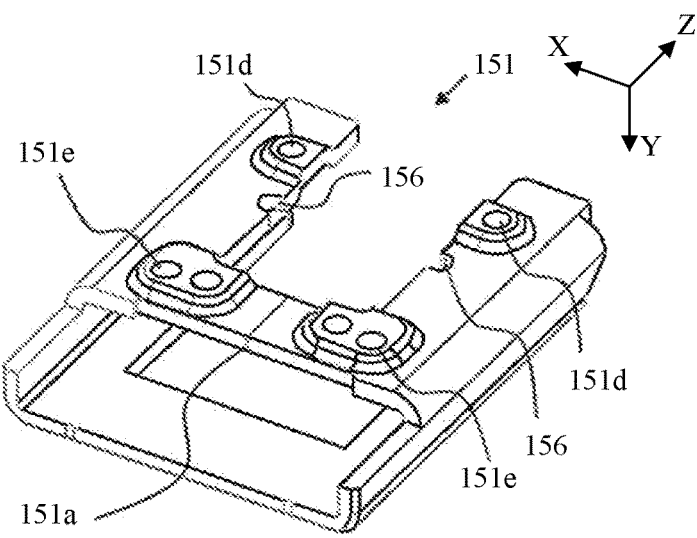
Figure 18C:
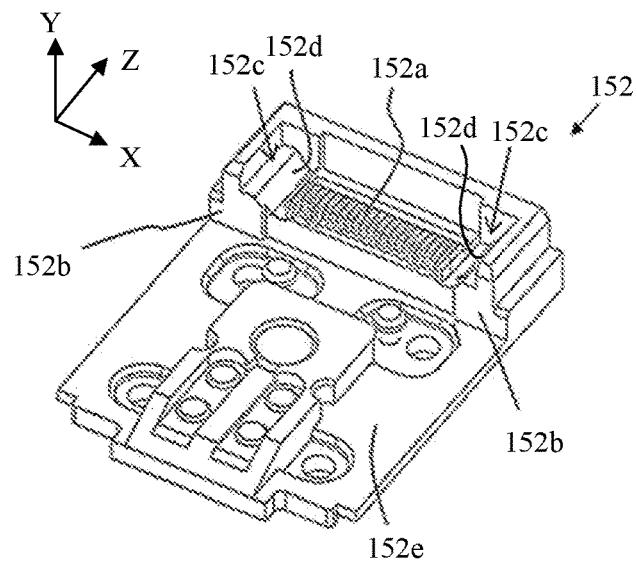
Figure 24:
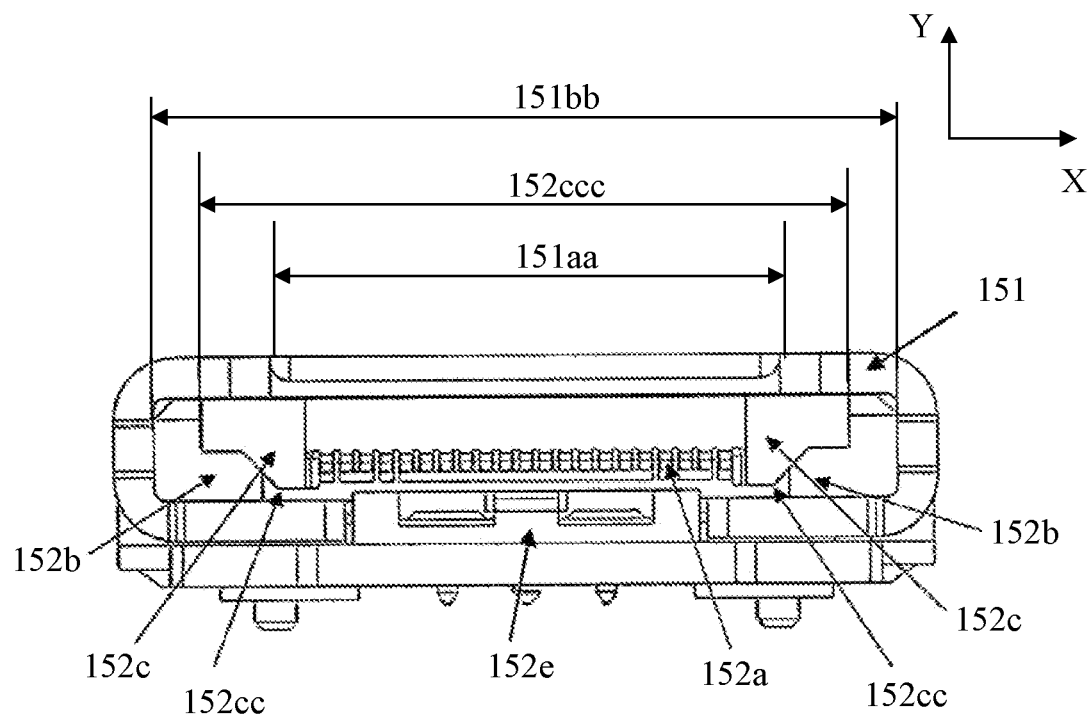
FIG. 24 is a front view of the accessory shoe according to the embodiment.

FIG. 18A illustrates the structure on the top surface side of the engagement member 151, and FIG. 18B illustrates the structure on the bottom surface side of the engagement member 151. FIG. 18C illustrates the structure of the connection terminal connector 152 on the top surface side. FIG. 24 illustrates the accessory shoe 1123 viewed from the insertion direction of the external flash unit 120.

The engagement member 151 is formed by bending a metal plate in a loop shape so that the end surfaces of the bent ends face and contact each other at a seam 151a. The engagement member 151 has a pair of engagement portions 151b, and a coupler 151c that couples the pair of engagement portions 151b together. The engagement member 151 has a pair of first screw hole portions 151d used for fastening the screws 157 and a pair of second screw hole portions 151e. The engagement member 151 has engagement hole portions 156 to be engaged with the lock pins 252 of the external flash unit 120.

As illustrated in FIGS. 18A and 12, the pair of engagement portions 151b are separated by a first width (referred to as engagement portion interval hereinafter) 151aa in the X direction. A holding member 254 of the external flash unit 120, which will be described later, illustrated in FIG. 19B is inserted into the engagement portion interval 151aa. The pair of first screw hole portions 151d are provided at a predetermined interval in the X direction, and serve as a pair of first fastening hole portions provided apart from each other in the X direction at the back (on the rear side) in the Z direction. The pair of second screw hole portions 151e are provided at a predetermined interval in the X direction, and serve as a pair of second fastening hole portions provided apart from each other in the X direction at the front in the Z direction. The engagement hole portion 156 is formed at a position engageable with the lock pin 252 of the external flash unit 120 in an area sandwiched between the pair of first screw hole portions 151d.

In the connection terminal connector 152, as illustrated in FIGS. 17B and 18C, a plurality of connection terminals 152a are exposed. In the pitch direction (X direction) in which the plurality of connection terminals 152a are aligned, the position of the camera connector 216 is determined by the engagement portion interval 151aa of the engagement member 151. Therefore, the holding member 254 of the external flash unit 120 is positioned relative to the connection terminal connector 152 by the engagement member 151.

A contact surface and a groove portion illustrated in FIG. 24 are formed on both sides of the connection terminal connector 152 (connector base member 152e) as one example of the camera connector 141 illustrated in FIG. 1 sandwiching the plurality of connection terminals 152a in the X direction on the front side in the Z direction. That is, there are formed contact surfaces 152b that contact and position the accessory shoe 1123 in the Z direction when the external flash unit 120 is attached, and groove portions 152c into which the accessory shoe 1123 is inserted. Each groove portion 152c is formed so as to extend from the contact surface 152b to the front side (attachment side) in the Z direction, and has a slope portion 152d so as to face inwardly and diagonally upwardly (so as to have a tilt to the X direction). Part of the groove portion 152c above the slope portion 152d extends outwardly in the X direction from the position of the top end of the slope portion 152d. This is to prevent a dent (sink) from being generated in the slope portion 152d during resin molding if the slope portion 152d is formed up to the top end of the groove portion 152c.

As illustrated in FIG. 24, in the X direction, an outermost inner surface 152ccc of the groove portion 152c in the connector base member 152e of the accessory shoe 1123 is located outside of the inner end surfaces of the pair of engagement portions 151b of the engagement member 151 (engagement portion interval 151aa) and is located inside of the outermost inner surface 151bb of the engagement member 151.

A slope start position 152cc, which is the end (lower end) of the slope portion 152d on the bottom surface side of the groove portion 152c, is provided inside the engagement portion interval 151aa. Thereby, it is possible to secure an area for providing the contact surface 152b that comes into contact with a contact portion 251b described later of the camera connector 216 and positions it in the Z direction. Providing the slope shape starting from the slope start position 152cc can expand a space into which the shoe apparatus (camera connector 216 described later) of the external flash unit 120 is inserted, and can secure the degree of freedom in the shape of the shoe apparatus. As a result, the shoe apparatus of the external flash unit 120 can be sufficiently formed with a shape that protects the connection terminals.

A description will now be given of the external flash unit 120. FIG. 19A illustrates the external flash unit 120 viewed from the camera connector 216 side (bottom side in the Y direction). FIG. 19B is a section taken along a line A-A in FIG. 19A and illustrates the internal structure of the camera connector 216. FIG. 20A illustrates the camera connector 216. However, a base portion 250 and a lock lever 253, which will be described later, are omitted. FIG. 20B illustrates the camera connector 216 viewed from the front in the Z direction.

Figure 19B:
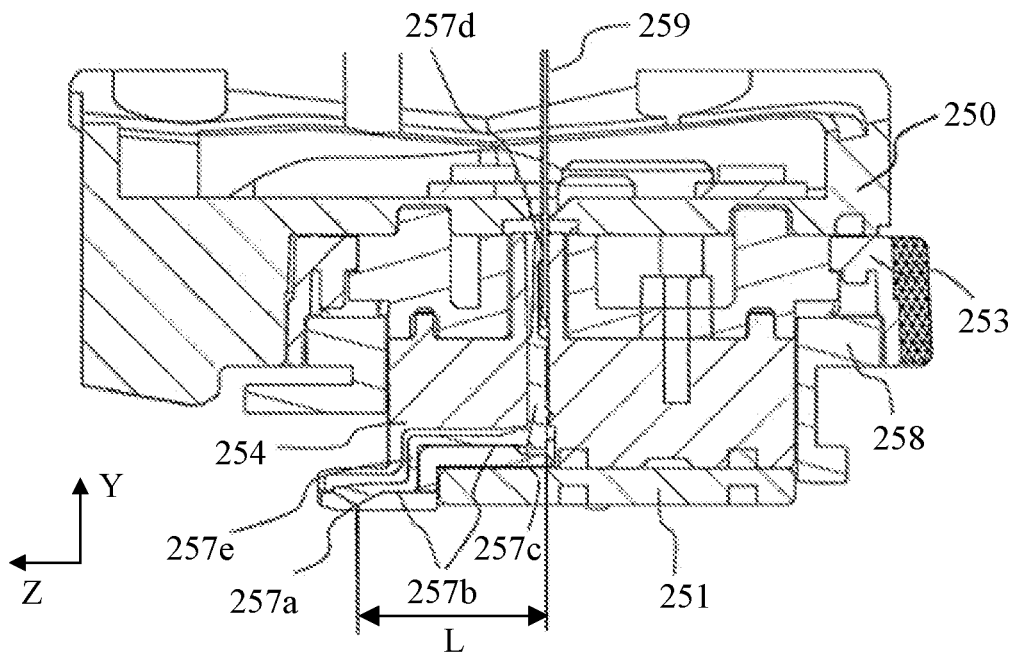
Figure 20A:
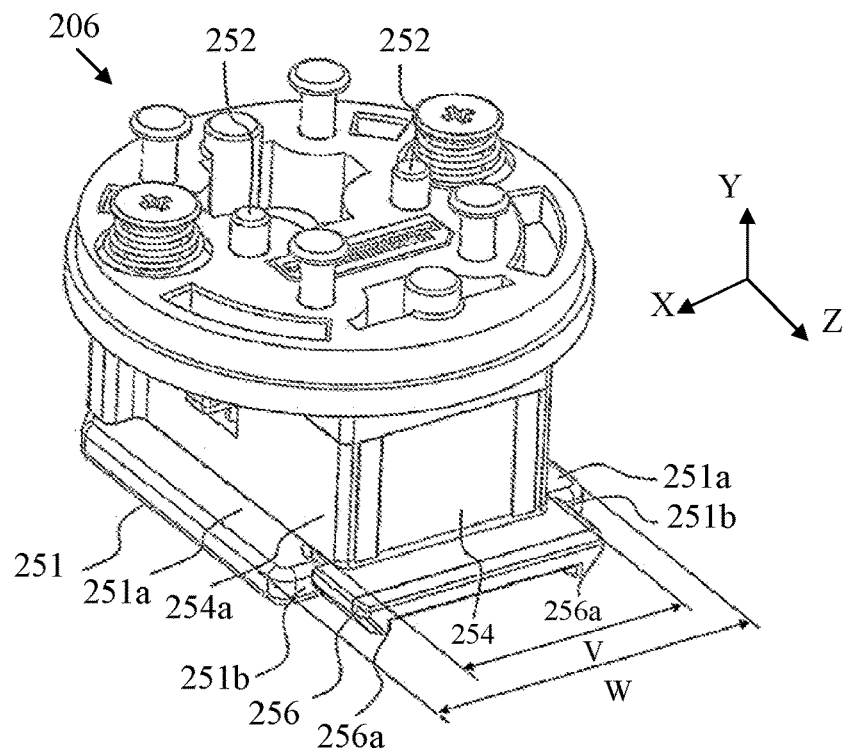
FIGS. 20A, 20B, and 20C are a perspective view and a front view illustrating an internal structure of a camera connector according to the embodiment.
Figure 20B:
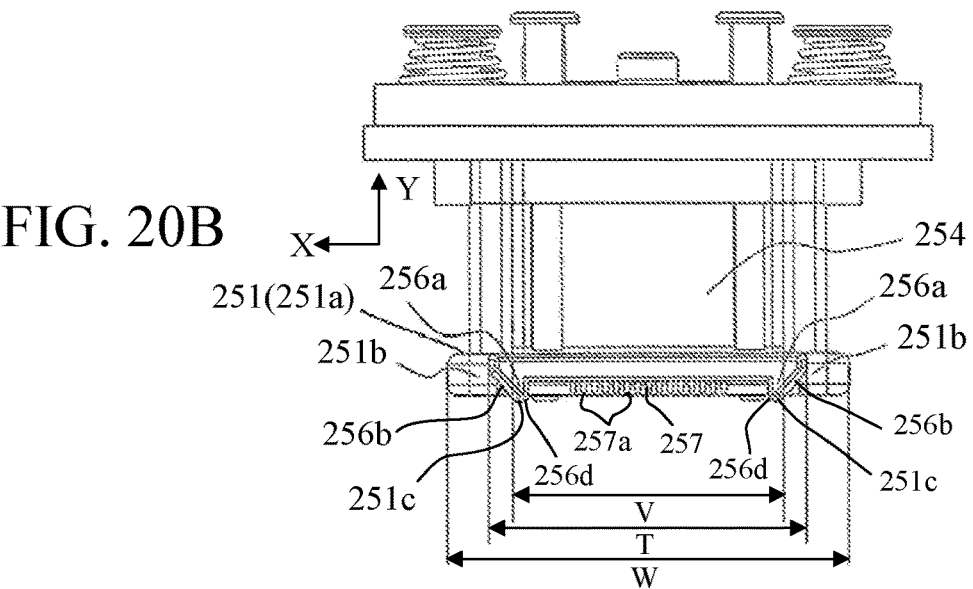

The camera connector 216 is provided on the bottom side in the Y direction (top side in FIG. 19A) of the base portion 250 of the external flash unit 120 as illustrated in FIG. 19B when it is attached to the accessory shoe 1123 of the camera 100. The camera connector 216 includes a shoe attachment leg (engagement member, shoe plate) 251, the lock pins 252, a lock lever 253, a holding member 254, a connection plug 256, and a Y-direction holding member 258.

The shoe attachment leg 251 is an engagement member that engages the external flash unit 120 with the accessory shoe 1123 of the camera 100 and holds it. That is, the shoe attachment leg 251 is an engagement member on the external flash unit 120 side attachable to and detachable from the engagement member 151 of the accessory shoe 1123.

A large stress is applied to the accessory shoe 1123 and the camera connector 216 due to the pressure for maintaining the attachment state and the external force (impact, etc.) acting on the external flash unit 120. The shoe attachment leg 251 is manufactured by processing a metal plate (sheet metal) in order to secure a high mechanical strength against such a large stress.

The lock pin 252 is a member for preventing the external flash unit 120 from falling off while the camera connector 216 (shoe attachment leg 251) is attached to the accessory shoe 1123, and is held on the shoe attachment leg 251 movable in the Y direction. More specifically, the lock pin 252 is slidably held in the Y direction by the Y-direction holding member 258. The lock lever 253 and the Y-direction holding member 258 are held by the holding member 254.

When the external flash unit 120 is attached to the accessory shoe 1123 and the lock lever 253 is rotated, the Y-direction holding member 258 is moved downwardly in the Y-direction in FIG. 19B by an unillustrated cam portion. At that time, the lock pin 252 also moves downwardly in the Y direction in FIG. 19B together with the Y-direction holding member 258. Thereby, the lock pin 252 projects from the shoe attachment leg 251 and is engaged with the engaging hole portion 156 provided in the engagement member 151 of the accessory shoe 1123. The lock pin 252 and the engagement hole 156 serve as a positioning member in the Z direction for ensuring an electrical connection between the external flash unit 120 and the camera 100.

The connection plug 256 as one example of an accessory connector 211 illustrated in FIG. 1 is provided on the front side in the Z direction of the camera connector 216, made of a nonconductive material (dielectric material) such as a resin material, and integrated with the holding member 254. An outermost width T of the connection plug 256 in the X direction is narrower than a width W of the shoe attachment leg 251 in the X direction. Thereby, an area for providing the contact portion 251b on the shoe attachment leg 251 is secured. The connection plug 256 has a plurality of connection terminals 257 for contacting and communicating with the plurality of connection terminals 152a of the accessory shoe 1123 illustrated in FIG. 18C. The connection terminals 257 correspond to the contacts TA01 to TA21 of the accessory connector 211 illustrated in FIG. 1.

The plurality of connection terminals 257 are provided so as to have a one-to-one correspondence with the plurality of connection terminals 152a, and held by the holding member 254 so as to extend in the Z direction and to line up in the X direction. Each connection terminal 257 has a tip portion 257a that comes into contact with the corresponding connection terminal 152a. Each connection terminal 257 has a shape extending backwardly in the Z direction from a tip portion 257a, and has an extension portion 257b that displaces the tip portion 257a upwardly in the Y direction in FIG. 19B by an elastic deformation when the tip portion 257a comes into contact with the connection terminal 152a. A vertical extension portion 257c extending upwardly in the Y direction is formed at the back end of the extension portion 257b in the Z direction. Provided at the upper end of the vertical extension portion 257c is a flexible substrate connector 257d to be connected to an unillustrated main substrate of the external flash unit 120 and connected to a flexible substrate 259 inserted into the holding member 254 from the top side in the Y direction.

The extension portion 257b has a step portion 257e having a step in the Y direction in the middle of the Z direction. As described above, the extension portion 257b can be elastically deformed in the Y direction. However, when the distance L in the Z direction of the extension portion 257b is short, a sufficient deformation amount cannot be obtained, and the durability is lowered. As a result, the connection terminal 152a and the tip portion 257a are repeatedly attached and detached, and the extension portion 257b may easily get damaged. Accordingly, providing the step portion 257e to the extension portion 257b can secure a sufficient distance L without causing the extension portion 257b to interfere with the shoe attachment leg 251.

As illustrated in FIGS. 20A and 20B, there are a pair of protrusion portions 256a that project downwardly in the Y direction (third direction) so as to sandwich a plurality of connection terminals 257 at both ends of the connection plug 256 in the X direction. As illustrated in FIG. 20B, a lower tip portion 256d of each protrusion portion 256a protrudes below a line made by connecting the lower ends of the tip portions 257a of the connection terminals 257 in order to protect the connection terminals 257 from external forces such as the pressure and the impact. That is, the tip portions 257a of the connection terminals 257 is provided above (inside) a line made by connecting the lower tip portions 256d of the pair of protrusion portions 256a.

There is a slope portion 256b on the outer side (outer surface) of each protrusion portion 256a in the X direction, which serves as an outer surface that extends diagonally upwardly from the lower tip portion 256d and faces diagonally downwardly, that is, has a tilt to the X direction. Since each protrusion portion 256a has such a shape, the connection plug 256 can be inserted into the groove portion 152c having the slope portion 152d in the connection terminal connector 152.

Figure 20C:
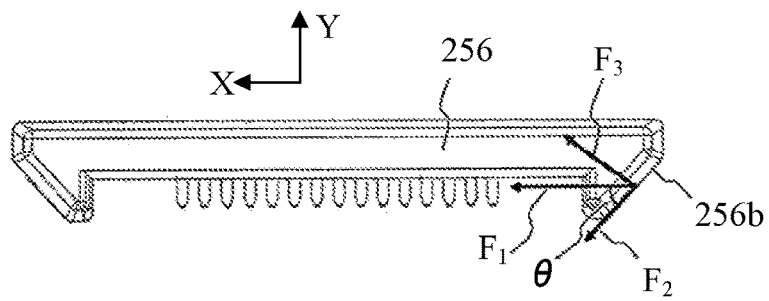

The slope portion 256b has a role of releasing an external force, such as the pressure and impact, from the connection plug 256 to prevent the connection plug from getting damaged. For example, FIG. 20C illustrates that an external force is applied to the connection plug 256 from the X direction. FIG. 20C illustrates the connection plug 256 viewed from the front in the Z direction.

An external force from the X direction is defined as F1 as a vector. The external force F1 acting on the slope portion 256b is decomposed according to the addition theorem in the vector space into a component force F2 in a direction along the slope portion 256b and a component force F3 in a direction perpendicular to the slope portion 256b. Where θ is an angle formed by the external force F1 and the slope portion 256b, the component force F2 and the component force F3 can be calculated by the following expression (1).

$$F2 = F1 \cos θ$$

$$F3 = F1 \sin θ \quad (1)$$

When the slope portion 256b is provided, θ is 0°<θ<90°. In this range, the following is established:

$$F2 < F1$$

$$F3 < F1 \quad (2)$$

Since the component force F2 escapes in the direction along the slope portion 256b, the component force F3 is the only force that affects the connection plug 256. As described above, since the component force F3 is smaller than the external force F1, the connection plug 256 can be prevented from getting damaged even if an external force that is large to some extent is applied.

By forming the slope portions 256b on both sides in the X direction so that its width in the X direction becomes narrower toward the lower side in the Y direction, not only the external force from the X direction but also the external force from the bottom side in the Y direction can be partially released.

Figure 25:
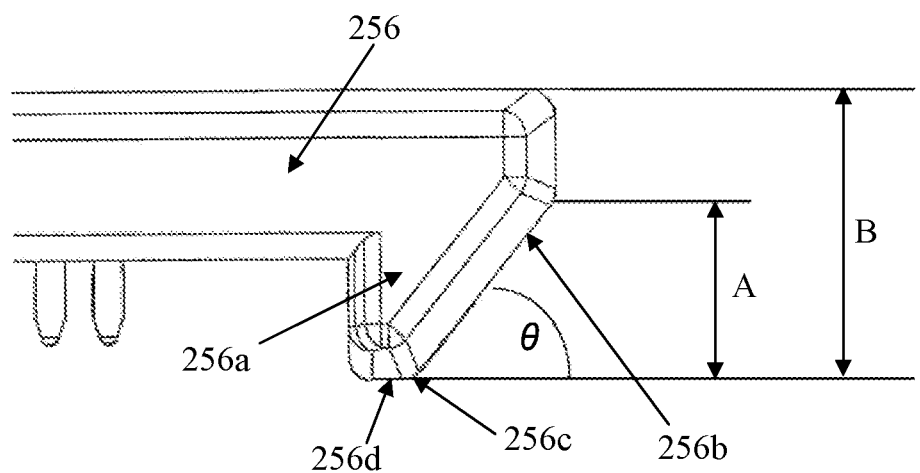
FIG. 25 is a partially enlarged view of a connection plug according to the embodiment.

FIG. 25 illustrates the partially enlarged connection plug 256 viewed from the Z direction. In the Y direction, assume that B is a height from the lower tip portion 256d of the protrusion portion 256a to the top surface of the connection plug 256 (a height of the connection plug including the protrusion portion), and A is a height of the slope portion 256b from the lower tip portion 256d (slope start position 256c) to the upper end of the slope portion 256b. At this time, A is preferably one-fifth or more of B, more preferably one-fourth or more, one-third or more, or half or more as illustrated in FIG. 13. That is, the slope portion 256b is formed to have a significant size for the function of releasing the external force from the X direction, and is different from a chamfered shape generally provided at the corner of the protrusion portion. The tilt angle θ of the slope portion 256b to the X direction is preferably set in a range of 45°±20° for the above function of releasing the external force.

In order to secure a sufficient area for the contact portion 251b on the shoe attachment leg 251 relative to the contact surface 152b of the accessory shoe 1123 as the positioning portion in the Z direction, it is preferable to make as short as possible the width in the X direction between slope start positions 256c at the lower tip portions 256d of the slope portions 256b on both sides. This embodiment sets the width between the slope start positions 256c in the X direction inside the width V of the holding member 254 in the X direction, and thereby secures a sufficient area of the contact portion 251b.

The camera connector 216 has such a structure that the shoe attachment leg 251 and the holding member 254 are fastened. The details of this fastening structure will be described later.

The holding member 254 can be inserted into the engagement portion interval 151aa of the engagement member 151 of the accessory shoe 1123 illustrated in FIG. 18A, and has a coupler 254a having a width V shorter than the width W of the shoe attachment leg 251 in the X direction. The widths W and V are defined by the Japanese Industrial Standards (JIS) B7101-1975 "camera accessory attachment seat and attachment foot." When the coupler 254a is engaged with the engagement member 151, the position of the external flash unit 120 relative to the camera 100 is determined in the X direction. The shoe attachment leg 251 is urged upwardly in the Y direction when it comes into contact with the elastic deformer 154a of the accessory shoe spring 154 as the urging member illustrated in FIGS. 17A and 17B. Thereby, the top surface of the shoe engagement portion 251a is brought into contact (pressure contact) with the bottom surface of the engagement member 151, and the position of the external flash unit 120 relative to the camera 100 is determined in the Y direction.

When the contact portion 251b of the shoe attachment leg 251 contacts the contact surface 152b on the front side in the Z direction of the connection terminal connector 152, the position of the external flash unit 120 relative to the camera 100 is determined in the Z direction.

The holding member 254 is also a structure for coupling the shoe attachment leg 251 and the base portion 250, and the lock pins 252 and the connection terminals 257 are arranged inside the coupler 254a.

Figure 21A:
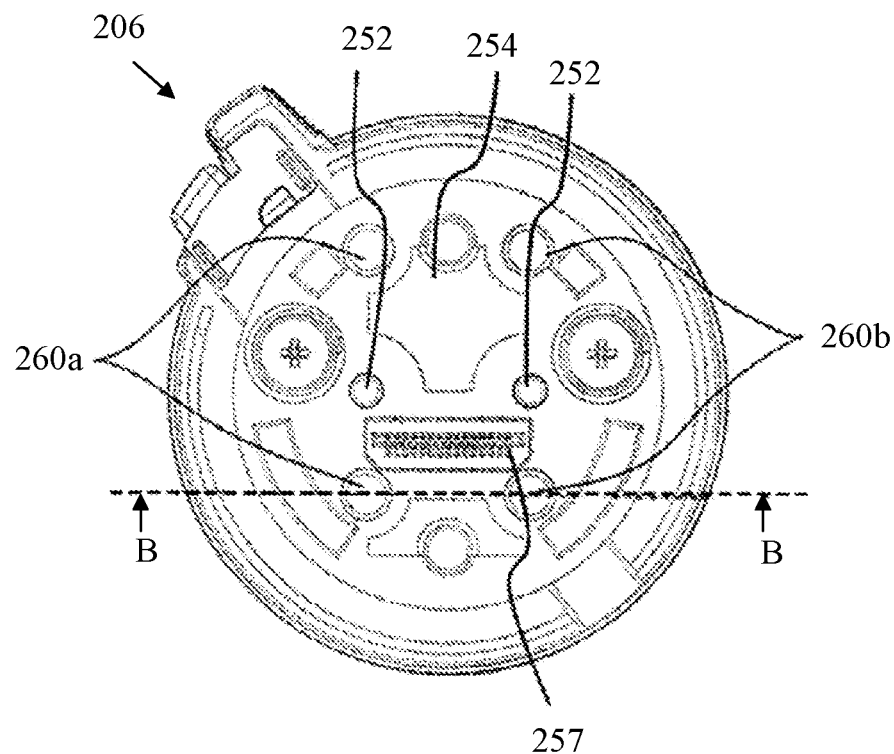
FIGS. 21A and 21B are a top view and a sectional view of a camera connector according to the embodiment.

Next follows a description of the fastening structure between the holding member 254 and the shoe attachment leg 251. FIG. 21A illustrates the camera connector 216 viewed from the upper side in the Y direction, and FIG. 21B illustrates a section taken along a line B-B in FIG. 21A.

A pair of first screw 260a and a pair of second screws 260b, which are fastening members for fastening the shoe attachment leg 251 to the holding member 254, penetrate the holding member 254 and are fastened to the shoe attachment leg 251. At this time, by disposing one screw in each of the four areas that are substantially equally divided in the X direction and the Z direction in a well-balanced manner, the shoe attachment leg 251 is stably held by the holding member 254. As described above, the shoe attachment leg 251 is a component to which a large stress is applicable. Therefore, a required mechanical strength can be ensured by fastening the metal shoe attachment legs 251 to the holding member 254 with a pair of first screws 260a and a pair of second screws 260b arranged in a well-balanced manner.

Figure 21B:
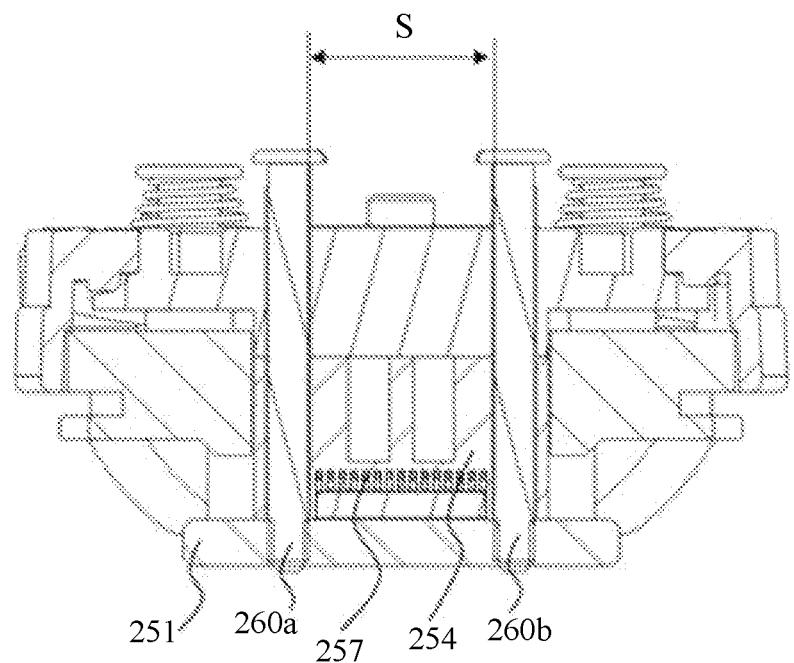

As illustrated in FIG. 21B, a plurality of connection terminals 257 are arranged in an area S sandwiched by the pair of first screws 260a and the pair of second screws 260b. The widths between the pair of first screws 260a and between the pair of second screws 260b are narrower than the width between the lower tip portions 256d of the protrusion portions 256a of the connection plug 256, the width V of the holding member 254, the outermost width T of the connection plug 256, and the width W of the shoe attachment leg 251.

Figure 26:
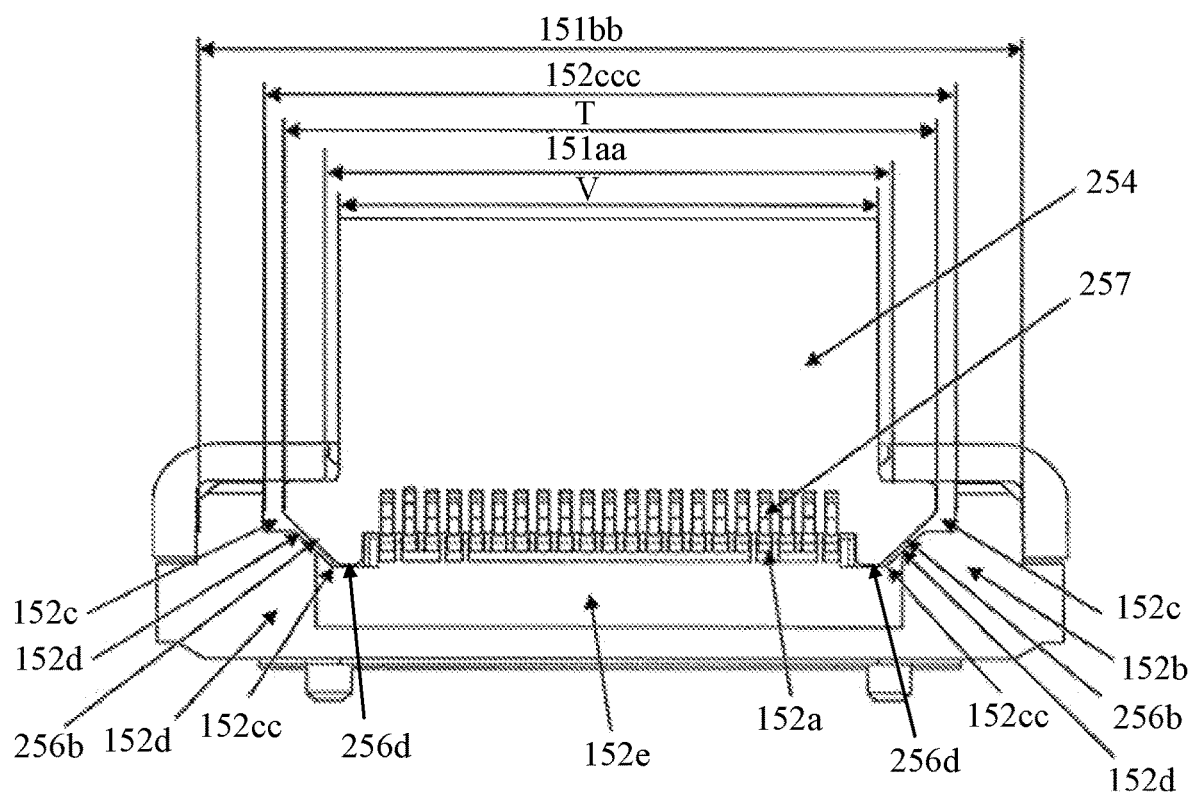
FIG. 26 is a front sectional view illustrating a state in which a camera connector is attached to an accessory shoe according to the embodiment.

FIG. 26 illustrates a section of the accessory shoe 1123 viewed from the Z direction while the camera connector 216 is attached to the accessory shoe 1123. This figure illustrates the sizes T and V of the camera connector 216 and the positional relationship between each component of the camera connector 216 and each component of the accessory shoe 1123.

In FIG. 26, as described above, the top surface of the shoe engagement portion 251a of the camera connector 216 contacts the bottom (ceiling surface) of the engagement member 151 of the accessory shoe 1123 for positioning in the Y direction.

On the other hand, none of the lower tip portion 256d and the slope portion 256b of the protrusion portion 256a of the connection plug 256 in the camera connector 216 contact the bottom surface and the slope portion 152d of the groove portion 152c of the accessory shoe 1123, respectively. A gap between the lower tip portion 256d of the protrusion portion 256a and the bottom surface of the groove portion 152c of the accessory shoe 1123 is set as small as possible. Thereby, when an external force in the X direction is applied to the external flash unit 120, the lower tip portion 256d of the protrusion portion 256a can come into contact with the bottom surface of the groove portion 152c of the accessory shoe 1123, and a floating amount of the connection plug 256 (a tilt to the accessory shoe 1123) can be reduced.

Each of a gap between the slope portions 256b and 152d and a gap between the inner end surface 152ccc of the groove portion 152c and the outer end surface of the connection plug 256 is set to be large to some extent. Thereby, when an external force in the X direction is applied to the external flash unit 120, the connection terminals 257 and 152a can be prevented from getting loaded.

In the groove portion 152c of the accessory shoe 1123, a relationship between a height of the groove portion 152c in the Y direction (a height from the bottom surface of the groove portion 152c to a ceiling surface of the engagement member 151) and a height of the slope portion 152d in the Y direction is similar to a relationship between the height B of the connection plug 256 and the height A of the slope portion 256b in the camera connector 216. It is also preferable that the tilt angle of the slope portion 256b to the X direction is also set in the range of 45°±20°, similarly to the tilt angle θ of the slope portion 256b in the camera connector 216.

Each embodiment described above has described a surface shape of the slope portion 256b provided on the protrusion portion 256a being flat, but the slope portion 256b may be a curved surface having a curvature. That is, the slope portion 256b may have a surface with a tilt to the X direction.

This embodiment can secure an area for providing a larger number of connection terminals than ever and a shape for protecting them and an area for positioning between components, in the compact camera connector 216 and accessory shoe 1123.

Figure 22A:
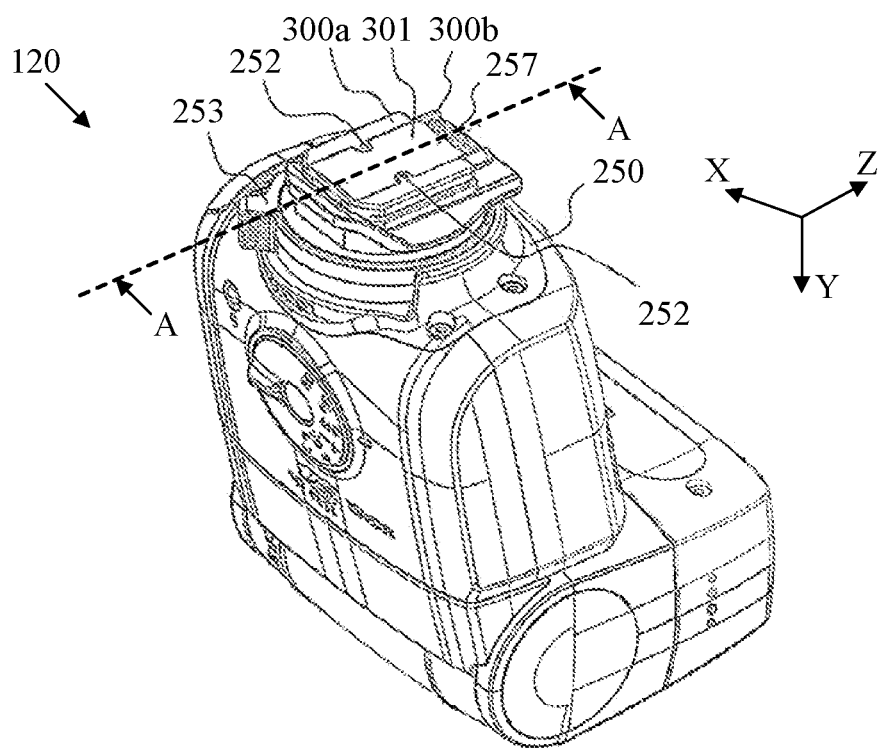
FIGS. 22A and 22B are a perspective view and a sectional view of an external flash unit according to a variation.
Figure 22B:
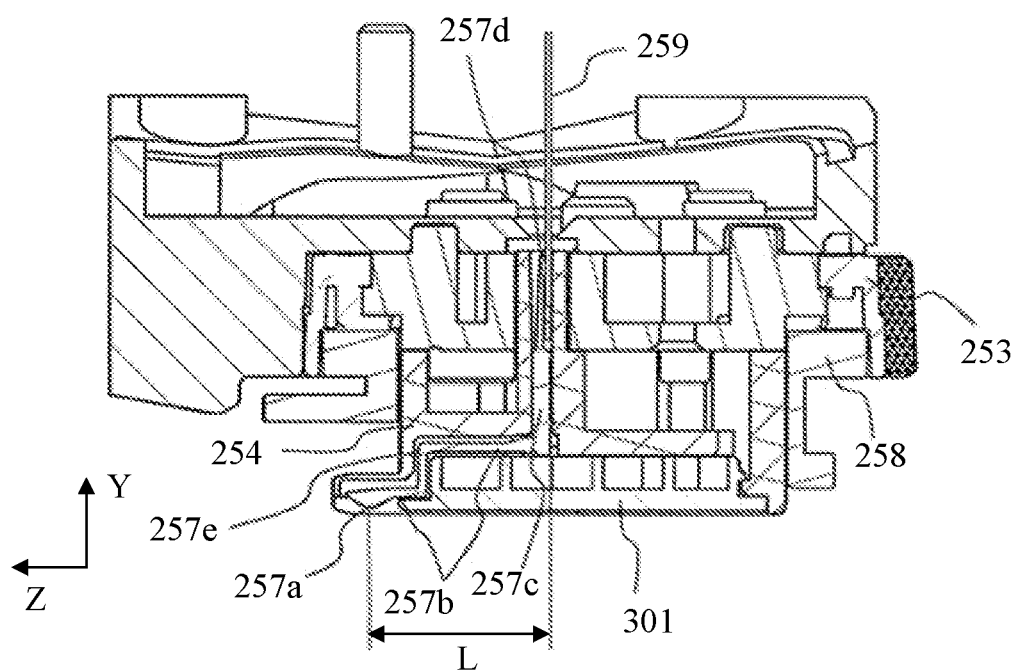
Figure 23A:
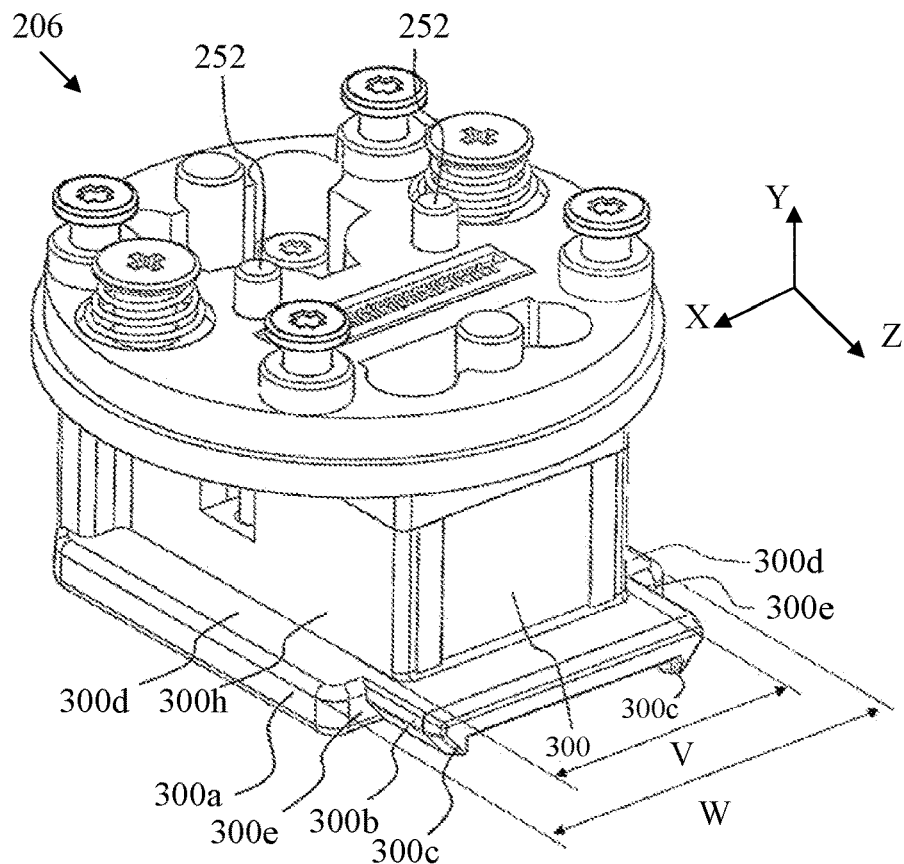
FIGS. 23A and 23B are a perspective view and a front view illustrating the internal structure of the connector according to the variation.
Figure 23B:
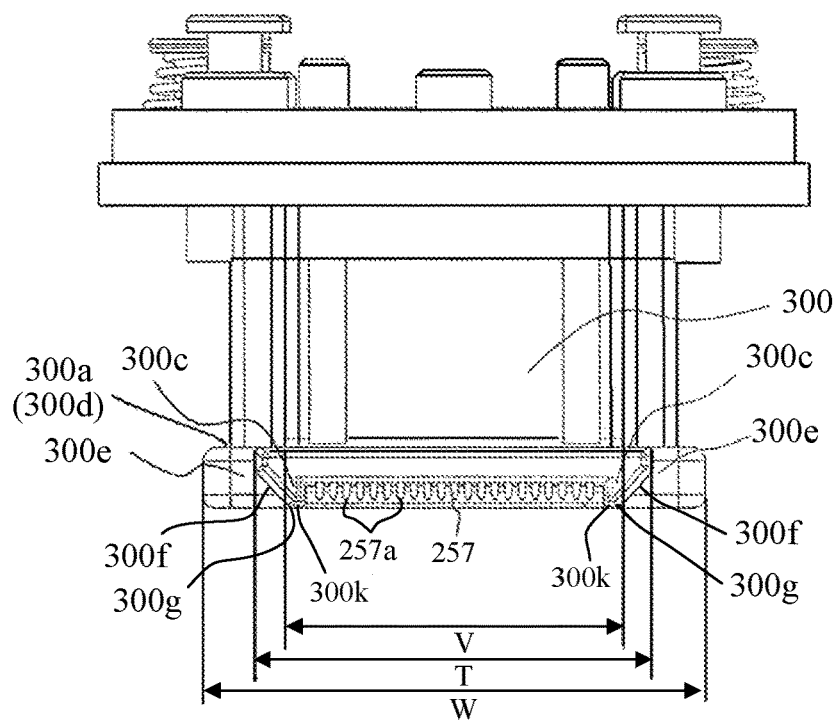

A description will now be given of a variation of an external flash unit 120. FIG. 22A illustrates the external flash unit 120 viewed from the camera connector 216 side (lower side in the Y direction). FIG. 22B illustrates a section taken along a line A-A in FIG. 22A and illustrates the internal structure of the camera connector 216. FIG. 23A illustrates the camera connector 216. However, the base portion 250 and the lock lever 253 are omitted. FIG. 23B illustrates the camera connector 216 viewed from the front in the Z direction.

The camera connector 216 is provided on the lower side in the Y direction (upper side in FIG. 22A) of the base portion 250 of the external flash unit 120 as illustrated in FIG. 22B while it is attached to the accessory shoe 1123 of the camera 100. The camera connector 216 has a shoe attachment leg 300a, lock pins 252, a lock lever 253, a holding member 300, a connection plug 300b, a Y-direction holding member 258, and a shoe cover 301.

The shoe attachment leg 300a is an engagement member for engaging the external flash unit 120 with the accessory shoe 1123 of the camera 100, similar to the shoe attachment leg 251 of the above-described embodiment. That is, the shoe attachment leg 300a is an engagement member on the external flash unit 120 side attachable to and detachable from the engagement member 151 of the accessory shoe 1123.

In the above-described embodiment, the shoe attachment leg 251 as a metal shoe plate and the resin holding member 254 are formed as separate members in order to give priority to the mechanical strength. On the other hand, in this variation, the shoe attachment leg 300a and the holding member 300 are formed as an integrated member by a resin material (nonconductive material). Thereby, the pair of first screws 260a and the pair of second screws 260b described in the previous embodiment are not required, a space for arranging the connection terminals 257 becomes wider, and thus a larger number of connection terminals 257 can be arranged. As a result, the external flash unit 120 can communicate more information with the camera 100 via the camera connector 216 and the accessory shoe 1123.

The connection plug 300b is provided on the front side in the Z direction of the camera connector 216, and formed as an integrated member with the holding member 300 made of a nonconductive resin material in this embodiment. Similar to the above-described embodiment, the outermost width T of the connection plug 300b in the X direction is made narrower than the width W of the shoe attachment leg 300a in the X direction, so that the area for providing the contact portion 300e is secured in the shoe attachment leg 300a. The connection plug 300b has a plurality of connection terminals 257 for contacting and communicating with the plurality of connection terminals 152a of the accessory shoe 1123 illustrated in FIG. 18C. The shoe cover 301 is an enclosure attached to the holding member 300, and is a member that protects a plurality of connection terminals 257. The shape of the connection terminal 257 is similar to that of the above embodiment, and the step portion 257e is provided to secure a sufficient distance L in the Z direction of the extension portion 257b without interfering with the shoe cover 301.

The shape of the connection plug 300b is also similar to that of the connection plug 256 of the previous embodiment, and a pair of protrusion portions 300c that project downwardly in the Y direction are provided so as to sandwich the plurality of connection terminals 257 at both ends of the connection plug 300b in the X direction. As illustrated in FIG. 23B, a lower tip portion 300k of each protrusion portion 300c projects below a line made by connecting the lower ends of the tip portions 257a of the connection terminals 257 in order to protect the connection terminal 257 from the external force such as the pressure and the impact.

That is, the tip portion 257a of the connection terminal 257 is provided above (inside) a line made by connecting the lower tip portions 300k of the pair of protrusion portions 300c.

Even in this embodiment, provided on the outer side of each protrusion portion 300c in the X direction is a slope portion 300f that extends diagonally upwardly from the lower tip portion 300k and faces diagonally downwardly. Each protrusion portion 300c having such a shape enables the connection plug 300b to be inserted into the groove portion 152c having the slope portion 152d in the connection terminal connector 152 described in the previous embodiment. As described in the previous embodiment, the slope portion 300c has a role of releasing the external force such as the pressure and the impact on the connection plug 300b to prevent the connection plug from getting damaged.

Similar to the previous embodiment, it is desirable to make as short as possible a distance in the X direction between the slope start positions 300g at the lower tip portion 300k of the slope portions 300c on both sides. Therefore, the slope start positions 300g on both sides are provided inside the width V of the holding member 254 in the X direction to sufficiently secure the area of the contact portion 300e of the shoe attachment leg 300a.

The holding member 300 is formed so that it can be inserted into and engaged with the engagement portion interval 151aa of the engagement member 151 illustrated in FIG. 18A, and has a coupler 300h having a width V shorter than the width W of the shoe attachment leg 300a in the X direction. The width W and the width V are defined by the Japanese Industrial Standards (JIS) B7101-1975 "camera accessory attachment seat and attachment foot" as in the previous embodiment. When the coupler 300h is engaged with the engagement member 151, the position of the external flash unit 120 relative to the camera 100 is determined in the X direction. The shoe attachment leg 300a is urged upwardly in the Y direction when it contacts the elastic deformer 154a of the accessory shoe spring 154 illustrated in FIGS. 17A and 17B, and thereby the top surface of the shoe engagement portion 300d contacts the bottom surface of the engagement member 151. Thereby, the position of the external flash unit 120 relative to the camera 100 is determined in the Y direction.

When the contact portion 300e of the shoe attachment leg 300a contacts the contact surface 152b on the front side in the Z direction of the connection terminal connector 152, the position of the external flash unit 120 relative to the camera 100 is determined in the Z direction. The holding member 300 is also a structure for coupling the shoe attachment legs 300a and the base portion 250, and the lock pin 252 and the connection terminal 257 are arranged inside the coupler 300h.

In this embodiment, the case where the camera 100, the accessory 200, and the intermediate accessory 400 have 21 or 15 contacts has been described, but the number of contacts may be other numbers.

In this embodiment, the microphone device and the strobe device have been described as the accessory 200, but the accessory according to the present invention includes various devices, such as the electronic viewfinder unit, other than the microphone device and the strobe device. This embodiment has described the camera as an electronic apparatus, but the electronic apparatus according to the present invention also includes various electronic apparatuses other than the camera.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processor (CPU), microprocessor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention can provide an electronic apparatus and an accessory, each of which can reduce a communication error caused by a disconnection of part of terminals when the accessory is attached.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An electronic apparatus to which an accessory is detachably attached, the electronic apparatus comprising a plurality of contacts electrically connectable to the accessory and arranged in a first direction orthogonal to a direction in which the accessory is attached, wherein the plurality of contacts include an attachment detection contact used to detect an attachment of the accessory to the electronic apparatus, and a communication request contact used for a communication request from the accessory to the electronic apparatus, wherein the attachment detection contact and the communication request contact are disposed between a contact closest one end and a contact closest to another end in the first direction, wherein the attachment detection contact is disposed between the communication request contact and the contact closest to the one end, wherein in the first direction, a distance between the attachment detection contact and the communication request contact is shorter than a distance between the communication request contact and the contact closest to the other end, and wherein in the first direction, the distance between the communication request contact and the contact closest to the one end is equal to or shorter than the distance between the communication request contact and the contact closest to the other end.

2. The electronic apparatus according to claim 1, wherein in the first direction, the distance between the attachment detection contact and the contact closest to the one end is equal to or longer than the distance between the attachment detection contact and the communication request contact.

3. The electronic apparatus according to claim 1, wherein error processing is performed if the attachment of the accessory to the electronic apparatus is detected via the attachment detection contact and the communication request is not detected via the communication request contact.

4. The electronic apparatus according to claim 1, wherein communication contacts used for a communication between the electronic apparatus and the accessory are disposed between the attachment detection contact and the communication request contact and on an opposite side of the attachment detection contact with respect to the communication request contact, respectively.

5. The electronic apparatus according to claim 4, wherein the electronic apparatus can communicate with the accessory by a first communication method and a second communication method different from the first communication method,
wherein a communication contact used for a communication in the first communication method is disposed on the opposite side of the attachment detection contact with respect to the communication request contact, and
wherein a communication contact used for a communication in the second communication method is disposed between the communication request contact and the attachment detection contact.

6. The electronic apparatus according to claim 1, wherein the attachment of the accessory is detected based on whether or not a potential of the attachment detection contact is a predetermined potential that is set to a potential in a state where the accessory is not attached.

7. The electronic apparatus according to claim 6, wherein a state where the potential of the attachment detection contact is lower than the predetermined potential is detected as a state where the accessory is attached.

8. The electronic apparatus according to claim 6, wherein power is supplied to the accessory in a case that the potential of the attachment detection contact is lower than the predetermined potential.

9. The electronic apparatus according to claim 1, wherein a predetermined communication with the accessory is started in a case that a potential of the communication request contact changes.

10. An accessory detachably attached to the electronic apparatus according to claim 1.

11. A system comprising:
the electronic apparatus according to claim 1; and
an accessory detachably attached to the electronic apparatus.

12. An electronic apparatus comprising:
an accessory shoe portion to which an accessory is detachably attached; and
a plurality of contacts provided to the accessory shoe portion and arranged in a first direction orthogonal to a direction in which the accessory is attached,
wherein the plurality of contacts include a first contact whose potential changes from a predetermined potential in a state that the accessory is attached, where the predetermined potential is set to a potential in a state where the accessory is not attached, and a second contact whose potential changes from a high level to a low level after the potential of the first contact changes from the predetermined potential and before a predetermined communication with the accessory is started,
wherein the second contact is disposed at a substantially center position of the accessory shoe portion in the first direction, and
wherein the first contact is disposed at a position more distant from a center of the accessory shoe portion than the first contact in the first direction.

13. The electronic apparatus according to claim 12, wherein the accessory shoe portion includes a pair of engagement portions separated by a first width in the first direction, and
wherein the communication request contact is disposed at a substantially center position of the first width in the first direction.

14. An accessory detachably attached to an electronic apparatus, the accessory comprising a plurality of contacts electrically connectable to the electronic apparatus and arranged in a first direction orthogonal to a direction in which the accessory is attached to the electronic apparatus,
wherein the plurality of contacts include an attachment detection contact used to detect an attachment of the accessory to the electronic apparatus, and a communication request contact used for a communication request from the accessory to the electronic apparatus,
wherein the attachment detection contact and the communication request contact are disposed between a contact closest to one end and a contact closest to another end in the first direction,
wherein the attachment detection contact is disposed between the communication request contact and the contact closest to the one end,
wherein in the first direction, a distance between the attachment detection contact and the communication request contact is shorter than a distance between the communication request contact and the contact closest to the other end, and
wherein in the first direction, the distance between the communication request contact and the contact closest to the one end is equal to or shorter than the distance between the communication request contact and the contact closest to the other end.

15. The accessory according to claim 14, wherein in the first direction, the distance between the attachment detection contact and the contact closest to the one end is equal to or longer than the distance between the attachment detection contact and the communication request contact.

16. The accessory according to claim 14, wherein the plurality of contacts are held by a holding member having a convex shape toward a connection direction with a plurality of contacts provided to the electronic apparatus.

17. The accessory according to claim 14, wherein communication contacts used for a communication between the electronic apparatus and the accessory are disposed between the attachment detection contact and the communication request contact and on an opposite side of the attachment detection contact with respect to the communication request contact, respectively.

18. The accessory according to claim 17, wherein the accessory can communicate with the electronic apparatus by a first communication method and a second communication method different from the first communication method,
wherein a contact used for a communication in the first communication method is disposed on the opposite side of the attachment detection contact with respect to the communication request contact, and
wherein a communication contact used for a communication in the second communication method is disposed between the communication request contact and the attachment detection contact.

19. The accessory according to claim 14, wherein the attachment detection contact is connected to a reference potential.

20. The accessory according to claim 19, wherein the reference potential is a grounded potential.

21. The accessory according to claim 14, wherein a communication with the electronic apparatus is started by decreasing a potential of the communication request contact.

22. A system comprising:
an electronic apparatus; and
the accessory according to claim 14, which is detachably attached to the electronic apparatus.

23. An electronic apparatus to which an accessory is detachably attached, the electronic apparatus comprising a plurality of contacts electrically connectable to the accessory and arranged in a first direction orthogonal to a direction in which the accessory is attached,
wherein the plurality of contacts include an attachment detection contact used to detect an attachment of the accessory to the electronic apparatus, and a communication request contact used for a communication request from the accessory to the electronic apparatus,
wherein the attachment detection contact and the communication request contact are disposed between a contact closest one end and a contact closest to another end in the first direction,
wherein the attachment detection contact is disposed between the communication request contact and the contact closest to the one end,
wherein in the first direction, a distance between the attachment detection contact and the communication request contact is shorter than a distance between the communication request contact and the contact closest to the other end, and
wherein error processing is performed if the attachment of the accessory to the electronic apparatus is detected via the attachment detection contact and the communication request is not detected via the communication request contact.

24. An electronic apparatus to which an accessory is detachably attached, the electronic apparatus comprising a plurality of contacts electrically connectable to the accessory and arranged in a first direction orthogonal to a direction in which the accessory is attached,
wherein the plurality of contacts include an attachment detection contact used to detect an attachment of the accessory to the electronic apparatus, and a communication request contact used for a communication request from the accessory to the electronic apparatus,
wherein the attachment detection contact and the communication request contact are disposed between a contact closest one end and a contact closest to another end in the first direction,
wherein the attachment detection contact is disposed between the communication request contact and the contact closest to the one end,
wherein in the first direction, a distance between the attachment detection contact and the communication request contact is shorter than a distance between the communication request contact and the contact closest to the other end,
wherein communication contacts used for a communication between the electronic apparatus and the accessory are disposed between the attachment detection contact and the communication request contact and on an opposite side of the attachment detection contact with respect to the communication request contact, respectively,
wherein the electronic apparatus can communicate with the accessory by a first communication method and a second communication method different from the first communication method,
wherein a communication contact used for a communication in the first communication method is disposed on the opposite side of the attachment detection contact with respect to the communication request contact, and
wherein a communication contact used for a communication in the second communication method is disposed between the communication request contact and the attachment detection contact.

25. An electronic apparatus to which an accessory is detachably attached, the electronic apparatus comprising a plurality of contacts electrically connectable to the accessory and arranged in a first direction orthogonal to a direction in which the accessory is attached,
wherein the plurality of contacts include an attachment detection contact used to detect an attachment of the accessory to the electronic apparatus, and a communication request contact used for a communication request from the accessory to the electronic apparatus,
wherein the attachment detection contact and the communication request contact are disposed between a contact closest one end and a contact closest to another end in the first direction,
wherein the attachment detection contact is disposed between the communication request contact and the contact closest to the one end,
wherein in the first direction, a distance between the attachment detection contact and the communication request contact is shorter than a distance between the communication request contact and the contact closest to the other end, and
wherein the attachment of the accessory is detected based on whether or not a potential of the attachment detection contact is a predetermined potential that is set to a potential in a state where the accessory is not attached.

26. The electronic apparatus according to claim 25, wherein a state where the potential of the attachment detection contact is lower than the predetermined potential is detected as a state where the accessory is attached.

27. The electronic apparatus according to claim 25, wherein power is supplied to the accessory in a case that the potential of the attachment detection contact is lower than the predetermined potential.

28. An accessory detachably attached to an electronic apparatus, the accessory comprising a plurality of contacts electrically connectable to the electronic apparatus and arranged in a first direction orthogonal to a direction in which the accessory is attached to the electronic apparatus,
wherein the plurality of contacts include an attachment detection contact used to detect an attachment of the accessory to the electronic apparatus, and a communication request contact used for a communication request from the accessory to the electronic apparatus,
wherein the attachment detection contact and the communication request contact are disposed between a contact closest to one end and a contact closest to another end in the first direction,
wherein the attachment detection contact is disposed between the communication request contact and the contact closest to the one end, wherein in the first direction, a distance between the attachment detection contact and the communication request contact is shorter than a distance between the communication request contact and the contact closest to the other end, wherein communication contacts used for a communication between the electronic apparatus and the accessory are disposed between the attachment detection contact and the communication request contact and on an opposite side of the attachment detection contact with respect to the communication request contact, respectively, wherein the accessory can communicate with the electronic apparatus by a first communication method and a second communication method different from the first communication method, wherein a contact used for a communication in the first communication method is disposed on the opposite side of the attachment detection contact with respect to the communication request contact, and wherein a communication contact used for a communication in the second communication method is disposed between the communication request contact and the attachment detection contact.

* * * * *